(12) United States Patent
Matsusaka et al.

(10) Patent No.: US 7,869,134 B2
(45) Date of Patent: Jan. 11, 2011

(54) VARIABLE POWER OPTICAL SYSTEM, IMAGING LENS SYSTEM AND DIGITAL APPARATUS

(75) Inventors: Keiji Matsusaka, Osaka (JP); Soh Ohzawa, Toyonaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 449 days.

(21) Appl. No.: 11/919,045

(22) PCT Filed: Apr. 18, 2006

(86) PCT No.: PCT/JP2006/308091

§ 371 (c)(1),
(2), (4) Date: Oct. 22, 2007

(87) PCT Pub. No.: WO2006/115107

PCT Pub. Date: Nov. 2, 2006

(65) Prior Publication Data

US 2009/0310225 A1    Dec. 17, 2009

(30) Foreign Application Priority Data

Apr. 22, 2005  (JP)  ............................. 2005-125777

(51) Int. Cl.
G02B 15/14  (2006.01)
(52) U.S. Cl. ...................................... 359/680; 359/682
(58) Field of Classification Search ................. 359/680, 359/682, 686, 689
See application file for complete search history.

(56) References Cited

U.S. PATENT DOCUMENTS 4,787,718 A    11/1988   Cho ............................. 350/427
5,668,668 A    9/1997    Shibayama et al. ......... 359/683
5,721,642 A    2/1998    Shibayama et al. ......... 359/686
5,798,871 A    8/1998    Shibayama et al. ......... 359/694

(Continued)

FOREIGN PATENT DOCUMENTS

JP          62-235916 A    10/1987

(Continued)

OTHER PUBLICATIONS

Supplemental European Search Report dated Jun. 11, 2008, for counterpart European Application No. EP 06 73 2020.

(Continued)

*Primary Examiner*—David N Spector
(74) *Attorney, Agent, or Firm*—Sidley Austin LLP

(57) ABSTRACT

Provided is a microminiaturized zoom optical system capable of sufficiently correcting aberration. The zoom optical system (100) includes a first lens group (101) having a negative optical power, a second lens group (102) having a positive optical power, and a third lens group (103) having a positive or negative optical power in this order from the object side. The zoom optical system is configured in such a manner that the interval between the first lens group (101) and the second lens group (102) is decreased in zooming from the wide angle end to the telephoto end. A positive lens element in the third lens group (103) or in a lens group closer to the image side than the third lens group (103) satisfies the following conditional expression:

$$vp < 40$$

where vp is the minimum value of the Abbe number of the positive lens element.

40 Claims, 45 Drawing Sheets

U.S. PATENT DOCUMENTS

| | | | |
|---|---|---|---|
| 5,999,329 A | 12/1999 | Ohtake | 359/686 |
| 6,028,716 A | 2/2000 | Kato et al. | 359/689 |
| 6,236,517 B1 | 5/2001 | Kato et al. | 359/692 |
| 6,417,973 B2 | 7/2002 | Mihara et al. | 359/684 |
| 7,760,439 B2 * | 7/2010 | Matsusaka | 359/680 |
| 2004/0156120 A1 | 8/2004 | Yoneyama | 359/680 |
| 2005/0030641 A1 | 2/2005 | Kuba et al. | 359/686 |

FOREIGN PATENT DOCUMENTS

| | | |
|---|---|---|
| JP | 5-341186 A | 12/1993 |
| JP | 7-151974 A | 6/1995 |
| JP | 8-304704 A | 11/1996 |
| JP | 9-179026 A | 7/1997 |
| JP | 2002-48975 A | 2/2002 |
| JP | 2002-72091 A | 3/2002 |
| JP | 2002-365543 A | 12/2002 |
| JP | 2004-258644 A | 9/2004 |
| JP | 2005-55496 A | 3/2005 |
| JP | 2005-77825 A | 3/2005 |
| JP | 2006-119192 A | 5/2006 |
| WO | WO 2006/115107 A1 | 11/2006 |

OTHER PUBLICATIONS

WO 2006/0115107 A1, concerning International Application No. PCT/JP2006/308091, cites the following documents in the order that they appear in the International Search Report (ISR).

* cited by examiner

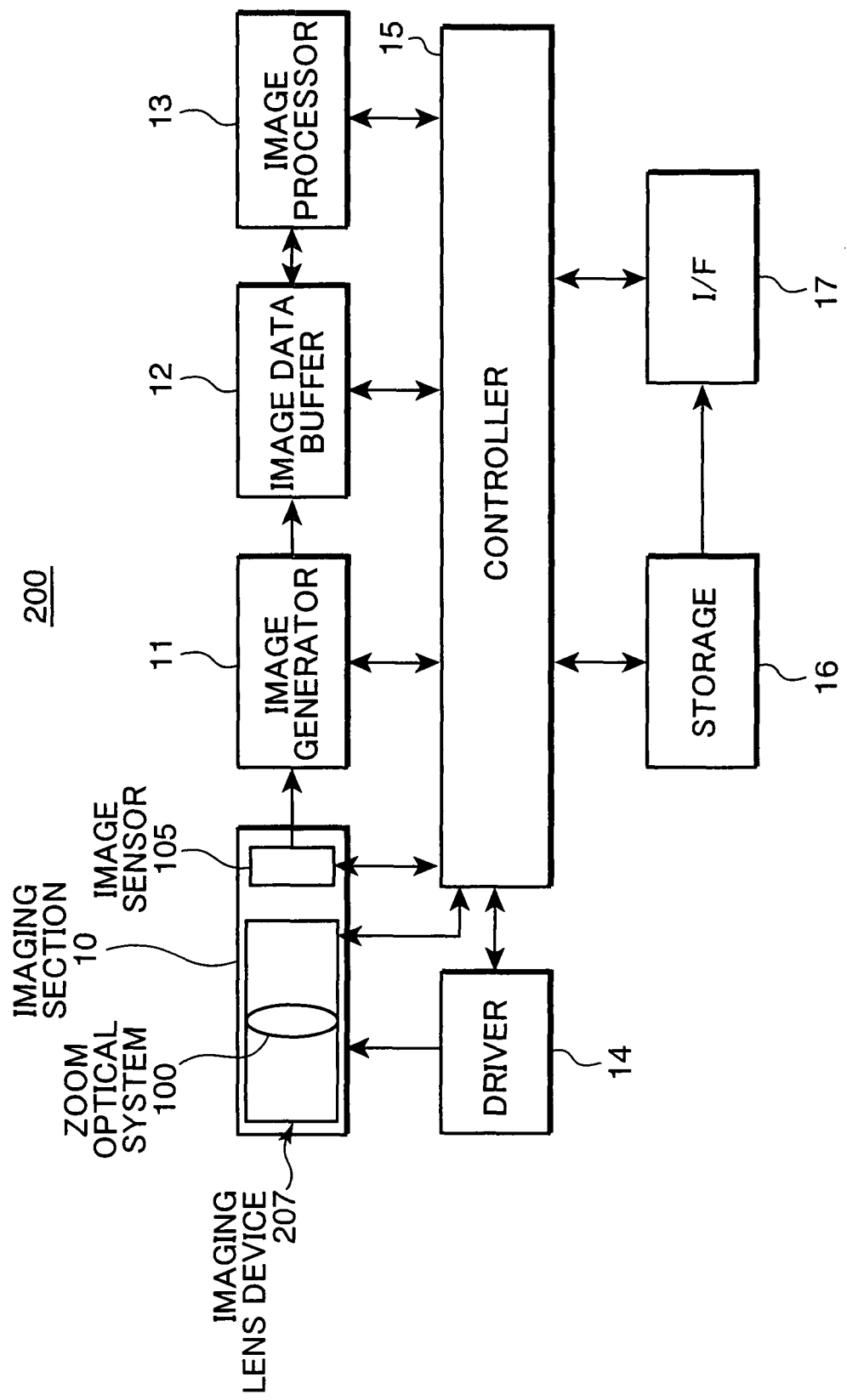

FIG. 25
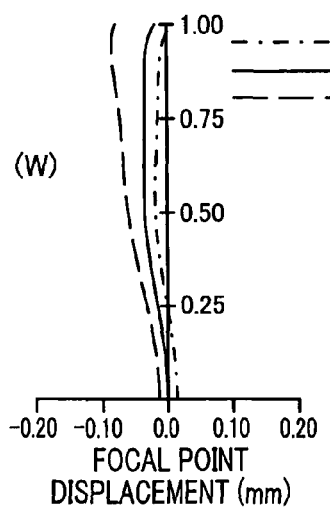
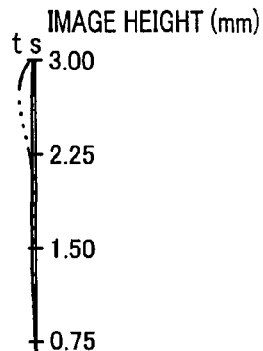
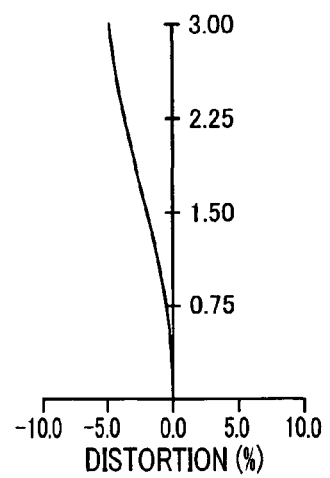
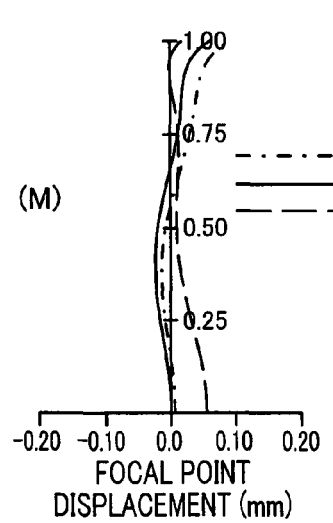
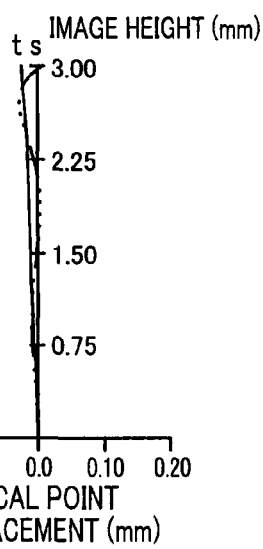
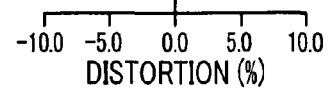
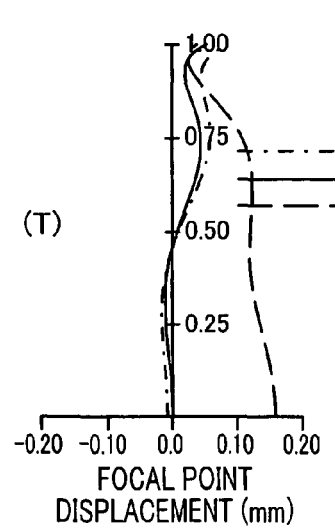
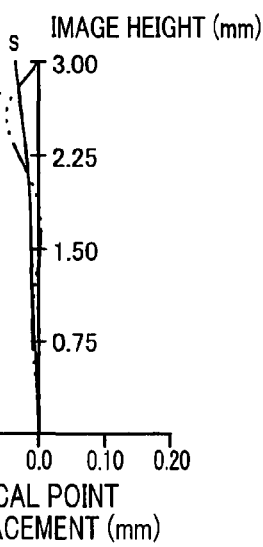
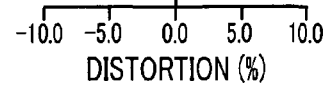

FIG. 30
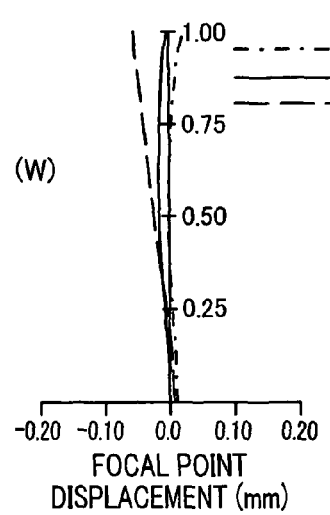
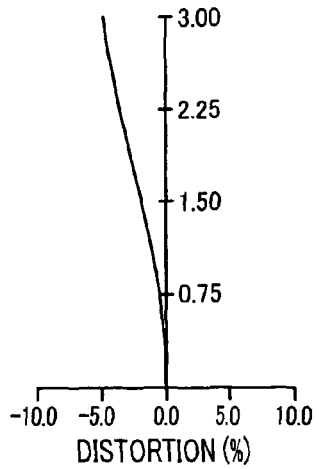
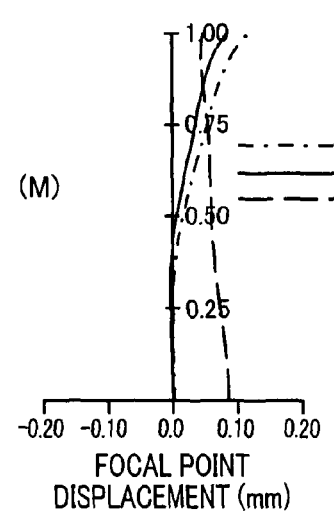
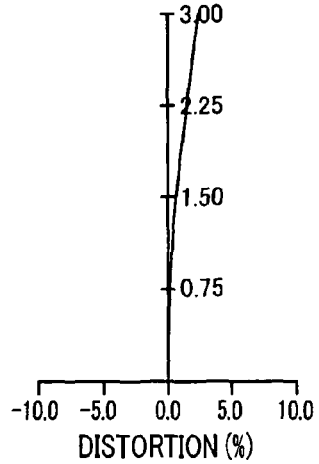
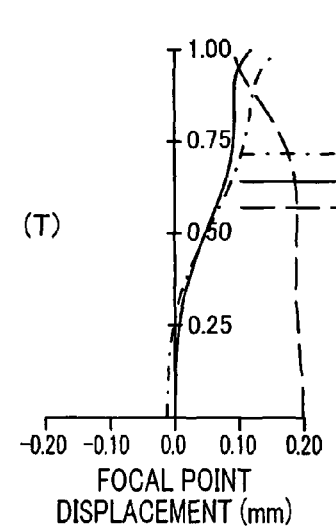
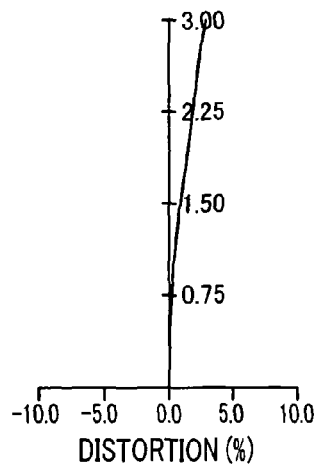

FIG. 34
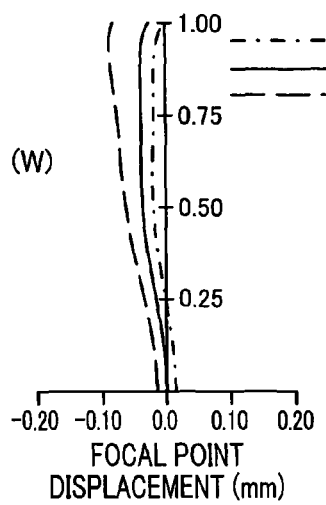
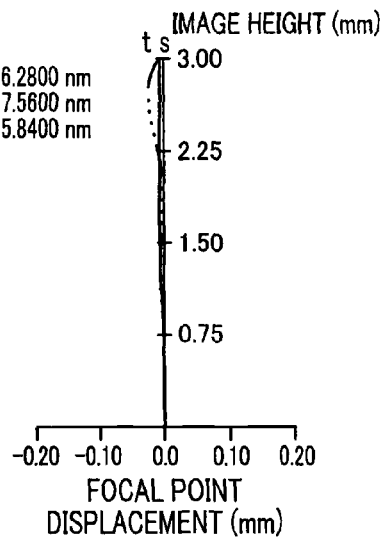
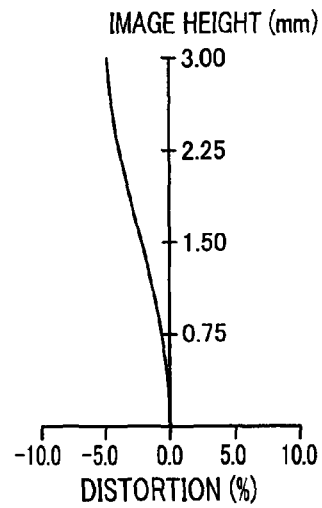
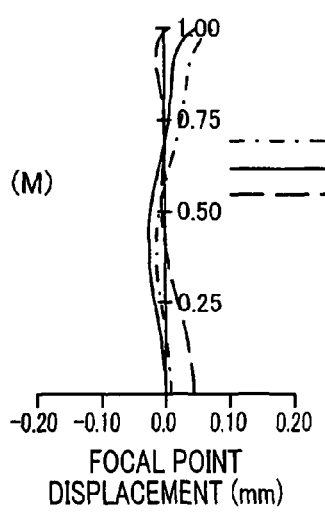
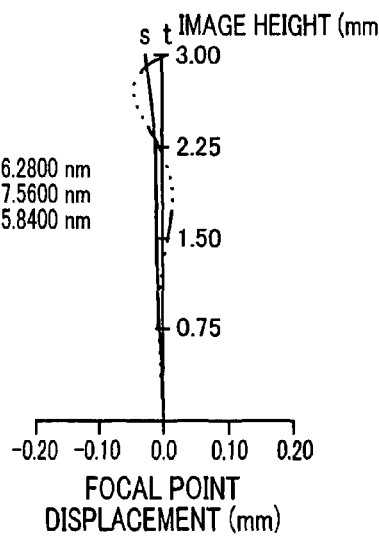
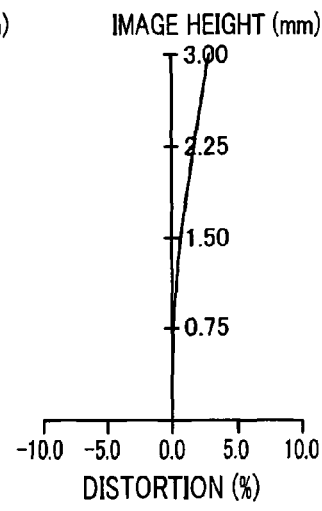
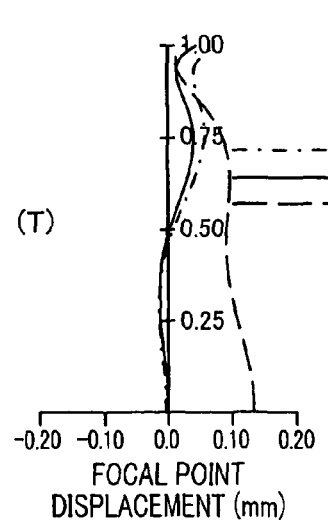
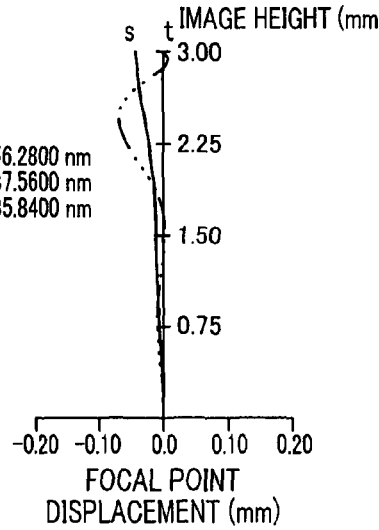
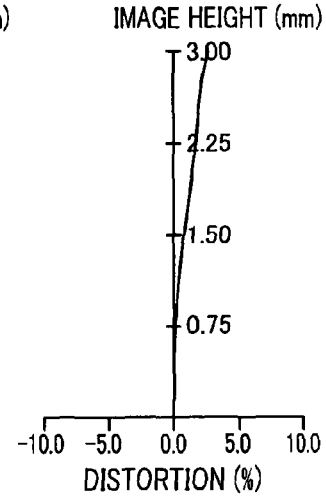

FIG. 36
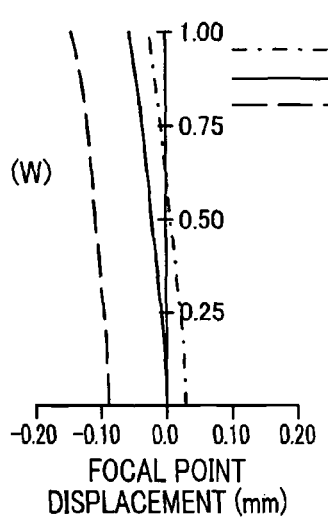
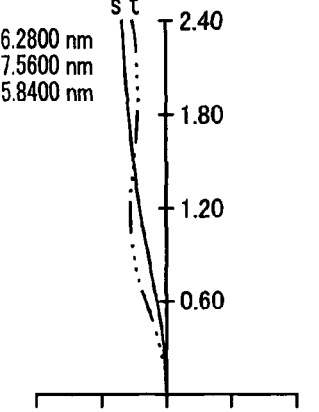
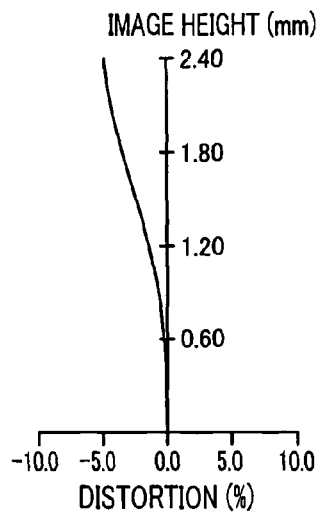
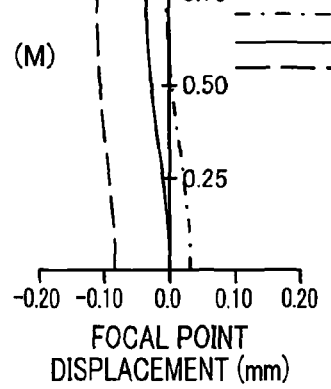
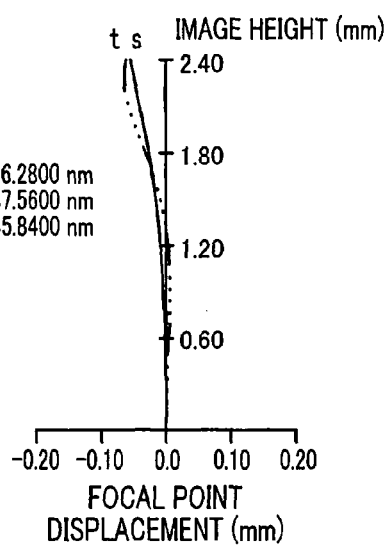
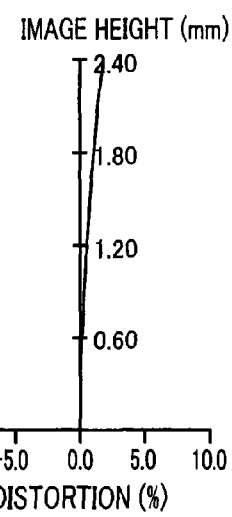
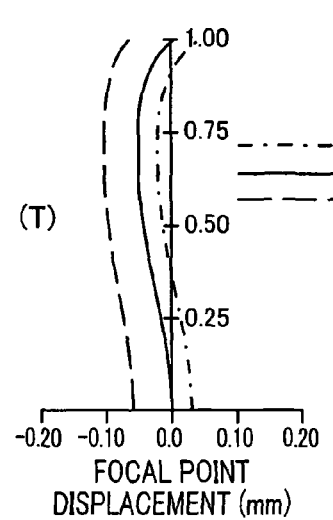
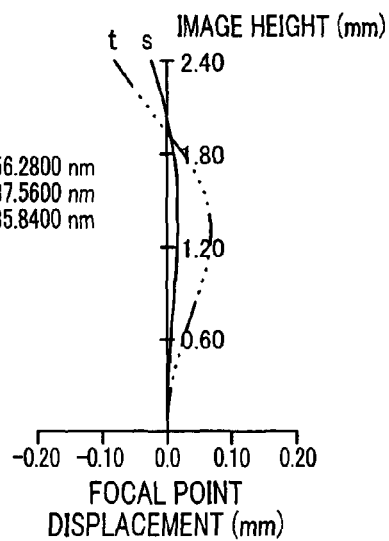
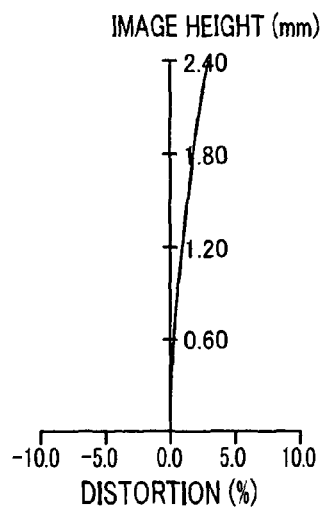

FIG. 38
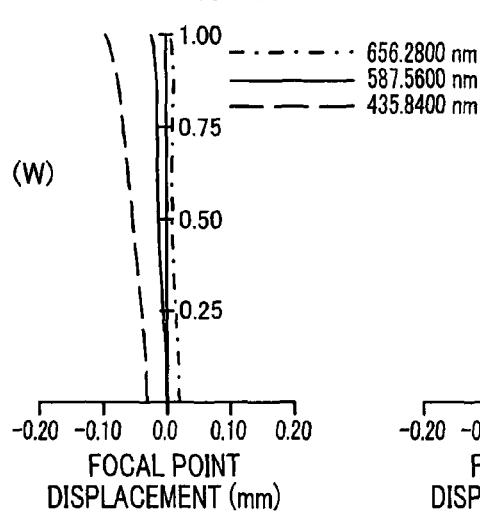
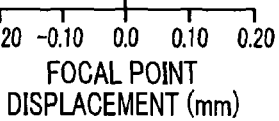
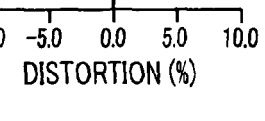
(W)
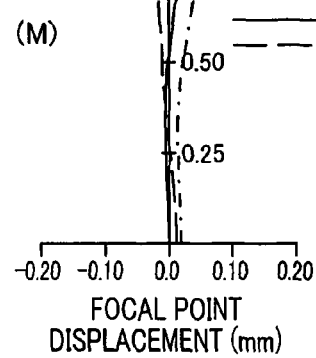
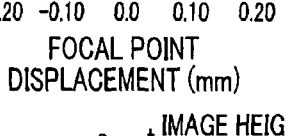
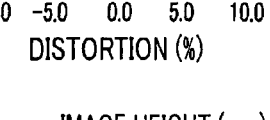
(M)
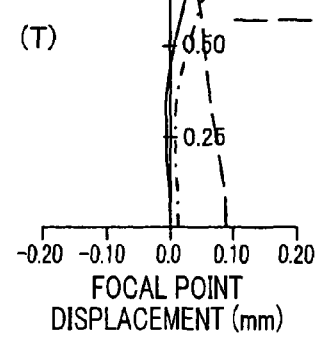
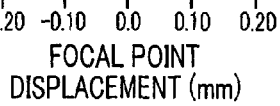
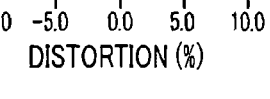
(T)

FIG. 39
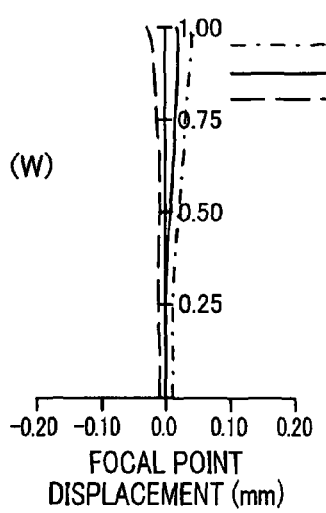
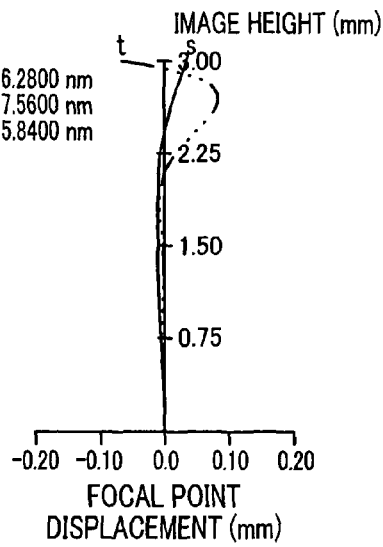
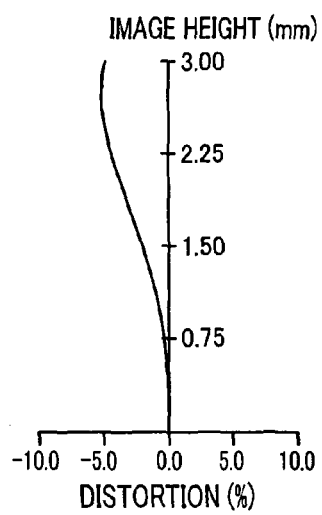
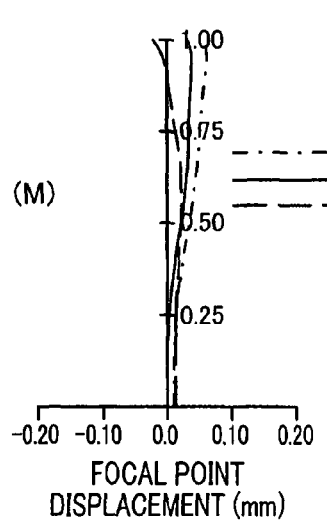
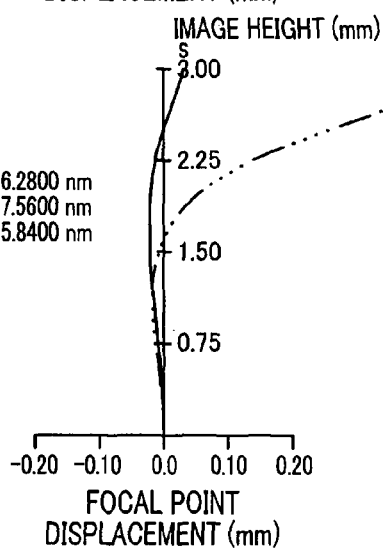
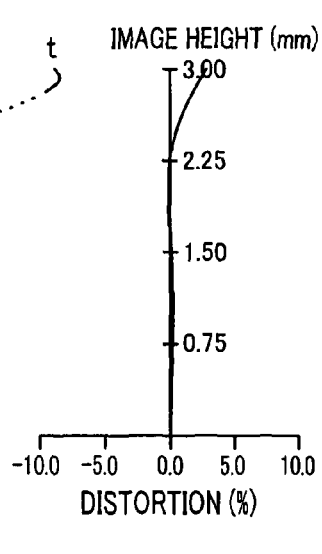
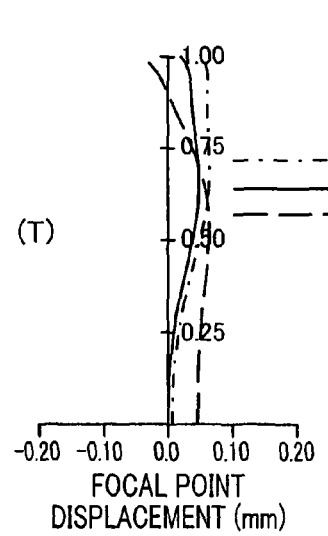
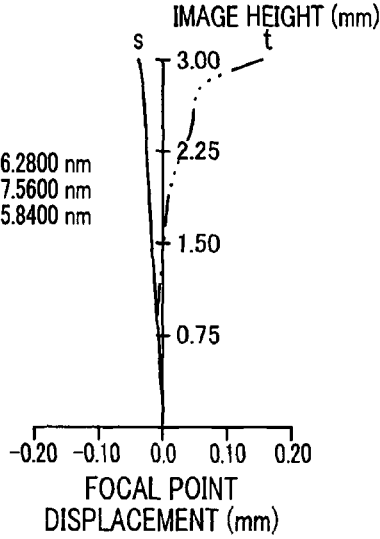
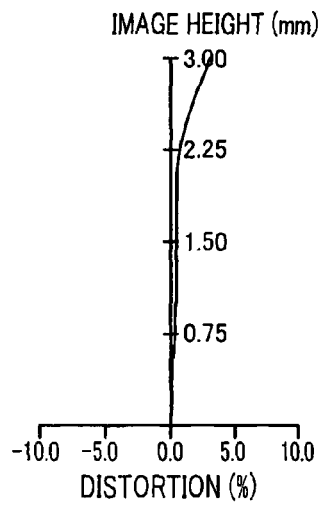

FIG. 41
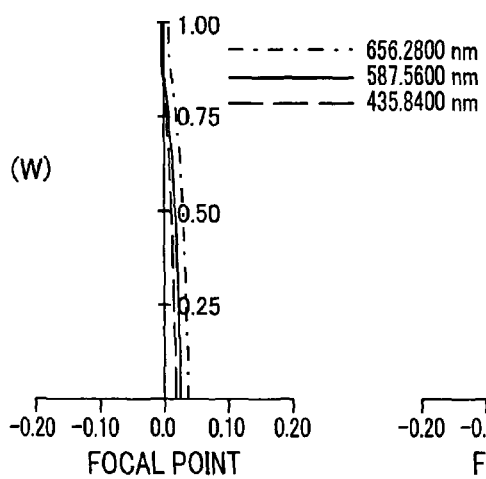
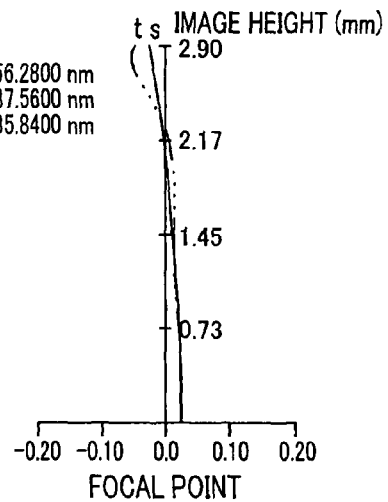
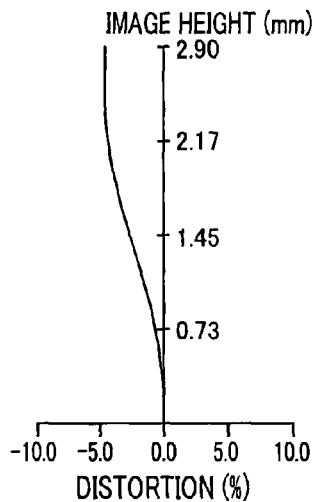
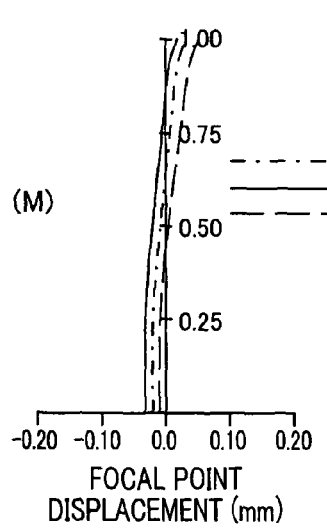
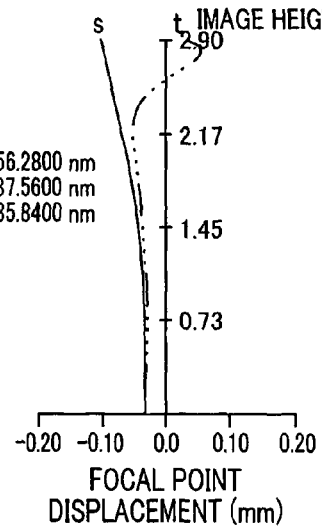
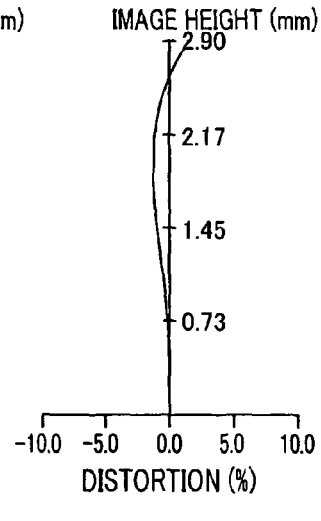
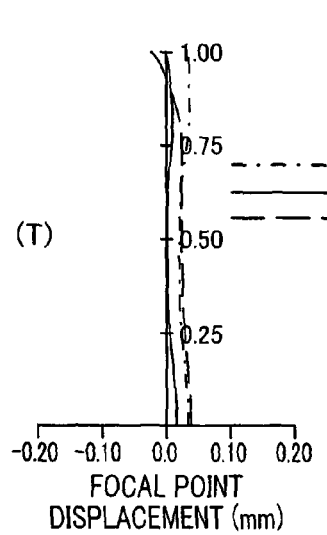
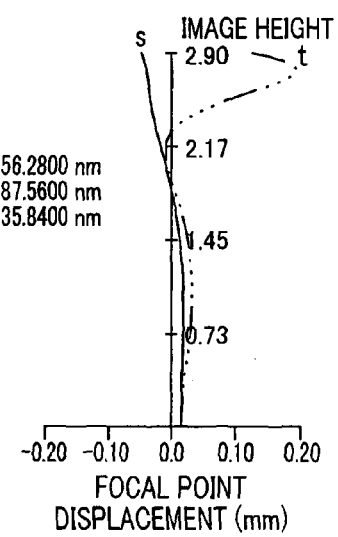
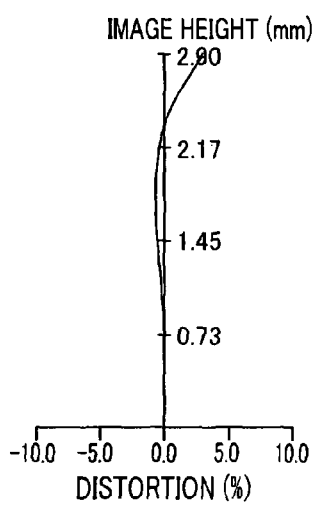

FIG. 43
EXAMPLES 1, 7, 10, 14, 15, 16 ⇒ Gr1: U-TURN, Gr3: FIXED
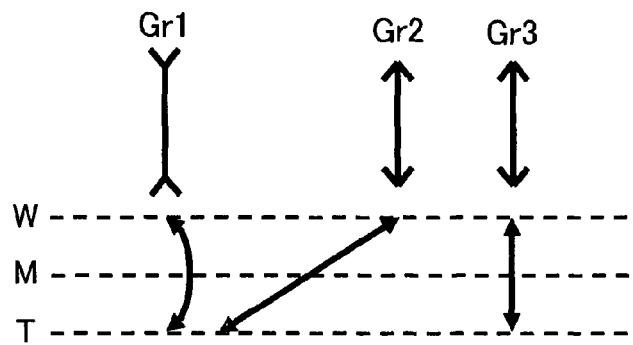
EXAMPLE 2 ⇒ Gr1: FIXED, Gr4: FIXED
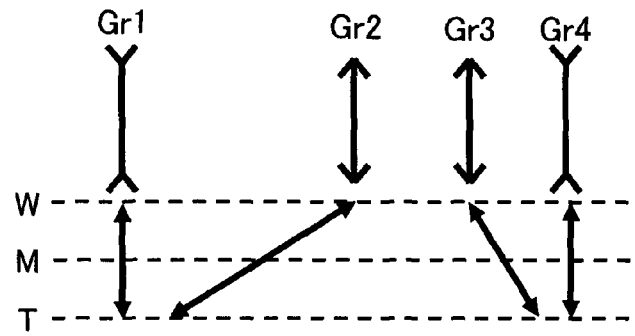
EXAMPLES 3, 12 ⇒ Gr1: U-TURN, Gr3: FIXED, ENTIRE LENGTH TO WIDE ANGLE END>ENTIRE LENGTH TO TELEPHOTO END
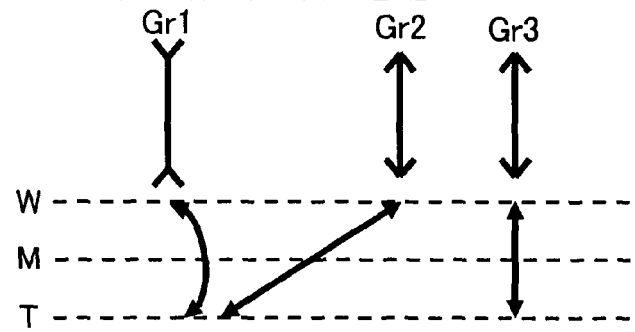
EXAMPLES 4, 6, 8 ⇒ Gr1: U-TURN, ENTIRE LENGTH TO WIDE ANGLE END>ENTIRE LENGTH TO TELEPHOTO END
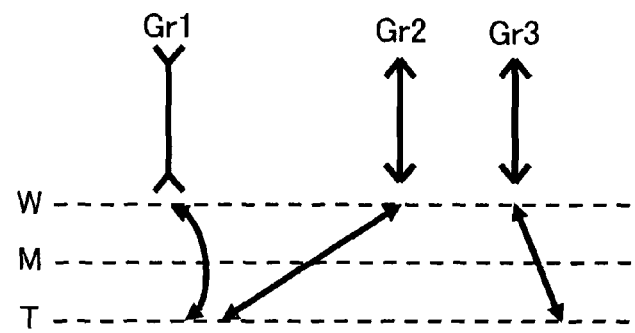

FIG. 44
EXAMPLE 5 ⇒ Gr1: U-TURN, Gr3: FIXED, ENTIRE LENGTH TO TELEPHOTO ANGLE END>ENTIRE LENGTH TO WIDE ANGLE END
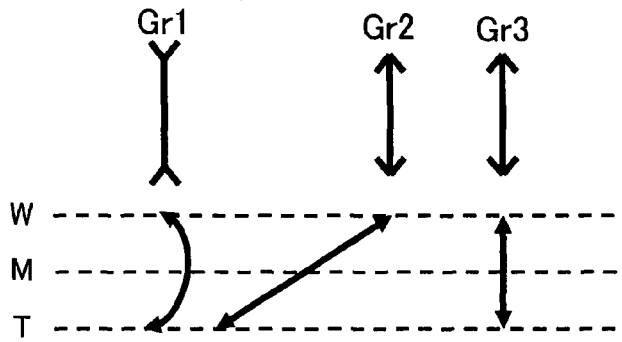
EXAMPLE 9
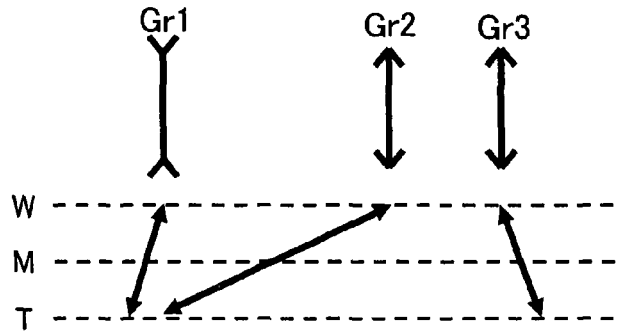
EXAMPLE 11 ⇒ Gr1: FIXED, Gr3: U-TURN, Gr4: FIXED
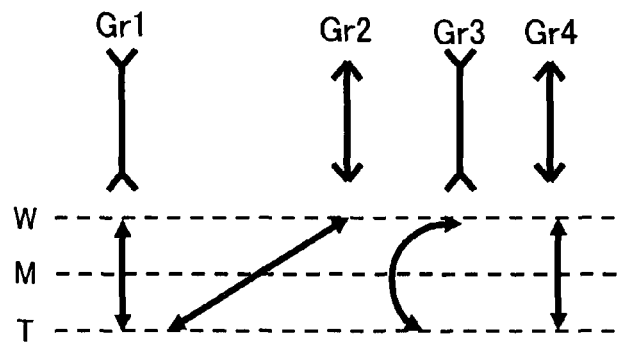
EXAMPLE 13 ⇒ Gr1: U-TURN, ENTIRE LENGTH TO WIDE ANGLE END>ENTIRE LENGTH TO TELEPHOTO ANGLE END
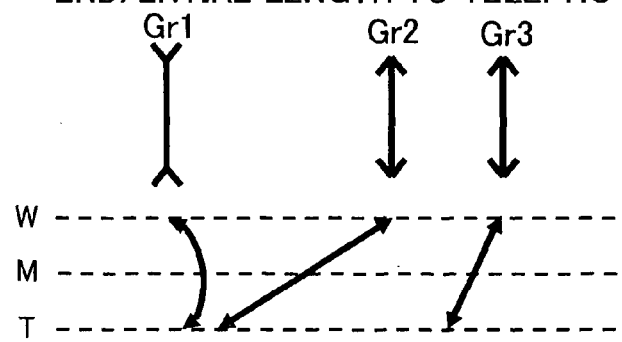

FIG. 45
EXAMPLE 17 ⇒ Gr1: FIXED, Gr4: FIXED
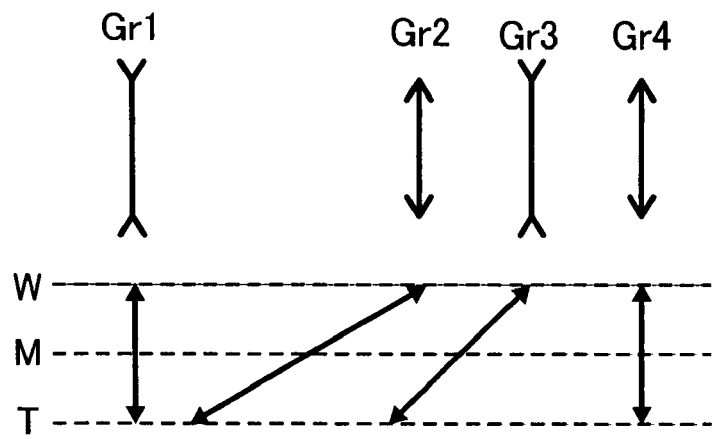
EXAMPLE 18 ⇒ Gr1: FIXED, Gr4: FIXED
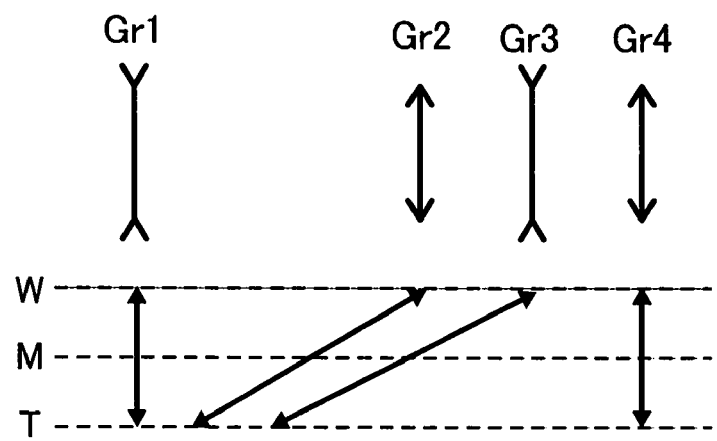

VARIABLE POWER OPTICAL SYSTEM, IMAGING LENS SYSTEM AND DIGITAL APPARATUS

RELATED APPLICATIONS

This application is a National Stage of International Application No. PCT/JP2006/3080914, filed Apr. 18, 2006, which is based on Japanese Patent Application No. 2005-125777 filed with Japanese Patent Office on Apr. 22, 2005, the entire content of which is incorporated herein by reference.

TECHNICAL FIELD

The present invention relates to a zoom optical system constituted of lens groups for zooming by changing the interval between the lens groups in the optical axis direction, an imaging lens device incorporated with the zoom optical system, and a digital apparatus loaded with the imaging lens device, and more particularly to a zoom optical system or a like device adapted for miniaturization.

BACKGROUND ART

In recent years, mobile phones or PDAs (Personal Digital Assistants) have been widespread. Also, the specifications in which a compact digital still camera unit or a compact digital video unit is incorporated in the mobile phone or the PDA have been generalized. In a digital apparatus such as the mobile phone or the PDA, a small-sized image sensor with a low pixel number, as compared with an independent product such as a digital still camera, and an imaging lens device provided with a single focus optical system constituted of one to three plastic lens elements are generally used, in view of severe constraints regarding the size or cost of the digital apparatus.

Since the magnification of the single focus optical system is substantially equivalent to visual magnification, an object to be photographed is limited to the one located near a photographer. Under the current rapid development of high-pixel, high-resolution image sensors, there is a demand for a compact zoom optical system that is compatible with a high-pixel image sensor, and is loadable in a mobile phone or a like device capable of photographing a subject remotely away from a photographer.

For instance, patent document 1 proposes an arrangement directed to a three-component zoom optical system of negative-positive-positive arrangement which is constituted of a first lens group having a negative optical power, a second lens group having a positive optical power, and a third lens group having a positive optical power in this order from the object side, wherein the total thickness of the optical system is reduced when a lens barrel is collapsed. Also, patent document 2 discloses a four-component zoom optical system of negative-positive-positive-positive arrangement which is constituted of lens groups having a negative optical power, a positive optical power, a positive optical power, and a positive optical power in this order from the object side, wherein productivity of an aspherical negative lens element in the first lens group is improved by properly selecting a glass material for the aspherical negative lens element.

It is difficult to employ the lens barrel collapsible structure as recited in patent document 1 to a mobile phone or a like device, because an impact resistance required for the mobile phone or a like device is high. Accordingly, the optical system proposed in patent document 1 has an unduly long entire length in use. Also, the second lens group is constituted of three or more lens elements, and the total number of lens elements is as large as six to eight. Therefore, miniaturization has not been completely accomplished in the optical system disclosed in patent document 1. In the zoom optical system recited in patent document 2, the power of the second lens group is weak, and the optical system is not compact because of a large moving amount. In addition to these drawbacks, the number of lens elements is as large as seven. In light of these drawbacks, it is difficult to mount the zoom optical system recited in patent document 2 in a mobile phone or a like device.

The zoom optical systems in patent documents 1 and 2 employ a negative dominant optical system, in which the first lens group closest to the object side has a negative optical power. In the negative dominant optical system, the second lens group primarily serving as an element for zooming is required to have an extremely strong optical power in microminiaturizing the optical system. In this case, particularly at a telephoto end, magnification chromatic aberration resulting from an increase in optical power of the second lens group is unduly increased, which may lower the contrast in the periphery of a captured image, and resultantly cause image degradation.

patent document 1: Japanese Unexamined Patent Publication No. 2002-48975 patent document 2: Japanese Unexamined Patent Publication No. 2002-365543

DISCLOSURE OF THE INVENTION

In view of the above conventional disadvantages, it is an object of the present invention to provide a compact i.e. microminiaturized zoom optical system that enables to obtain a high-quality image with respect to the entirety of a captured image by sufficiently correcting magnification chromatic aberration while maximally suppressing a moving amount of lens groups for zooming, as well as an imaging lens device incorporated with the zoom optical system, and a digital apparatus loaded with the imaging lens device.

A zoom optical system according to an aspect of the invention includes a first lens group having a negative optical power, a second lens group having a positive optical power, and a third lens group having a positive or negative optical power in this order from an object side. The zoom optical system is configured in such a manner that an interval between the first lens group and the second lens group is decreased in zooming from a wide angle end to a telephoto end, wherein a positive lens element in the third lens group or in a lens group closer to an image side than the third lens group satisfies the following conditional expression (1):

$$vp < 40 \tag{1}$$

where $vp$ is a minimum value of the Abbe number of the positive lens element.

In the above arrangement, the zoom optical system is configured into a negative dominant optical system, in which the first lens group closest to the object side has a negative optical power. This enables to promptly alleviate emission of light rays incident from the object side with a large angle by the negative optical power of the first lens group. This is advantageous in reducing the entire length of the optical system or the diameter of the forwardmost lens element. Also, in the negative dominant arrangement, increase of error sensitivity can be suppressed despite miniaturization of the optical system. These advantages are particularly increased in a zoom lens device whose zoom ratio is about two to three times.

If, however, miniaturization of the optical system further progresses, the optical power required for the individual lens elements constituting the second lens group in the aforementioned lens arrangement is increased. As a result, magnification chromatic aberration at the telephoto end may be unduly increased. In view of this, the positive lens element in the third lens group or in the lens group closer to the image side than the third lens group is made of a high dispersive material having the Abbe number satisfying the aforementioned conditional expression (1) to correct the aberration. If the Abbe number is over the upper limit in the conditional expression (1), correction of magnification chromatic aberration by the positive lens element is insufficient, which may lower the contrast, and resultantly cause image degradation.

The above arrangement of the invention enables to miniaturize the zoom optical system as a negative dominant arrangement, and sufficiently correct magnification chromatic aberration or a like drawback in the second lens group, which may be involved in miniaturizing or microminiaturizing the zoom optical system, by optimizing the Abbe number of the positive lens element in the third lens group or in the lens group closer to the image side than the third lens group. The arrangement is advantageous in providing a satisfactorily miniaturized zoom optical system whose aberration is desirably corrected in the entire zoom range in a zoom optical system with a certain zoom ratio, particularly, in a zoom optical system with a zoom ratio of about two to three times.

An imaging lens device according to another aspect of the invention includes the aforementioned zoom optical system, wherein the zoom optical system is so configured as to form an optical image of a subject on a predetermined image forming plane.

A digital apparatus according to yet another aspect of the invention includes the aforementioned imaging lens device, an image sensor for converting the optical image into an electric signal, and a controller for causing the imaging lens device and the image sensor to perform at least one of still image shooting and moving image shooting for the subject, wherein the zoom optical system in the imaging lens device is so configured as to form the optical image of the subject on a light receiving surface of the image sensor.

The aforementioned arrangements of the invention enable to realize a compact, high-resolution, and zoomable imaging lens device that is mountable in a mobile phone, a personal digital assistant, or a like device, as well as a digital apparatus loaded with the imaging lens device.

These and other objects, features and advantages of the present invention will become more apparent upon reading the following detailed description along with the accompanying drawings.

BRIEF DESCRIPTION OF THE DRAWINGS

FIGS. 4A and 4B are diagrams showing an external appearance of a camera phone loaded with a zoom optical system embodying the invention, wherein FIG. 4A shows an operating surface of the camera phone, and FIG. 4B shows a back surface of the camera phone.

FIG. 5 is a functional block diagram showing a functional part relating to an imaging operation to be executed by a mobile phone, as an example of a digital apparatus loaded with the zoom optical system embodying the invention.

FIG. 25 is an aberration chart showing spherical aberration, astigmatism, and distortion aberration of lens groups in Example 1.

FIG. 30 is an aberration chart showing spherical aberration, astigmatism, and distortion aberration of lens groups in Example 6.

FIG. 34 is an aberration chart showing spherical aberration, astigmatism, and distortion aberration of lens groups in Example 10.

FIG. 36 is an aberration chart showing spherical aberration, astigmatism, and distortion aberration of lens groups in Example 12.

FIG. 38 is an aberration chart showing spherical aberration, astigmatism, and distortion aberration of lens groups in Example 14.

FIG. 39 is an aberration chart showing spherical aberration, astigmatism, and distortion aberration of lens groups in Example 15.

FIG. 41 is an aberration chart showing spherical aberration, astigmatism, and distortion aberration of lens groups in Example 17.

FIG. 43 is a diagram showing moving directions of the lens groups in the Examples of the zoom optical system embodying the invention.

FIG. 44 is a diagram showing moving directions of the lens groups in the Examples of the zoom optical system embodying the invention.

FIG. 45 is a diagram showing moving directions of the lens groups in the Examples of the zoom optical system embodying the invention.

BEST MODE FOR CARRYING OUT THE INVENTION

Figure 1:
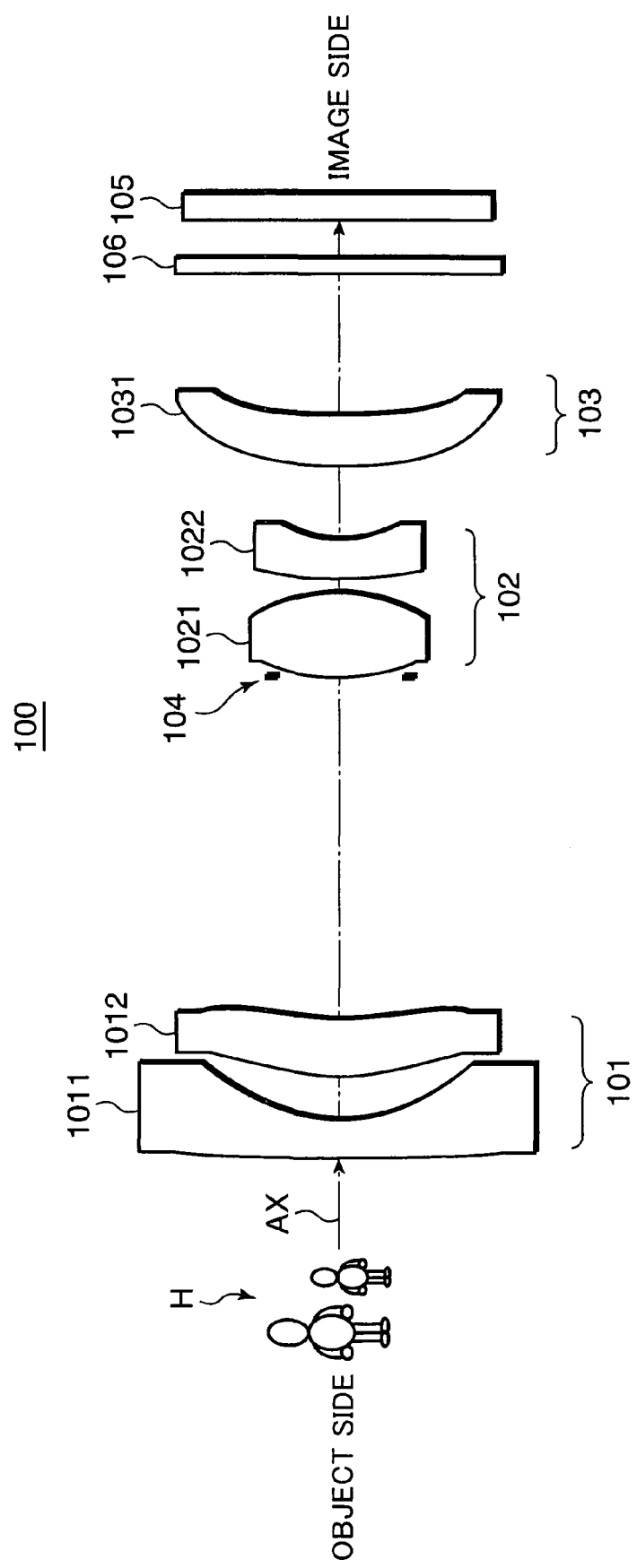
FIG. 1 is a diagram schematically showing an arrangement of a zoom optical system to which an embodiment of the invention is applied.

In the following, an embodiment of the invention is described referring to the drawings. The terms used in the following description are defined as follows throughout the specification.

(a) The refractive index is a refractive index with respect to a wavelength (587.56 nm) of d-ray.

(b) The Abbe number is an Abbe number vd which is obtained by the following definitional equation:

$$vd=(nd-1)/(nF-nC)$$

where nd, nF, and nC are refractive indexes with respect to d-ray, F-ray (wavelength: 486.13 nm), and C-ray (wavelength: 656.28 nm), respectively, and vd is the Abbe number.

(c) The indication concerning a plane configuration is an indication based on paraxial curvature.

(d) The optical power concerning each of single lens elements constituting a cemented lens element is defined in a condition that both lens surfaces of the individual single lens elements face the air.

Figure 2:
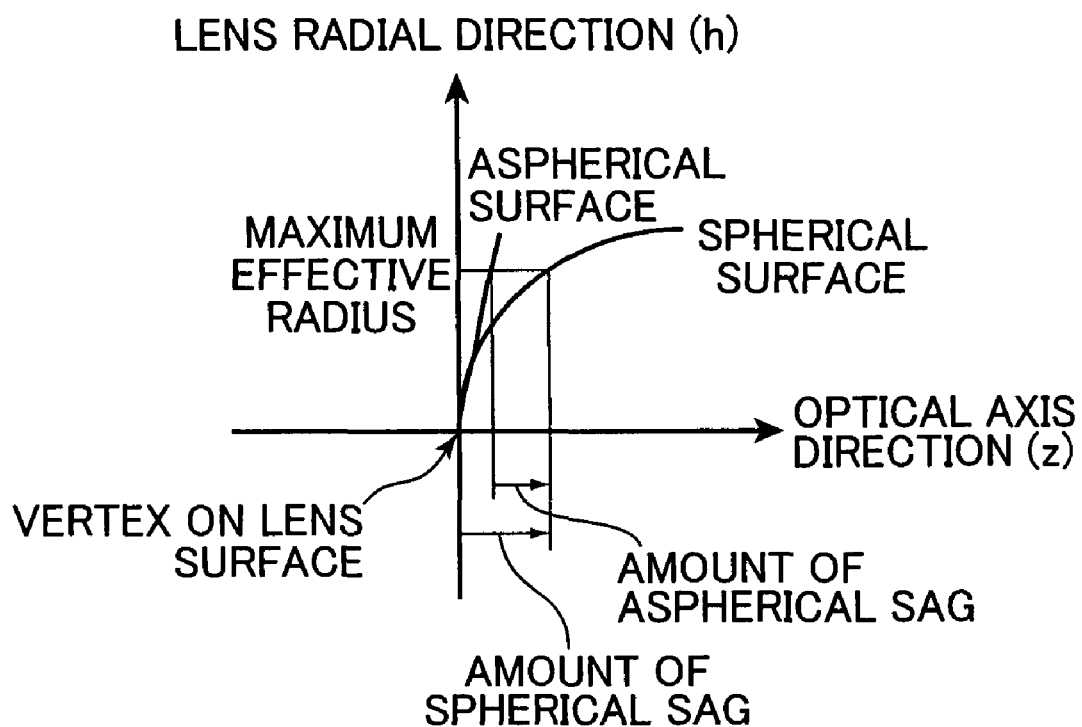
FIG. 2 is a diagram showing a definition on an amount of aspherical sag.

(e) The amount of aspherical sag is a parameter representing a difference between an amount of spherical sag based on paraxial curvature, and an optical axis distance from a vertex of a lens surface to a point on a curve of an aspherical surface with respect to a maximum effective radius (see FIG. 2).

(f) A resin material to be used as a material for a composite aspherical lens element (a lens element with an aspherical shape, which is obtained by coating a film of resin material on a spherical glass member as a substrate) merely has an additive function of a glass substrate. Accordingly, the composite aspherical lens element is not handled as an individual optical member, but is handled as a single lens element based on a premise that the glass substrate has an aspherical surface. In this case, the refractive index of the glass material composing the glass substrate is defined as the refractive index of the composite aspherical lens element.

(g) Concerning the lens elements, the indication "concave", "convex", or "meniscus" shows a shape of a lens element near the optical axis i.e. near the center of the lens element, in other words, shows a shape based on paraxial curvature.

<Description on Arrangement of Zoom Optical System>

FIG. 1 is an optical path diagram at a wide angle end, showing an arrangement example of a zoom optical system 100 embodying the invention. The zoom optical system 100 is adapted to form an optical image of a subject H on a light receiving surface of an image sensor 105 for converting the optical image into an electric signal. The zoom optical system 100 is a zoom optical system, wherein a first lens group 101 having a negative optical power, a second lens group 102 having a positive optical power, and a third lens group 103 having a positive or negative optical power are arranged in this order from an object side i.e. the side of the subject H, and the interval between the first lens group 101 and the second lens group 102 is decreased in zooming from a wide angle end to a telephoto end.

In this embodiment, the first lens group 101 is constituted of a biconcave negative lens element 1011, and a positive meniscus lens element 1012 convex to the object side; the second lens group 102 is constituted of a biconvex positive lens element 1021, and a negative meniscus lens element 1022 convex to the object side; and the third lens group 103 is constituted merely of a positive meniscus lens element 1031 convex to the object side. An optical diaphragm 104 is arranged on the object side of the second lens group 102. The image sensor 105 is arranged on the image side of the zoom optical system 100 by way of a low-pass filter 106. In the zoom optical system 100 having the above arrangement, an optical image of the subject H is guided along an optical axis AX toward the light receiving surface of the image sensor 105 with a proper zoom ratio, whereby the optical image of the subject H is captured by the image sensor 105.

In the embodiment of the invention, the zoom optical system 100 having the above arrangement has a feature that the positive lens element (in the example of FIG. 1, the positive meniscus lens element 1031) in the third lens group 103 or in a lens group closer to the image side than the third lens group 103 is made of a high dispersive material satisfying a relation: vp<40 where vp is a minimum value of the Abbe number, as shown in the aforementioned conditional expression (1). With this arrangement, even if the optical power of the second lens group 102 is increased to miniaturize the zoom optical system 100, magnification chromatic aberration at the telephoto end can be sufficiently corrected. Preferably, the minimum value vp of the Abbe number satisfies the following conditional expression (1)' to sufficiently correct the magnification chromatic aberration even in use of an image sensor with a high pixel resolution and an extremely small pixel pitch as the image sensor 105:

$$vp<32 \tag{1}'$$

Setting the minimum value vp of the Abbe number smaller than 32 enables to perform an imaging operation with a sufficiently large contrast, without likelihood that correction of magnification chromatic aberration may be insufficient, even in use of the image sensor 105 with a high number of pixels and an extremely small pixel pitch.

In the following, preferred arrangements on the first through the third lens groups 101 through 103, arrangements of the other lens group i.e. a fourth lens group, and preferred arrangements concerning the entirety of the zoom optical system 100 are described one by one.

(First Lens Group 101)

As shown in FIG. 1, preferably, the first lens group 101 is constituted, in the order from the object side, the biconcave negative lens element 1011 and the positive meniscus lens element 1012 convex to the object side. Alternatively, a negative meniscus lens element convex to the object side may be provided, in place of the biconcave negative lens element 1011. With the lens arrangement as mentioned above, a back focus distance at the wide angle end can be easily secured, and astigmatism or magnification chromatic aberration of an off-axis ray at a wide angle of view can be desirably corrected. Also, arranging the positive meniscus lens element 1012 convex to the object side enables to desirably correct astigmatism, thereby improving the quality of an image.

Preferably, the first lens group 101 includes a cemented lens element (in the example of FIG. 1, the negative lens element 1011 and the positive meniscus lens element 1012 are cemented to each other). Including the cemented lens element in the first lens group 101 is advantageous in remarkably reducing decentering error sensitivity of each lens surface in the first lens group 101, and maintaining sensitivity balance in an intended condition even in need of adjustment between lens elements. Further, the lens barrel arrangement of the first lens group 101 can be simplified.

Preferably, the first lens group 101 satisfies the following conditional expressions (10) and (11):

$$1.5<|f1/fw|<3.5 \tag{10}$$

$$0.5<|f1/ft|<1.5 \tag{11}$$

where f1: a composite focal length of the first lens group fw: a composite focal length of the entirety of the optical system at the wide angle end ft: a composite focal length of the entirety of the optical system at the telephoto end If |f1/fw| and |f1/ft| are over the upper limits in the conditional expressions (10) and (11), respectively, particularly, correction of astigmatism or distortion aberration at the wide angle end is insufficient. On the other hand, if |f1/fw| and |f1/ft| are under the lower limits in the conditional expressions (10) and (11), respectively, the power of each lens element constituting the first lens group 101 may be unduly increased, which makes it difficult to produce an intended zoom optical system. In addition, correction of magnification chromatic aberration may be insufficient.

Preferably, the first lens group 101 satisfies the following conditional expressions (10)' and (11)':

$$1.8<|f1/fw|<3.0 \tag{10}'$$

$$0.6<|f1/ft|<1.2 \tag{11}'$$

If |f1/fw| and |f1/ft| are over the upper limits in the conditional expressions (10)' and (11)', respectively, the negative optical power of the first lens group 101 is weakened, which may increase the diameter of the forwardmost lens element. On the other hand, if |f1/fw| and |f1/ft| are under the lower limits in the conditional expressions (10)' and (11)', respectively, particularly, error sensitivity of the first lens group 101 at the telephoto end is increased, which may require an adjustment between lens elements.

(Second Lens Group 102)

As shown in the following conditional expression (4), preferably, the second lens group 102 satisfies the following relation:

$$0.7<f2/fw<2.0 \tag{4}$$

where f2 is a composite focal length of the second lens group 102, and fw is a composite focal length of the entirety of the optical system at the wide angle end. With this arrangement, an intended zoom ratio can be obtained, while securing miniaturization of the zoom optical system 100. Particularly preferably, the second lens group 102 satisfies the requirement represented by the following conditional expression (4)'.

$$0.8<f2/fw<1.8 \tag{4}'$$

If f2/fw is over the upper limit in the conditional expression (4)', the power of the second lens group 102 is weakened. As a result, the moving amount of the second lens group 102 necessary for zooming is increased, which may increase the entire length of the optical system. On the other hand, if f2/fw is under the lower limit in the conditional expression (4)', decentering error sensitivity of the second lens group 102 is increased, which may necessitate an adjustment between lens elements, thereby increasing the production cost.

Preferably, the second lens group 102 satisfies the following conditional expression (7), in the case where the second lens group 102 is constituted of a positive lens element and a negative lens element in this order from the object side, as exemplified by the arrangement shown in FIG. 1, in which the second lens group 102 is constituted of the biconvex positive lens element 1021 and the negative meniscus lens element 1022 convex to the object side:

$$0.7<|f2n/f2p|<1.8 \tag{7}$$

where f2n is a focal length of the negative lens element in the second lens group 102, and ftp is a focal length of the positive lens element in the second lens group 102. Particularly preferably, the second lens group 102 satisfies the requirement represented by the following conditional expression (7)':

$$0.9<|f2n/f2p|<1.5 \tag{7}'$$

If |f2n/f2p| is over the upper limit or under the lower limit in the conditional expression (7)', the powers of the negative lens element and the positive lens element may be unduly increased in an attempt to correct spherical aberration, axial chromatic aberration, or magnification chromatic aberration. As a result, production error sensitivity may be increased, thereby lowering productivity.

Preferably, the second lens group 102 satisfies the following conditional expression (12):

$$0.3 < f2/ft < 0.9 \tag{12}$$

If f2/ft is over the upper limit in the conditional expression (12), the power of the second lens group 102 is weakened, which may make it difficult to obtain a zoom ratio of about two to three times. On the other hand, if f2/ft is under the lower limit in the conditional expression (12), error sensitivity of the second lens group 102 is unduly increased, which may make it difficult to produce an intended optical system.

Particularly preferably, the second lens group 102 satisfies the requirement represented by the following conditional expression (12)':

$$0.4 < f2/ft < 0.8 \tag{12'}$$

If f2/ft is over the upper limit in the conditional expression (12)', the power of the second lens group 102 is weakened. As a result, the moving amount of the second lens group 102 required for zooming is increased, thereby increasing the entire length of the optical system, which may hinder miniaturization. On the other hand, if f2/ft is under the lower limit in the conditional expression (12)', decentering error sensitivity of the second lens group 102 is increased, which may necessitate an adjustment between lens elements, thereby increasing the production cost.

Preferably, the second lens group 102 includes a cemented lens element (in the example of FIG. 1, the biconvex positive lens element 1021 and the negative meniscus lens element 1022 are cemented to each other). Including the cemented lens element in the second lens group 102 is advantageous in remarkably reducing error sensitivity of each lens surface in the second lens group 102, and simplifying the lens barrel arrangement of the second lens group 102.

Further preferably, at least one surface of the positive lens element in the second lens group 102 (in the example of FIG. 1, the biconvex positive lens element 1021) has an aspherical shape. This arrangement enables to desirably correct spherical aberration and coma aberration resulting from increase of the power of the second lens group 102 by miniaturization.

(Third Lens Group 103)

As shown in the following conditional expression (2), the positive lens element satisfying the conditional expression (1), which is included in the third lens group 103 or included in the lens group closer to the image side than the third lens group 103, in other words, the positive meniscus lens element 1031 shown in FIG. 1, uses a high refractive glass material satisfying the following conditional expression (2):

$$Npg > 1.7 \tag{2}$$

where Npg is a refractive index of d-ray. This arrangement enables to reduce a difference in incident angle with respect to the image sensor 105 between the wide angle end and the telephoto end, thereby making it easy to produce the zoom optical system.

The positive meniscus lens element 1031 can be made of a resin material. In this case, it is desirable to use a resin material having a refractive index satisfying the following conditional expression (3):

$$Npp > 1.55 \tag{3}$$

where Npp is a refractive index of d-ray with respect to the positive lens element made of the resin material. This arrangement enables to configure the zoom optical system 100 capable of sufficiently correcting magnification chromatic aberration or the like.

The principal point position of the lens element can be set away from the imaging plane by shaping the positive lens element satisfying the conditional expression (1) into the positive meniscus lens element 1031 convex to the object side as shown in FIG. 1. Thereby, the incident angle of the incident ray with respect to the imaging plane can be reduced. Thus, this arrangement is advantageous in microminiaturizing the zoom optical system 100.

As shown in the following conditional expression (8), preferably, the positive meniscus lens element 1031 satisfies the following requirement:

$$0.05 < |\Delta Zpi/di| < 0.25 \tag{8}$$

where $\Delta Zpi$ is an amount of aspherical sag, at a maximum effective radius, of an image-side lens surface of the positive lens element having the Abbe number satisfying the conditional expression (1), and di is the maximum effective radius of the image-side lens surface of the positive lens element having the Abbe number. This enables to optimize a plane angle at a periphery of the lens element and suppress lowering of a peripheral illuminance.

As shown in the following conditional expression (9), preferably, the positive meniscus lens element 1031 satisfies the following requirement:

$$1 < fp/fw < 8 \tag{9}$$

where fp is a focal length of the positive lens element having the Abbe number satisfying the conditional expression (1) in the aspect of sufficiently correcting magnification chromatic aberration. Particularly preferably, the positive meniscus lens element 1031 satisfies the requirement represented by the following conditional expression (9)':

$$4 < fp/fw < 7 \tag{9'}$$

If fp/fw is over the upper limit in the conditional expression (9)', an aspherical surface is essentially required to bring an incident angle of an incident ray with respect to the imaging plane closer to a telecentric state. Also, the amount of aspherical sag may be increased, thereby increasing the production cost. On the other hand, if fp/fw is under the lower limit in the conditional expression (9)', a difference in incident angle with respect to the imaging plane between the wide angle end and the telephoto end may be increased, which may lower a peripheral illuminance.

In this section, the amount of aspherical sag defined in the above is described referring to FIG. 2. Now, let it be assumed that the optical axis direction corresponds to a horizontal axis, the lens radial direction corresponds to a vertical axis, and an intersection between the horizontal axis and the vertical axis corresponds to a vertex "a" on a lens surface. Also, let it be assumed that p1 represents a curve of a spherical surface, p2 represents a curve of an aspherical surface, and "r" represents a maximum effective radius of a lens element constituted of the spherical surface and the aspherical surface. Then, the amount of spherical sag (sag/sagitta) corresponds to an optical axis distance between the vertex "a" of the lens surface, and a point on the curve p1 of the spherical surface with respect to the maximum effective radius "r". The amount of aspherical sag is a parameter representing a difference between the amount of spherical sag, and an optical axis distance from the vertex "a" of the lens surface to a point on the curve p2 of the aspherical surface with respect to the maximum effective radius "r".

Preferably, the positive meniscus lens element 103 satisfies the requirement represented by the following conditional expression (13).

$$0.5 < fp/ft < 2.5 \quad (13)$$

If fp/ft is over the upper limit in the conditional expression (13), correction of magnification chromatic aberration may be insufficient. On the other hand, if fp/ft is under the lower limit in the conditional expression (13), correction of magnification chromatic aberration may be excessive. In both of the cases, image quality in a peripheral portion of the lens element may be degraded.

The positive meniscus lens element 1031 may have at least one aspherical surface. Providing the aspherical surface allows for sufficient correction of astigmatism/distortion aberration, despite a slight disadvantage in terms of production cost. Further, latitude in adjusting the incident angle of an optical image with respect to the image sensor 105 can be increased, and a difference in incident angle with respect to the image sensor 105 between the wide angle end and the telephoto end can be reduced, which enables to obtain an image with less likelihood that a peripheral portion may have an unduly small light amount.

(Various Preferred Arrangements on Zoom Optical System)

Figure 3:
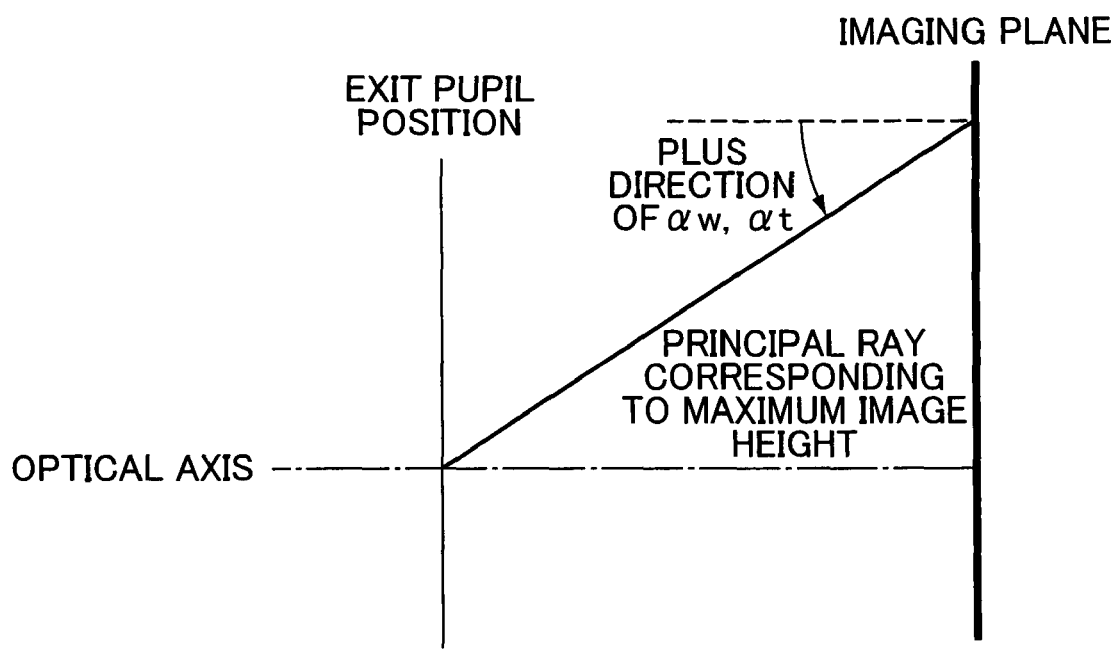
FIG. 3 is a diagram showing a definition on an incident angle of a principal ray with respect to an imaging plane.

As shown in the following conditional expressions (5) and (6), preferably, the zoom optical system 100 satisfies the following relation:

$$0 < \alpha w < 30 \quad (5)$$

$$|\alpha w - \alpha t| < 20 \quad (6)$$

where αw is an angle (deg) of a principal ray, at a maximum image height, of incident rays onto an imaging surface of the image sensor 105 with respect to a normal to the imaging plane at the wide angle end; and αt is an angle (deg) of a principal ray, at the maximum image height, of the incident rays onto the imaging surface with respect to the normal to the imaging plane at the telephoto end. The angles αw (deg), αt (deg) are defined based on a premise that the direction shown in FIG. 3 is a plus direction. Specifically, assuming that the left side in FIG. 3 is an object side, and the right side in FIG. 3 is an image side, it is defined that the angle of a principal ray in the case where the exit pupil position is on the object side with respect to the imaging plane is in the plus direction.

Particularly preferably, the zoom optical system 100 satisfies the requirement represented by the following conditional expression (5)':

$$10 < \alpha w < 25 \quad (5)'$$

If αw is over the upper limit in the conditional expression (5)', use of a high-pixel image sensor is difficult to maintain the peripheral illuminance in an intended condition. This is because in use of image sensors of the same size, as the pixel number is increased, the pixel pitch is reduced, and the aperture efficiency is lowered, which makes it difficult to secure adequate telecentricity. On the other hand, if αw is under the lower limit in the conditional expression (5)', it is difficult to secure miniaturization.

Particularly preferably, the zoom optical system 100 satisfies the requirement represented by the following conditional expression (6)':

$$|\alpha w - \alpha t| < 15 \quad (6)'$$

If |αw−αt| is over the upper limit in the conditional expression (6)', use of a high-pixel image sensor is difficult to maintain peripheral illuminance both at the wide angle end and the telephoto end in an intended condition. This is because in use of image sensors of the same size, as the pixel number is increased, the pixel pitch is reduced, and the aperture efficiency is lowered, which makes it difficult to secure adequate telecentricity.

Preferably, the zoom optical system 100 satisfies the following conditional expression (14).

$$0.1 < Y'/TL < 0.3 \quad (14)$$

where Y': a maximum image height

TL: a maximum value of an optical axis distance from a vertex on a lens surface closest to the object side to the imaging plane in the entire zoom range If Y'/TL is over the upper limit in the conditional expression (14), the power of the second lens group 102 is unduly increased, because the moving amount of the second lens group 102 for zooming is decreased. As a result, it is difficult to satisfy the production requirements such as radius of curvature of each lens element constituting the second lens group 102. On the other hand, if Y'/TL is under the lower limit in the conditional expression (14), it is difficult to mount the zoom optical system in a mobile phone or a like device, considering the size constraints.

Particularly preferably, the zoom optical system 100 satisfies the following conditional expression (14)':

$$0.13 < Y'/TL < 0.2 \quad (14)'$$

If Y'/TL is over the upper limit in the conditional expression (14)', the power of the second lens group 102 is unduly increased, which may increase error sensitivity in the second lens group 102. As a result, adjustment between lens elements is required, which may increase the production cost. On the other hand, if Y'/TL is under the lower limit in the conditional expression (14)', not only the size of the optical system but also a load of a driving member resulting from an increase in moving amount in zooming is increased. As a result, the size of the driving device may be increased.

Preferably, the zoom optical system 100 satisfies the following conditional expression (15):

$$0.2 < t2/TL < 0.4 \quad (15)$$

where t2 is a distance required for the second lens group to move in zooming from the wide angle end to the telephoto end.

If t2/TL is over the upper limit in the conditional expression (15), it is difficult to secure a space for installing a mechanical shutter which is effective in preventing smear. Also, the lens barrel arrangement may be complicated in order to avoid contact among driving members, which may resultantly increase the production cost. On the other hand, if t2/TL is under the lower limit in the conditional expression (15), decentering error sensitivity of the second lens group 102 is increased, which may make it difficult to produce an intended zoom optical system.

Preferably, the zoom optical system 100 satisfies the following conditional expression (16):

$$Lb/fW < 2 \quad (16)$$

where Lb is an optical axis distance (length in terms of air) from a vertex on a lens surface which is closest to the image sensor and which has an optical power to the surface of the image sensor at the telephoto end.

If Lb/fW is over the upper limit in the conditional expression (16), it is required to increase the negative optical power of the first lens group 101 to secure a long back focus distance, which may increase the curvature of the negative lens element in the first lens group 101 and make it difficult to produce an intended zoom optical system.

One of the most preferred lens arrangements in the embodiment of the invention is, as shown in FIG. 1, the zoom optical system 100 constituted merely of the first through the third lens groups 101 through 103, wherein the third lens group 103 is constituted of a single positive lens element i.e. the positive meniscus lens element 1031. Thus, the zoom optical system 100 can be miniaturized, as compared with the other zoom optical system, by minimizing the number of lens groups or the number of lens elements. In the three-component zoom optical system of negative-positive-positive arrangement, the third lens group 103 can be relatively easily constituted of a single lens element, because the third lens group 103 has a smaller optical power than the first lens group 101 or the second lens group 102. If the above lens arrangement is adopted, it is desirable to fix the third lens group 103 in zooming from the wide angle end to the telephoto end. The lens barrel mechanism can be simplified, and the position precision of the lens elements can be improved by fixing the third lens group 103 in zooming.

Preferably, in the zoom optical system 100, the first lens group 101 and the second lens group 102 each is constituted of three or less lens elements. With this arrangement, it is possible to reduce the load of the driving device for driving the first lens group 101 whose outer diameter is generally inherently large, and for driving the second lens group whose moving amount in zooming is large. This enables to reduce the production cost by decreasing the number of lens elements. The zoom optical system 100 shown in FIG. 1 has a preferred lens arrangement for this reason as well as the aforementioned reasons.

As shown in the zoom optical system 100 of FIG. 1, it is desirable to arrange the optical diaphragm 104 i.e. an aperture stop on the object side of the second lens group 102, and to fix the aperture diameter of the optical diaphragm 104. First, the diameter of the forwardmost lens element in the first lens group 101 can be maximally reduced by arranging the optical diaphragm 104 on the object side of the second lens group 102. Further, there is no need of increasing the interval between the first lens group 101 and the second lens group 102 beyond a required amount by fixing the aperture diameter, which enables to reduce the thickness of the zoom optical system 100 in the optical axis direction.

Next, concerning the focusing arrangement of the zoom optical system 100, it is desirable to allow focusing from an infinite object distance to a close object distance by moving the first lens group 101 to the object side. This is because the above arrangement enables to suppress performance degradation by focusing, considering an advantage that the change in various aberrations resulting from moving the first lens group 101 is relatively small. Also, since large back focus change relative to the moving amount of the first lens group 101 is secured, it is possible to obtain desirable focusing performance up to a position close to the lens element by about several centimeters with a less moving amount.

Preferably, focusing from an infinite object distance to a close object distance is performed by moving the third lens group 103 to the object side. This arrangement enables to obtain a clear image up to the close object distance without likelihood that the entire length of the optical system by protrusion of a lens barrel, or the diameter of the forwardmost lens element may be unduly increased. Judgment as to whether the first lens group 101 or the third lens group 103 is to be moved in focusing is determined depending on the optical specifications of the zoom optical system 100. Specifically, the first lens group 101 is moved in activating the macro function, and the third lens group 103 is moved in prioritizing miniaturization of the zoom optical system 100.

(Arrangement having Fourth Lens Group)

Preferably, the zoom optical system 100 has one or more lens groups closer to the image side than the third lens group 103. For instance, the zoom optical system 100 may have a fourth lens group (not shown in FIG. 1) which has one or more lens elements and which is arranged between the third lens group 103 and the low-pass filter 106.

For instance, the zoom optical system is configured into a four-component zoom optical system 100 of negative-positive-negative-positive arrangement, wherein the third lens group 103 has a negative optical power, and the fourth lens group has a positive optical power. In this arrangement, axial chromatic aberration can be sufficiently corrected by the third lens group 103 having a negative optical power. This enables to enhance the contrast at the center of a captured image on a display screen. Also, intended optical performance with respect to a close object can be easily secured by providing the fourth lens group.

In the four-component zoom optical system 100 of negative-positive-negative-positive arrangement, it is desirable to provide a positive lens element having the Abbe number satisfying the conditional expression (1) in the fourth lens group. The fourth lens group closer to the image side is located at such a position that the principal ray height of an off-axis ray is set high. Using the positive lens element having the Abbe number as the positive lens element in the fourth lens group is advantageous in correcting magnification chromatic aberration. In this case, preferably, the fourth lens group is constituted of a positive lens element. In the four-component zoom optical system, since the fourth lens group has a smaller optical power than the first lens group 101 or the second lens group 102, it is relatively easy to constitute the fourth lens group of a single lens element. This is further advantageous in miniaturizing the zoom optical system 100.

Preferably, in the four-component zoom optical system 100 of negative-positive-negative-positive arrangement, the fourth lens group is fixed in zooming from the wide angle end to the telephoto end. The lens barrel mechanism can be simplified, and the position precision of the lens elements can be improved by fixing the fourth lens group in zooming. Preferably, the first lens group 101 is fixed in zooming from the wide angle end to the telephoto end. The first lens group 101 whose outer diameter is inherently large greatly affects the dimensions of the zoom optical system 100. Therefore, fixing the first lens group 100 in zooming is advantageous in simplifying the lens barrel mechanism, which is advantageously effective in miniaturizing the zoom optical system 100 in length, width, and thickness directions.

In the four-component zoom optical system 100 of negative-positive-negative-positive arrangement, it is particularly desirable to fix both of the first lens group 101 and the fourth lens group 104 in zooming from the wide angle end to the telephoto end. With this arrangement, the weight of the lens groups to be driven in zooming with use of the four-component zoom optical system 100 can be maximally reduced. This allows for use of a small-sized driving device as a zoom mechanism, which is further advantageous in miniaturizing the zoom optical system as a lens unit.

The zoom optical system 100 provided with the fourth lens group can be configured into a four-component zoom optical system 100 of negative-positive-positive-negative arrangement, wherein the third lens group 103 has a positive optical power, and the fourth lens group has a negative optical power. In this arrangement, the incident angle of the incident ray with respect to the light receiving surface of the image sensor 105 disposed on the imaging plane is allowed to have adequate telecentricity by providing the third lens group 103 having a positive optical power. Also, intended optical performance with respect to a close object can be easily secured by providing the fourth lens group.

Preferably, in the four-component zoom optical system 100 of negative-positive-positive-negative arrangement, a positive lens element having the Abbe number satisfying the aforementioned conditional expression (1) is provided in the third lens group 103. The third lens group 103 relatively close to the image side is located at such a position that the principal ray height of an off-axis ray is set high. Using the positive lens element having the Abbe number as the positive lens element in the third lens group 103 is advantageous in correcting magnification chromatic aberration. In this case, preferably, the third lens group 103 is constituted of a single positive lens element. In the four-component zoom optical system 100, since the third lens group 103 has a smaller optical power than the first lens group 101 or the second lens group 102, it is relatively easy to constitute the third lens group 103 of a single lens element. This is further advantageous in miniaturizing the zoom optical system 100.

Similarly to the reason as described in the example concerning the negative-positive-negative-positive arrangement, in the four-component zoom optical system 100 of negative-positive-positive-negative arrangement, preferably, the fourth lens group, or the first lens group 101, or both of the fourth lens group and the first lens group 101 is fixed in zooming from the wide angle end to the telephoto end.

(Other Arrangement on Zoom Optical System)

Concerning a process for manufacturing the zoom optical system 100, there is no specific constraint on the material of each lens element constituting the first through the third lens group 101 through 103 (and the fourth lens group). Various glass materials or resin (plastic) materials may be used, as far as the optical material satisfies the requirements concerning the minimum value vp of the Abbe number. Use of a resin material, however, is advantageous in suppressing the production cost or reducing the weight of the zoom optical system 100, because the resin material is lightweight, and mass production of the resin material is feasible by injection molding or a like process.

In the case where at least two lens elements made of a resin material are used, it is desirable to form the negative lens element in the first lens group 101 i.e. the negative lens element 1011 in FIG. 1, and the positive lens element satisfying the conditional expression (1) i.e. the positive meniscus lens element 1031 of the resin material. This arrangement enables to suppress back focus error accompanied by ambient temperature change.

In the case where an aspherical glass lens element is used in the zoom optical system 100, the aspherical glass lens element may be produced by molding, or by combining a glass material and a resin material. The molded lens element can be mass-produced, but the kind of glass material to be used in the molded lens element is limited. The composite glass/resin lens element has advantages that there are many kinds of glass material to be used as a substrate, and design latitude is high. Generally, it is difficult to produce an aspherical lens element using a high refractive material by molding. Accordingly, the advantages of the composite lens element can be maximally utilized by producing a lens element having a single aspherical surface.

Preferably, in the zoom optical system 100, all the lens surfaces facing the air are aspherical. This arrangement enables to miniaturize the zoom optical system 100 while attaining high-quality performance.

Preferably, the zoom optical system 100 has a mechanical shutter having a function of blocking light from the image sensor 105, in place of the optical diaphragm 104. The mechanical shutter is effective in preventing smear in the case where a CCD (Charge Coupled Device) sensor is used as the image sensor, for instance.

A conventional well-known cam mechanism or stepping motor may be used as a drive source for driving the lens groups, the diaphragm, the shutter, or a like member provided in the zoom optical system 100. In the case where the moving amount is small, or the weight of the driving members is light, use of a microminiaturized piezoelectric actuator enables to drive the driving members independently of each other, while suppressing increase in volume of the driving device or electric power consumption, which is further advantageous in miniaturizing an imaging lens device incorporated with the zoom optical system 100.

One of the most preferred lens arrangements in the embodiment of the invention is the zoom optical system 100, as shown in FIG. 1, which is constituted of the first lens group 101, the second lens group 102, and the third lens group 103 in this order from the object side, wherein the first lens group 101 is constituted of the negative lens element i.e. the negative lens element 1011, and the positive meniscus lens element convex to the object side i.e. the positive meniscus lens element 1012, the second lens group 102 is constituted of the biconvex lens element i.e. the biconvex positive lens element 1021, and the negative lens element i.e. the negative meniscus lens element 1022, and the third lens group 103 is constituted of the positive lens element i.e. the positive meniscus lens element 1031. Specifically, the principal point position of the second lens group 102 can be approximated to the first lens group 101 by arranging the positive lens element and the negative lens element in the second lens group 102 in this order from the object side. This enables to reduce the substantial power of the second lens group 102 while keeping the zoom function, thereby enabling to reduce error sensitivity. Also, the power of the second lens group 102 can be increased by arranging the biconvex lens element in the second lens group 102. This enables to reduce the moving amount of the second lens group 102 in zooming. Further, constituting the third lens group 103 of the positive lens element is advantageous in approximating the incident angle of an off-axis ray onto the light receiving surface of the image sensor 105 to a telecentric state.

The image sensor 105 is adapted to photoelectrically convert an optical image of a subject H formed by the zoom optical system 100 into image signals of color components of R, G, and B in accordance with the light amount of the subject image for outputting the image signals to a predetermined image processing circuit. For instance, the image sensor 105 is a one-chip color area sensor of a so-called "Bayer matrix", in which patches of color filters each in red (R), green (G), and blue (B) are attached in a checkered pattern on respective surfaces of CCDs arrayed in two dimensions. Examples of the image sensor 105 are a CMOS image sensor, and a VMIS image sensor in addition to the CCD image sensor.

The low-pass filter 106 is a parallel-plane optical component which is disposed on the imaging surface of the image sensor 105 for removing noise components. Examples of the low-pass filter 106 are e.g. a birefringent low-pass filter made of a crystal or a like material, whose predetermined crystalline axis direction is regulated, and a phase low-pass filter for realizing required optical cutoff frequency characteristic by a diffraction effect. It is not necessarily required to provide the low-pass filter 106. Further alternatively, an infrared cutoff filter may be used to reduce noise included in an image signal from the image sensor 105, in place of the aforementioned optical low-pass filter 106. Further alternatively, the function of the birefringent low-pass filter and the function of the phase low-pass filter may be realized by a single low-pass filter by applying infrared reflective coat to a surface of the optical low-pass filter 106.

<Description on Digital Apparatus Incorporated with Zoom Optical System>

Figure 4A:
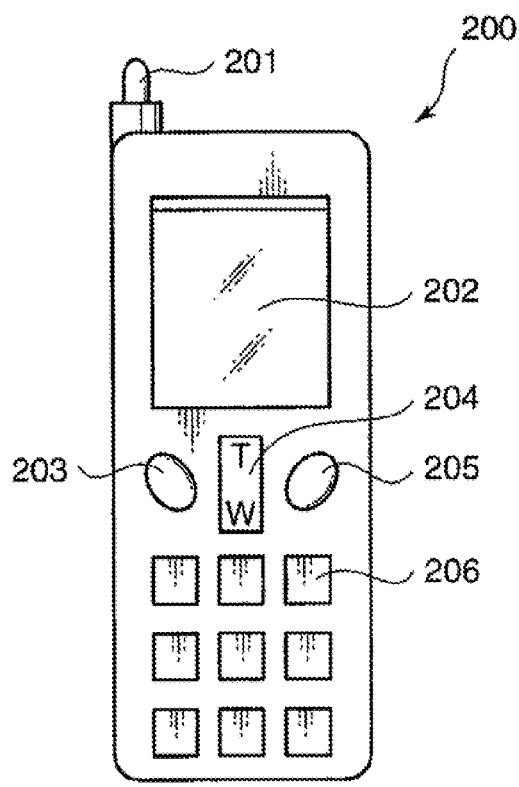
Figure 4B:
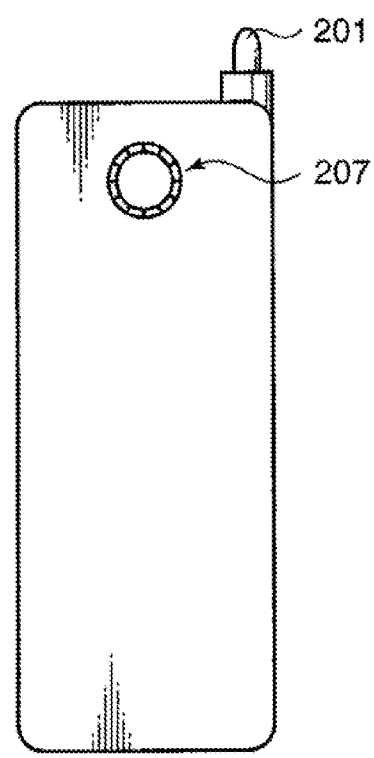

In this section, a digital apparatus incorporated with the aforementioned zoom optical system 100 is described. FIGS. 4A and 4B are diagrams showing an external appearance of a camera phone 200, as an example of a digital apparatus embodying the invention. In this embodiment, the digital apparatus includes a digital still camera, a video camera, a digital video unit, a PDA (Personal Digital Assistant), a personal computer, a mobile computer, and peripheral devices thereof such as a mouse, a scanner, and a printer. A digital still camera and a digital video camera are an imaging lens device configured in such a manner that, after an image of a subject is optically read, the subject light image is converted into an electric signal, using a semiconductor device i.e. an image sensor, for storing the electric signal as digital data into a storage medium such as a flash memory. The embodiment of the invention also includes a mobile phone, a personal digital assistant, a personal computer, a mobile computer, and peripheral devices thereof, which are incorporated with a compact imaging lens device for optically reading a still image or a moving image of a subject.

FIG. 4A is a diagram showing an operating surface of the mobile phone 200, and FIG. 4B is a diagram showing a back surface of the mobile phone 200. The mobile phone 200 has an antenna 201 at an upper part thereof, and, on the operating surface thereof, a substantially rectangular display 202, an image changeover button 203 for activating the image photographing mode, and changing over the image photographing mode between still image shooting and moving image shooting, a zoom button 204 for controlling zooming, a shutter button 205, and a dial button 206. The symbol "T" representing zooming to the telephoto end and the symbol "W" representing zooming to the wide angle end are marked on an upper part and a lower part of the zoom button 204, respectively. The zoom button 204 includes a two-contact switch which is operated in such a manner that a designated zoom is performed when the relevant marked part is depressed. The mobile phone 200 is built-in with the imaging lens device 207 incorporated with the aforementioned zoom optical system 100.

FIG. 5 is a functional block diagram showing an electric configuration relating to an imaging operation to be executed by the mobile phone 200. The mobile phone 200 includes an imaging section 10, an image generator 11, an image data buffer 12, an image processor 13, a driver 14, a controller 15, a storage 16, and an I/F 17 for imaging functions.

The imaging section 10 includes the imaging lens device 207 and the image sensor 105. The imaging lens device 207 has the zoom optical system 100 with the arrangement as shown in FIG. 1, and an unillustrated lens driving device for driving the lens elements in the optical axis direction for zooming and focusing. Light rays from a subject are formed on the light receiving surface of the image sensor 105 by the zoom optical system 100, whereby an optical image of the subject is obtained.

The image sensor 105 converts the optical image of the subject formed by the zoom optical system 100 into electric signals of color components of R (red), G (green), and B (blue) for outputting to the image generator 11 as image signals of the colors of R, G, and B. The image sensor 105 is operative to perform an imaging operation such as one of still image sensing operation and moving image sensing operation, or a readout operation (horizontal scanning, vertical scanning, transfer) of an output signal from each pixel in the image sensor 105 under the control of the controller 15.

The image sensor 11 performs amplification processing, digital conversion processing, or a like processing with respect to an analog output signal from the image sensor 105; and performs well-known image processing such as determination of proper black level with respect to the entirety of the image, gamma correction, white balance (WB) adjustment, contour correction, or color disparity correction to generate image data of each pixel from the image signal. The image data generated by the image generator 11 is outputted to the image data buffer 12.

The image data buffer 12 temporarily stores the image data, and is a memory to be used as a work area for allowing the image processor 13 to perform a below-mentioned processing with respect to the image data. The image data buffer 12 is e.g. constituted of an RAM (Random Access Memory).

The image processor 13 is a circuit for performing image processing such as resolution conversion with respect to the image data temporarily stored in the image data buffer 12. The image processor 13 may be so configured as to correct aberration that has not been corrected by the zoom optical system 100, according to needs. The driver 14 drives the lens groups of the zoom optical system 100 in such a manner that intended zooming and focusing are performed based on a control signal outputted from the controller 15.

The controller 15 includes e.g. a microprocessor, and controls respective operations of the imaging section 10, the image generator 11, the image data buffer 12, the image processor 13, the driver 14, the storage 16, and the I/F 17. Specifically, the controller 15 controls the imaging lens device 207 and the image sensor 105 to perform at least one of still image shooting and moving image shooting for a subject.

The storage 16 is a storing circuit for storing the image data generated by the still image shooting or the moving image shooting for the subject. The storage 16 includes e.g. an ROM (Read Only Memory) or an RAM. In other words, the storage 16 has a function as a memory for still image or moving image. The I/F 17 is an interface for transmitting and receiving image data to and from an external device. The I/F 17 is an interface in conformity with the standards e.g. USB or IEEE1394.

An imaging operation to be executed by the mobile phone 200 having the above arrangement is described. First, in shooting a still image, the image photographing mode is activated by depressing the image changeover button 203. In this embodiment, depressing the image changeover button 203 one time activates the still image shooting mode, and depressing the image changeover button 203 once more in this state changes over the image photographing mode to the moving image shooting mode. In other words, in response to receiving a command from the image changeover button 203, the controller 15 in the main body of the mobile phone 200 causes the imaging lens device 207 and the image sensor 105 to perform at least one of still image shooting and moving image shooting for a subject located on the object side.

When the still image shooting mode is activated, the controller 15 controls the imaging lens device 207 and the image sensor 105 to perform still image shooting, and also drives the unillustrated lens driving device in the imaging lens device 207 for focusing. Thereby, an optical image of the subject in a focus state is cyclically formed on the light receiving surface of the image sensor 105 for conversion into image signals of color components of R, G, and B. Thereafter, the image signals are outputted to the image generator 11. The image signals are temporarily stored in the image data buffer 12 for image processing in the image processor 13. After the image processing, the processed image data is transferred to a memory (not shown) for the display 202 so that an image is displayed on the display 202. The photographer is allowed to view the display 202 and adjust the position of the displayed image in such a manner that the main subject image is located in an intended position within the display screen. When the photographer depresses the shutter button 205 in this state, a still image can be acquired. In other words, image data is stored in the storage 16 as a memory for still image.

In the above operation, if the subject is located away from the photographer, or the photographer wishes to obtain an enlarged image of the subject nearby, and accordingly, zoom shooting is carried out, the photographer depresses the upper part of the zoom button 204 where the symbol "T" is marked. Then, the controller 15 is operative to drive the lens groups for zooming in accordance with a depressed time, thereby causing the zoom optical system 100 to continuously zoom the image. If the photographer wishes to reduce the magnification of the subject image because of excessive zooming or a like condition, the photographer depresses the lower part of the zoom button 204 where the symbol "W" is marked. Then, the controller 15 controls the zoom optical system 100 to continuously zoom the image in accordance with a depressed time. In this way, the photographer is allowed to adjust the magnification by using the zoom button 204, even if the subject is away from the photographer. Similarly to normal photographing with the same magnification, an enlarged still image can be obtained by adjusting the position of the displayed image in such a manner that the main subject image is located in an intended position within the display screen, and by depressing the shutter button 205 in this state.

In performing moving image shooting, after the still image shooting mode is activated by depressing the image changeover button 203 one time, the image photographing mode is changed over to the moving image shooting mode by depressing the image changeover button 203 once again in this state. Thereby, the controller 15 controls the imaging lens device 207 and the image sensor 105 to perform moving image shooting. Thereafter, similarly to the operation to be executed in the still image shooting mode, the photographer is allowed to view the display 202 and adjust the position of the displayed image in such a manner that the subject image obtained through the imaging lens device 207 is located in an intended position within the display screen. Similarly to the operation to be executed in the still image shooting mode, the photographer is allowed to adjust the magnification of the subject image by using the zoom button 204. The moving image shooting is started in response to depressing the shutter button 205 in this state. During the moving image shooting, the photographer is allowed to desirably change the magnification of the subject image by manipulating the zoom button 204.

In performing the moving image shooting, the controller 15 controls the imaging lens device 207 and the image sensor 105 to perform moving image shooting, and is operative to drive the unillustrated lens driving device in the imaging lens device 207 for focusing. Thereby, an optical image in a focus state is cyclically formed on the light receiving surface of the image sensor 105 such as a CCD sensor for conversion into image signals of color components of R, G, and B. Thereafter, the image signals are outputted to the image generator 11. The image signals are temporarily stored in the image data buffer 12 for image processing in the image processor 13. Thereafter, the processed image data is transferred to the memory for the display 202 so that an image is displayed on the display 202. The moving image shooting is ended by depressing the shutter button 205 again in this state. The acquired moving image is sent to the storage 16 as a memory for moving image for storing the moving image data.

<Description on Examples of Zoom Optical System>

In the following, examples of the zoom optical system 100 as shown in FIG. 1, specifically, the zoom optical system 100 incorporated with the imaging lens device 207 to be mounted in the camera phone 200, as shown in FIGS. 4A and 4B, is described referring to the drawings.

Example 1

Figure 6:
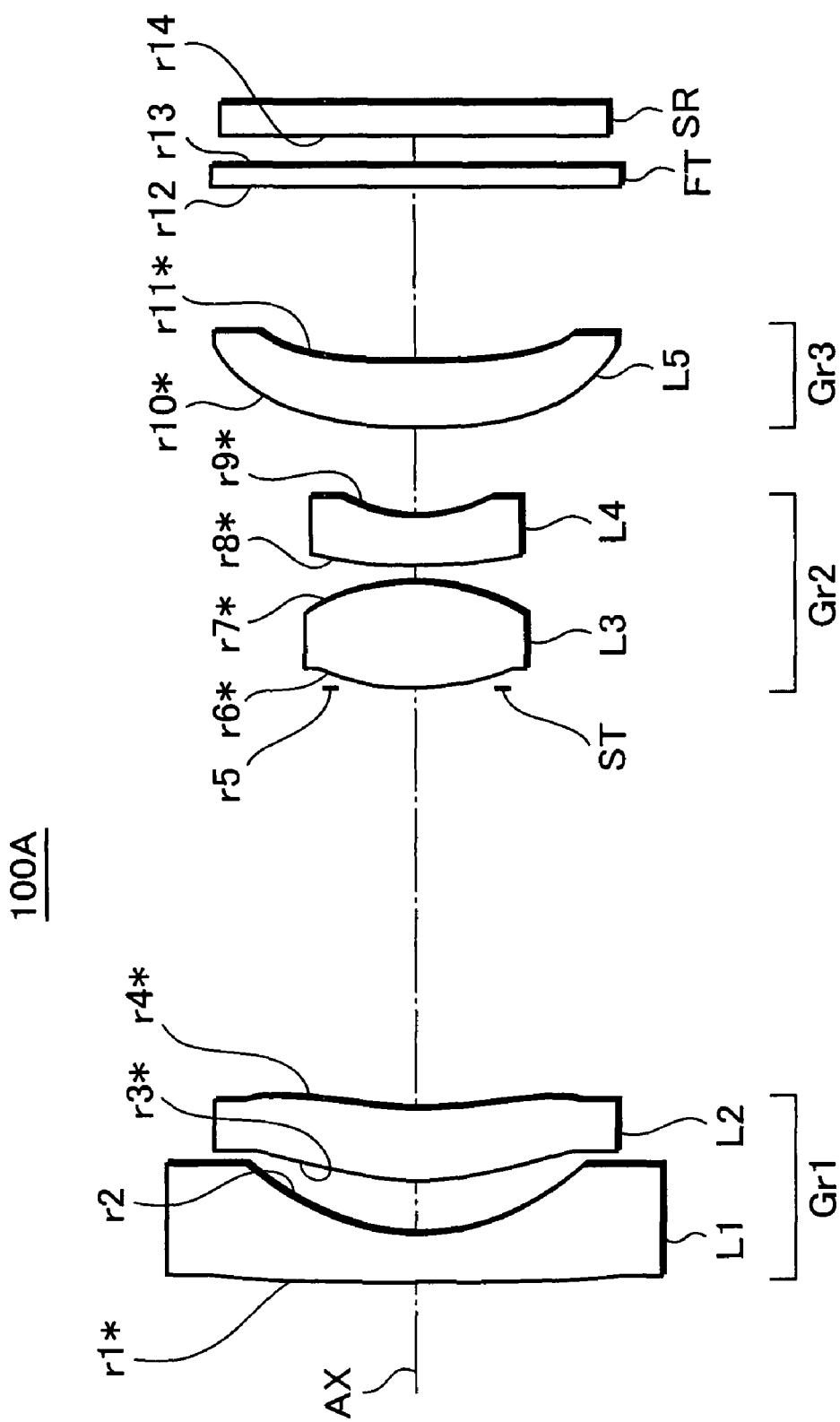
FIG. 6 is a cross-sectional view showing an optical path diagram at a wide angle end in a zoom optical system as Example 1 of the invention.

FIG. 6 is a cross-sectional view i.e. an optical path diagram, taken along the optical axis (AX), showing an arrangement of lens groups in a zoom optical system 100A as Example 1. The optical path diagrams in FIG. 6, and FIGS. 7 through 24 to be described later each shows a lens arrangement at the wide angle end (W). Throughout Example 1, and Examples 2 through 18 to be described later, the lens groups include, in this order from the object side in the drawings i.e. the left side in FIG. 6, a first lens group (Gr1) having a negative optical power as a whole, a second lens group (Gr2) having a positive optical power as a whole, and a third lens group (Gr3) having a positive or negative optical power as a whole. In other words, the lens arrangement is a negative dominant arrangement, in which the first lens group closest to the object side has a negative optical power.

The zoom optical system 100A in Example 1 shown in FIG. 6 has the following lens group arrangement in the order from the object side. Specifically, the first lens group (Gr1) has a negative optical power as a whole, and is constituted of a biconcave negative lens element (L1) and a positive meniscus lens element (L2) convex to the object side. The second lens group (Gr2) has a positive optical power as a whole, and is constituted of a biconvex positive lens element (L3) and a negative meniscus lens element (L4) convex to the object side. An aperture stop (ST) which is moved with the first lens group (Gr1) and the second lens group (Gr2) in zooming is provided on the object side of the second lens group (Gr2). The third lens group (Gr3) is constituted of a positive meniscus lens element (L5) which has a positive optical power and is convex to the object side. A light receiving surface of an image sensor (SR) is arranged on the image side of the third lens group (Gr3) via a plane parallel plate (FT). The plane parallel plate (FT) corresponds to an optical low-pass filter, an infrared cutoff filter, a cover glass for image sensor, or a like element.

Alternatively, a mechanical shutter may be provided in place of the aperture stop (ST). In FIG. 6, a continuously zoomable zoom optical system is described. Alternatively, a two-focal-point switching type zoom optical system having the same optical arrangements in two optical units may be employed to attain further miniaturization. In particular, in the case where the first lens group (Gr1) makes a U-turn (or the trajectory of the first lens group (Gr1) is convex toward the image side) in zooming from the wide angle end to the telephoto end, and as a result, the entire length of the optical system is substantially the same at the wide angle end and the telephoto end, use of the two-focal-point switching type zoom optical system is advantageous in miniaturizing the dimensions of the zoom optical system including a driving mechanism as a lens unit, because the first lens group (Gr1) can be fixed in zooming. These features are also applied to Examples 2 through 18 to be described later (and accordingly, repeated description thereof will be omitted in the following).

In FIG. 6, the surface denoted by the symbol ri (i=1, 2, 3, . . . ) indicates the i-th lens surface from the object side (a cemented surface constituting a cemented lens element is counted as a lens surface), and the surface ri attached with an asterisk (*) is an aspherical surface. The aperture stop (ST), both surfaces of the plane parallel plate (FT), and the light receiving surface of the image sensor (SR) are each regarded as one lens surface. The same definition is also applied to the optical path diagrams (see FIGS. 7 through 24) concerning other Examples to be described later, and the symbols in FIGS. 7 through 24 identical to those in FIG. 6 have basically the same meaning as in FIG. 6. It should be noted, however, that all the symbols have the same meaning. For instance, although the same symbol (r1) is attached to the lens surface closest to the object side throughout the drawings of FIGS. 6 through 24, this does not mean that the curvatures or a like feature of the lens surfaces attached with the symbol (r1) are identical throughout Examples.

In the above arrangement, an incident ray from the object side is transmitted through the first lens group (Gr1), the second lens group (Gr2), the third lens group (Gr3), and the parallel plane plate (FT) in this order along the optical axis AX, and forms an optical image of the object onto the light receiving surface of the image sensor (SR). Then, the image sensor (SR) converts the optical image corrected by the parallel plane plate (FT) into an electric signal. The electric signal is subjected to a predetermined processing such as digital image processing or image compression processing, according to needs. Thereafter, the processed signal is recorded in a memory of a mobile phone, a personal digital assistant, or a like device, as a digital video signal, or transmitted to other digital apparatus wiredly or wirelessly.

FIG. 43 (and FIG. 44 and FIG. 45) is a diagram showing moving directions of the lens groups in zooming. In FIG. 43 (and FIG. 44 and FIG. 45), the moving directions of lens groups in Example 2 and thereafter to be described later are also shown, as well as the moving directions of the lens groups in Example 1. Similarly to the foregoing embodiment, in FIG. 43 (and FIG. 44 and FIG. 45), the left side corresponds to the object side, and the first lens group (Gr1), the second lens group (Gr2), the third lens group (Gr3), and the fourth lens group (Gr4) are arranged in this order from the object side. In FIG. 43 (and FIG. 44 and FIG. 45), the symbol "W" represents the wide angle end where the focal length is the shortest, i.e., the angle of view is the largest, and the symbol "T" represents the telephoto end where the focal length is the longest, and the angle of view is the smallest. The symbol "M" represents the middle (hereinafter, called as "mid point") between the wide angle end (W) and the telephoto end (T). Although the actual lens groups are moved linearly along the optical axis, in FIG. 43 (and FIG. 44 and FIG. 45), the positions of the lens groups at the wide angle end (W), the mid point (M), and the telephoto end (T) are shown in the upper row, the middle row, and the lower row, respectively, in each of the illustrations.

As shown in FIG. 43, in Example 1, the first lens group (Gr1) and the second lens group (Gr2) are movable in zooming, and the third lens group (Gr3) is fixed in zooming. Specifically, in zooming from the wide angle end (W) to the telephoto end (T), the second lens group (Gr2) is linearly moved toward the object side, and the first lens group (Gr1) is moved in such a manner that the trajectory thereof is convex toward the image side. It should be noted, however, in Example 1 and below-mentioned Examples, the moving directions, the moving amounts, or the like of the lens groups are varied depending on the optical powers of the lens groups, the lens arrangement, or a like condition. For instance, in FIG. 43, although the second lens group (Gr2) is linearly moved, the movement includes a case where the trajectory of the second lens group (Gr2) is convex toward the object side or the image side, and a case where the second lens group (Gr2) makes a U-turn.

Construction data concerning the lens elements in the zoom optical system 100A in Example 1 are shown in Tables 1 and 2. Also, the values of the conditional expressions (1) through (16) in the case where the conditional expressions (1) through (16) are applied to the optical system in Example 1 are shown in Table 37 to be described later.

TABLE 1

| LENS SURFACE NO. | RADIUS OF CURVATURE (mm) | AXIAL SURFACE DISTANCE (mm) | | | REFRACTIVE INDEX | ABBE NUMBER |
| --- | --- | --- | --- | --- | --- | --- |
| | | W | M | T | | |
| 1* | −98.036 | 0.800 | | | 1.77250 | 49.77 |
| 2 | 4.251 | 0.895 | | | | |
| 3* | 5.294 | 1.248 | | | 1.80518 | 25.43 |
| 4* | 9.537 | 7.276 | 2.539 | 0.900 | | |
| 5 | ∞ | 0.000 | | | | |
| 6* | 3.445 | 1.787 | | | 1.61154 | 61.22 |
| 7* | −4.100 | 0.336 | | | | |
| 8* | 11.773 | 0.800 | | | 1.80518 | 25.43 |
| 9* | 2.471 | 1.572 | 4.875 | 7.948 | | |
| 10* | 14.714 | 1.092 | | | 1.80518 | 25.43 |
| 11* | 39.562 | 3.005 | | | | |
| 12 | ∞ | 0.300 | | | 1.51680 | 64.12 |
| 13 | ∞ | 0.540 | | | | |
| 14 | ∞ | | | | | |

TABLE 2

| LENS SURFACE NO. | CONICAL COEFFICIENT | ASPHERICAL COEFFICIENT | | | |
| --- | --- | --- | --- | --- | --- |
| | | A | B | C | D |
| 1 | 0 | 1.14E−03 | 2.74E−06 | −9.09E−07 | 0.00E+00 |
| 3 | 0 | −1.25E−03 | −5.22E−04 | −7.06E−06 | 1.80E−06 |
| 4 | 0 | −4.04E−04 | −9.03E−04 | 6.83E−05 | −1.75E−06 |
| 6 | 0 | −4.99E−03 | −1.75E−03 | 1.75E−04 | −1.15E−04 |

TABLE 2-continued

| LENS SURFACE NO. | CONICAL COEFFICIENT | ASPHERICAL COEFFICIENT | | | |
|---|---|---|---|---|---|
| | | A | B | C | D |
| 7 | 0 | 9.84E−03 | −4.93E−03 | 6.51E−04 | −3.66E−05 |
| 8 | 0 | −2.17E−04 | −1.74E−03 | 3.96E−05 | 2.29E−04 |
| 9 | 0 | −8.65E−03 | 3.36E−03 | −1.29E−03 | 5.76E−04 |
| 10 | 0 | 5.64E−03 | −1.06E−04 | −3.89E−06 | 1.48E−06 |
| 11 | 0 | 6.42E−03 | 2.30E−04 | −7.18E−05 | 7.34E−06 |

Table 1 indicates, from the left-side column thereof, the lens surface numbers, radii of curvature (unit: mm) of the respective lens surfaces, distances i.e. axial surface distances (unit: mm) between the lens surfaces in the optical axis direction at the wide angle end (W), the mid point (M), and the telephoto end (T) in an infinite focal state, refractive indices of the respective lens elements, and the Abbe numbers of the respective lens elements. The value in each blank column regarding the axial surface distance at the mid point (M) and the telephoto end (T) is the same as that in the corresponding left-side column at the wide angle end (W). As shown in FIG. 6, the surface denoted by the symbol ri (i=1, 2, 3, . . . ) indicates the i-th lens surface from the object side on the optical path, and the surface ri attached with an asterisk (*) is an aspherical surface, namely, a refractive optical plane of an aspherical configuration or a plane having a refractive power substantially equivalent to the action of an aspherical plane. Since the aperture stop (ST), both surfaces of the plane parallel plate (FT), and the light receiving surface of the image sensor (SR) are flat, respective radii of curvature thereof are infinite (∞).

The aspherical configuration of the optical plane is defined by the following conditional expression, wherein a vertex on the lens surface is represented as the point of origin, and a local orthogonal coordinate system (x, y, z) is used, with the direction from the object toward the image sensor being the plus direction of the z-axis.

$$z = \frac{c \cdot h^2}{1 + \sqrt{1 - (1+k)c^2 \cdot h^2}} + A \cdot h^4 + B \cdot h^6 + C \cdot h^8 + D \cdot h^{10} + E \cdot h^{12} + F \cdot h^{14} \quad (17)$$

z: a z-axis displacement at the height position h relative to the vertex on the lens surface, h: a height in a direction perpendicular to the z-axis ($h^2 = x^2 + y^2$), c: a paraxial curvature (=1/radius of curvature), A, B, C, D, E, F: aspherical coefficients of 4th, 6th, 8th, 10th, 12th, and 14th orders, respectively, and k: a conical coefficient.

As is obvious from the conditional expression (17), the radii of curvature of the respective aspherical lens elements shown in Table 1 each shows a value approximate to the vertex on the lens surface of the corresponding lens element. Also, Table 2 shows the conical coefficient k of the aspherical surface (the i-th lens surface attached with the asterisk (*) in Table 1), and the aspherical coefficients A, B, C, and D.

The spherical aberration (LONGITUDINAL SPHERICAL ABERRATION, the astigmatism (ASTIGMATISM), and the distortion aberration (DISTORTION) of the entire optical system in Example 1 having the above lens arrangement and construction are shown in FIG. 25 from the left column to the right column in this order. Specifically, in FIG. 25, the aberrations at the wide angle end (W), the mid point (M), and the telephoto end (T) are shown in the uppermost row, the intermediate row, and the lowermost row, respectively. Each of the horizontal axes in the spherical aberration diagrams and the astigmatism diagrams shows a focal point displacement in the unit of mm. Each of the horizontal axes in the distortion aberration diagrams shows a distortion with respect to the entire image in terms of percentage. Each of the vertical axes in the spherical aberration diagrams shows a value standardized by the incident height, and each of the vertical axes in the astigmatism diagrams and the distortion aberration diagrams shows a height of an optical image i.e. an image height in the unit of mm.

In the spherical aberration diagrams, aberrations in case of using light of three different wavelengths are shown, wherein the one-dotted-chain lines represent aberrations in using red ray (wavelength: 656.28 nm), the solid lines represent aberrations in using yellow ray (so-called "d-ray" having a wavelength of 587.56 nm), and the broken lines represent aberrations in using blue ray (wavelength: 435.84 nm). In the astigmatism diagrams, the solid lines "s" and the broken lines "t" respectively represent displacement results on a sagittal (radial) plane and a tangential (meridional) plane. Further, the astigmatism diagrams and the distortion aberration diagrams show displacement results in using yellow ray i.e. d-ray. As is obvious from FIG. 25, the lens groups in Example 1 show superior optical characteristics that the distortion aberration is within about 5% at any position of the wide angle end (W), the mid point (M), and the telephoto end (T). The focal length (unit: mm) and the F-number at the wide angle end (W), the mid point (M), and the telephoto end (T) in Example 1 are shown in Tables 39 and 40, respectively. Tables 39 and 40 show that Example 1 provides a fast optical system of a short focal length.

Example 2

Figure 7:
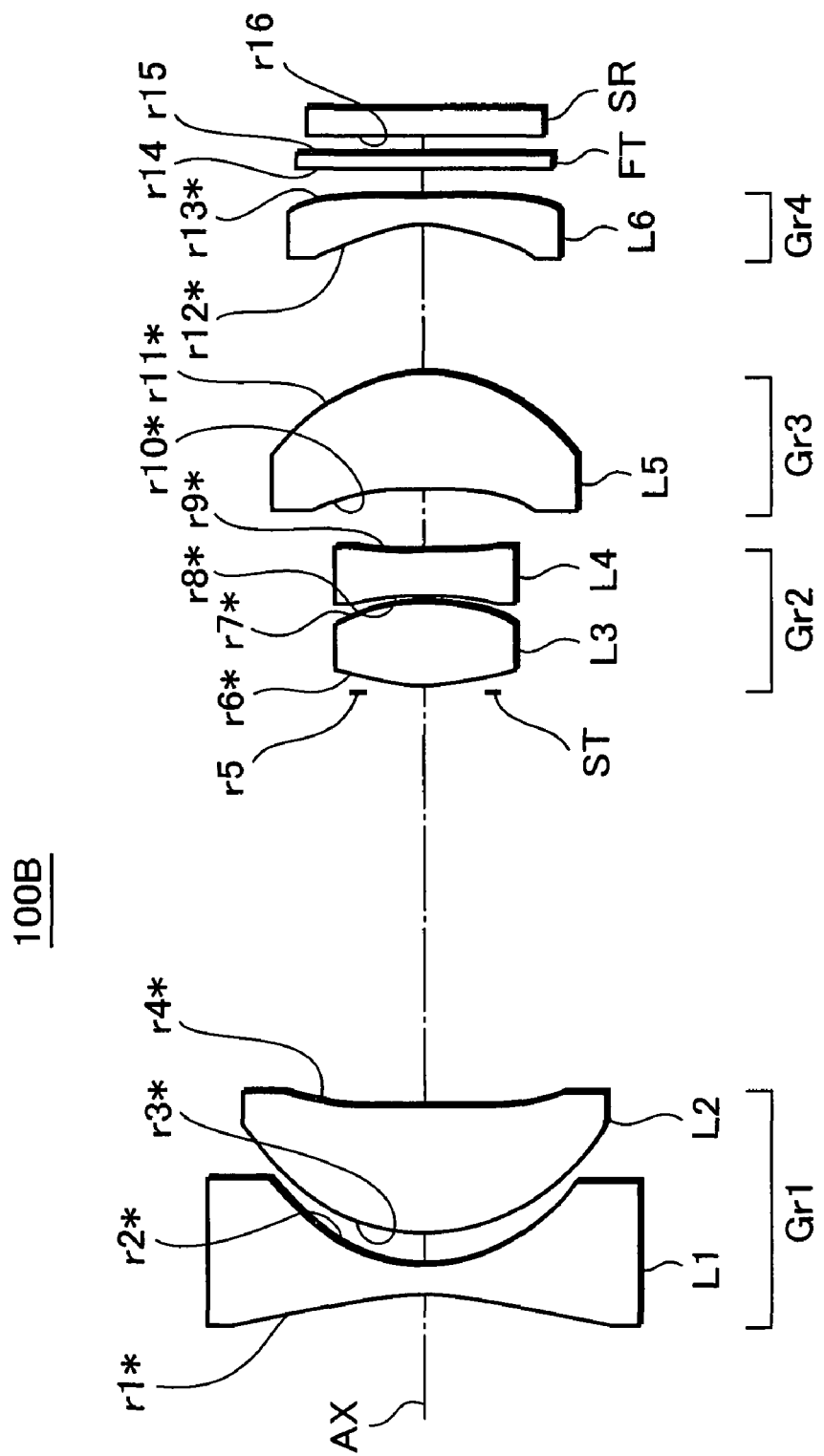
FIG. 7 is a cross-sectional view showing an optical path diagram at a wide angle end in a zoom optical system as Example 2.

FIG. 7 is a cross-sectional view, taken along the optical axis (AX), showing an arrangement of lens groups in a zoom optical system 100B as Example 2. The zoom optical system 100B in Example 2 includes, in the order from the object side, a first lens group (Gr1) having a negative optical power, an aperture stop (ST) arranged on the object side of a second lens group (Gr2), the second lens group (Gr2) having a positive optical power as a whole, a third lens group (Gr3) having a positive optical power, and a fourth lens group (Gr4) having a negative optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a biconcave negative lens element (L4). The third lens group (Gr3) is constituted of a positive meniscus lens element (L5) convex to the image side, and the fourth lens group (Gr4) is constituted of a negative meniscus lens element (L6) convex to the image side.

In the zoom optical system 100B in Example 2 having the above lens arrangement, as shown in FIG. 43, in zooming from the wide angle end (W) to the telephoto end (T), the first lens group (Gr1) and the fourth lens group (Gr4) are fixed, the second lens group (Gr2) is linearly moved toward the object side, and the third lens group (Gr3) is linearly moved toward the image side.

Construction data concerning the lens elements in the zoom optical system 100B in Example 2 are shown in Tables 3 and 4. As shown in Tables 3 and 4, and FIG. 7, in Example 2, all the first through the sixth lens elements (L1 through L6) are bi-aspherical lens elements. In the zoom optical system 100B, the first lens element (L1), the second lens element (L2), the fifth lens element (L5), and the sixth lens element (L6) are resin lens elements, and the lens elements other than the above are glass lens elements.

Example 3

Figure 8:
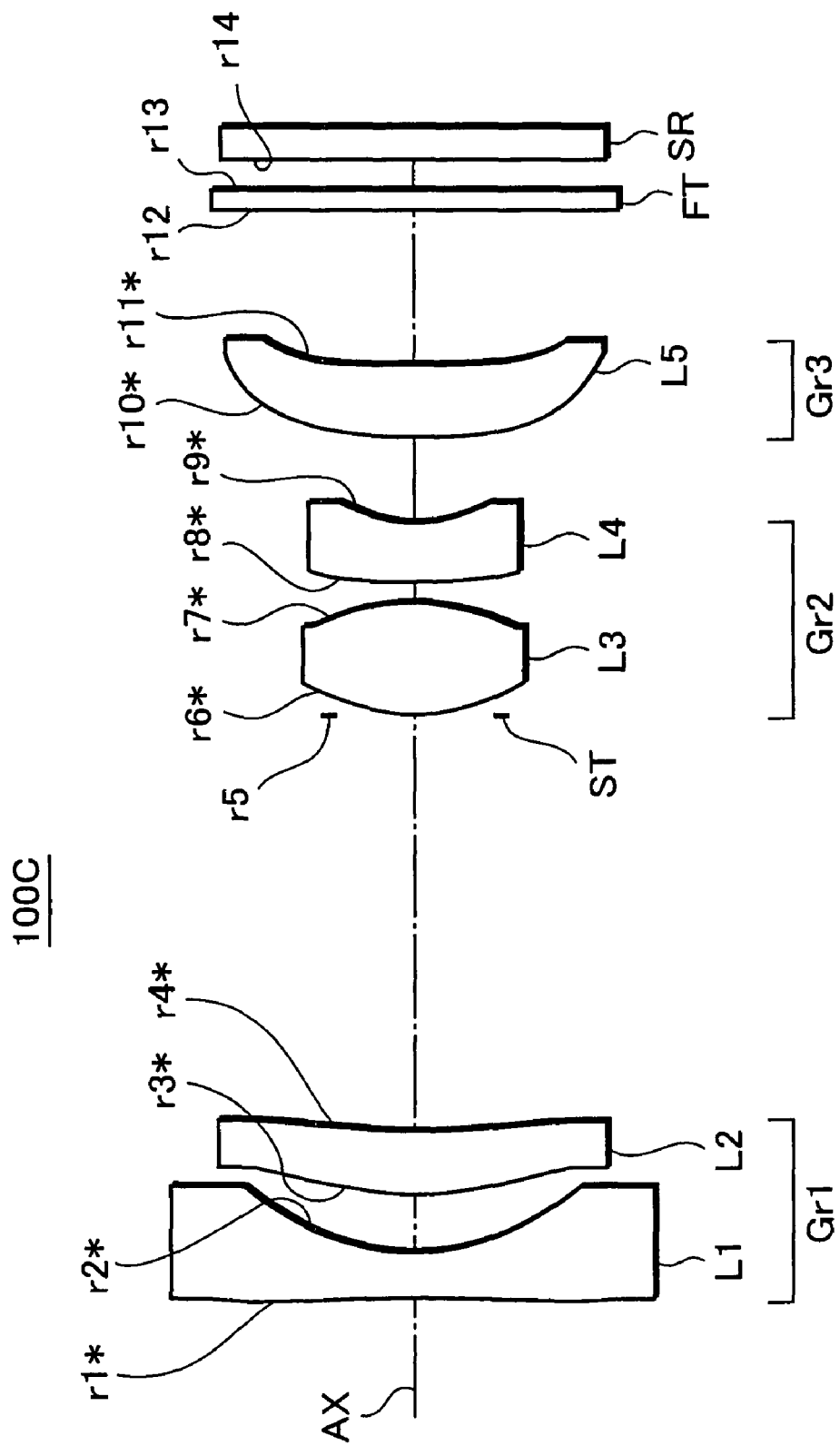
FIG. 8 is a cross-sectional view showing an optical path diagram at a wide angle end in a zoom optical system as Example 3.

FIG. 8 is a cross-sectional view, taken along the optical axis (AX), showing an arrangement of lens groups in a zoom optical system 100C as Example 3. The zoom optical system 100C in Example 3 includes, in the order from the object side, a first lens group (Gr1) having a negative optical power as a whole, an aperture stop (ST) arranged on the object side of a second lens group (Gr2), the second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative lens element (L4) convex to the object side in this order from the object side. The third lens group (Gr3) is constituted of a positive meniscus lens element (L5) convex to the object side.

In the zoom optical system 100C in Example 3 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100C in Example 3 are shown in Tables 5 and 6. As shown in Tables 5 and 6, and FIG. 8, in Example 3, all the first through the sixth lens elements (L1 through L6) are bi-aspherical lens elements. In the zoom optical system 100C, the fifth lens element (L5) is a resin lens element, and the lens elements other than the fifth lens element (L5) are glass lens elements.

TABLE 3

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −8.320 | 0.800 | | | 1.53048 | 55.72 |
| 2* | 4.731 | 0.875 | | | | |
| 3* | 5.584 | 3.438 | | | 1.58340 | 30.23 |
| 4* | 105.284 | 11.281 | 5.758 | 1.739 | | |
| 5 | ∞ | 0.200 | | | | |
| 6* | 6.210 | 2.248 | | | 1.58894 | 61.35 |
| 7* | −5.495 | 0.189 | | | | |
| 8* | −9.721 | 1.200 | | | 1.80542 | 26.12 |
| 9* | 20.898 | 1.681 | 8.822 | 13.818 | | |
| 10* | −19.857 | 3.143 | | | 1.58340 | 30.23 |
| 11* | −4.888 | 4.045 | 2.426 | 1.450 | | |
| 12* | −3.599 | 0.800 | | | 1.53048 | 55.72 |
| 13* | −8.220 | 0.760 | | | | |
| 14 | ∞ | 0.300 | | | 1.51680 | 64.12 |
| 15 | ∞ | 0.540 | | | | |
| 16 | ∞ | | | | | |

TABLE 4

| LENS SURFACE NO. | CONICAL COEFFICIENT | ASPHERICAL COEFFICIENT | | | |
|---|---|---|---|---|---|
| | | A | B | C | D |
| 1 | 0 | 1.47E−03 | 2.40E−05 | −1.74E−06 | 2.52E−08 |
| 2 | 0 | −2.36E−04 | −1.14E−04 | 1.66E−05 | −6.80E−07 |
| 3 | 0 | 3.79E−04 | −1.13E−04 | 8.58E−06 | −2.04E−07 |
| 4 | 0 | 1.27E−03 | −4.50E−05 | 2.37E−06 | 3.62E−08 |
| 6 | 0 | −7.57E−04 | −2.20E−04 | −1.30E−05 | −1.75E−07 |
| 7 | 0 | 2.75E−03 | −1.07E−03 | 2.25E−04 | −2.41E−05 |
| 8 | 0 | 1.79E−03 | −6.23E−04 | 2.62E−04 | −3.59E−05 |
| 9 | 0 | 4.23E−04 | 2.30E−04 | 3.45E−05 | −1.23E−05 |
| 10 | 0 | −2.71E−03 | −8.00E−05 | −6.86E−06 | 7.16E−07 |
| 11 | 0 | −1.21E−04 | −1.30E−05 | 2.63E−06 | −5.20E−09 |
| 12 | 0 | 1.46E−02 | −1.26E−03 | 8.70E−05 | −1.72E−06 |
| 13 | 0 | 1.32E−02 | −1.15E−03 | 2.57E−05 | 0.00E+00 |

TABLE 5

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −30.922 | 0.800 | | | 1.68980 | 52.80 |
| 2* | 4.543 | 1.016 | | | | |

TABLE 5-continued

| LENS SURFACE NO. | RADIUS OF CUR- VATURE (mm) | AXIAL SURFACE DISTANCE (mm) | | | RE- FRACTIVE INDEX | ABBE NUMBER |
|---|---|---|---|---|---|---|
| | | W | M | T | | |
| 3* | 6.199 | 1.087 | | | 1.80542 | 26.12 |
| 4* | 10.775 | 7.276 | 2.472 | 0.900 | | |
| 5 | ∞ | 0.000 | | | | |
| 6* | 3.400 | 1.916 | | | 1.58913 | 61.25 |
| 7* | −3.894 | 0.367 | | | | |
| 8* | 18.861 | 0.991 | | | 1.80542 | 26.12 |
| 9* | 2.628 | 1.499 | 4.812 | 7.781 | | |
| 10* | 14.830 | 1.219 | | | 1.58340 | 30.23 |
| 11* | 201.858 | 2.719 | | | | |
| 12 | ∞ | 0.300 | | | 1.51680 | 64.12 |
| 13 | ∞ | 0.540 | | | | |
| 14 | ∞ | | | | | |

TABLE 6

| LENS SURFACE NO. | CONICAL COEFFICIENT | ASPHERICAL COEFFICIENT | | | | | |
|---|---|---|---|---|---|---|---|
| | | A | B | C | D | E | F |
| 1 | 0 | 5.66E−04 | 2.56E−04 | −2.18E−05 | −1.03E−07 | 6.29E−08 | −1.60E−09 |
| 2 | 0 | −1.72E−04 | −1.27E−04 | 1.05E−04 | −5.43E−06 | −1.23E−06 | 9.95E−08 |
| 3 | 0 | −9.44E−04 | −1.15E−03 | 1.16E−04 | 2.01E−06 | −6.81E−07 | 1.70E−08 |
| 4 | 0 | −6.12E−04 | −1.30E−03 | 1.67E−04 | −2.55E−06 | −6.09E−07 | 2.10E−08 |
| 6 | 0 | −4.10E−03 | −3.14E−03 | 2.53E−03 | −1.42E−03 | 3.39E−04 | −2.82E−05 |
| 7 | 0 | 9.32E−03 | −8.86E−04 | −8.88E−04 | 2.60E−04 | −5.12E−05 | 1.25E−05 |
| 8 | 0 | −6.71E−04 | 1.52E−03 | 8.01E−05 | −1.17E−03 | 5.60E−04 | −6.00E−05 |
| 9 | 0 | −6.78E−03 | 3.75E−03 | 1.30E−03 | −2.26E−03 | 7.76E−04 | −6.91E−06 |
| 10 | 0 | 6.21E−03 | −7.10E−04 | 3.15E−04 | −5.81E−05 | 5.05E−06 | −1.54E−07 |
| 11 | 0 | 6.90E−03 | −4.79E−04 | 1.84E−04 | −4.79E−06 | −3.58E−06 | 3.68E−07 |

Example 4

Figure 9:
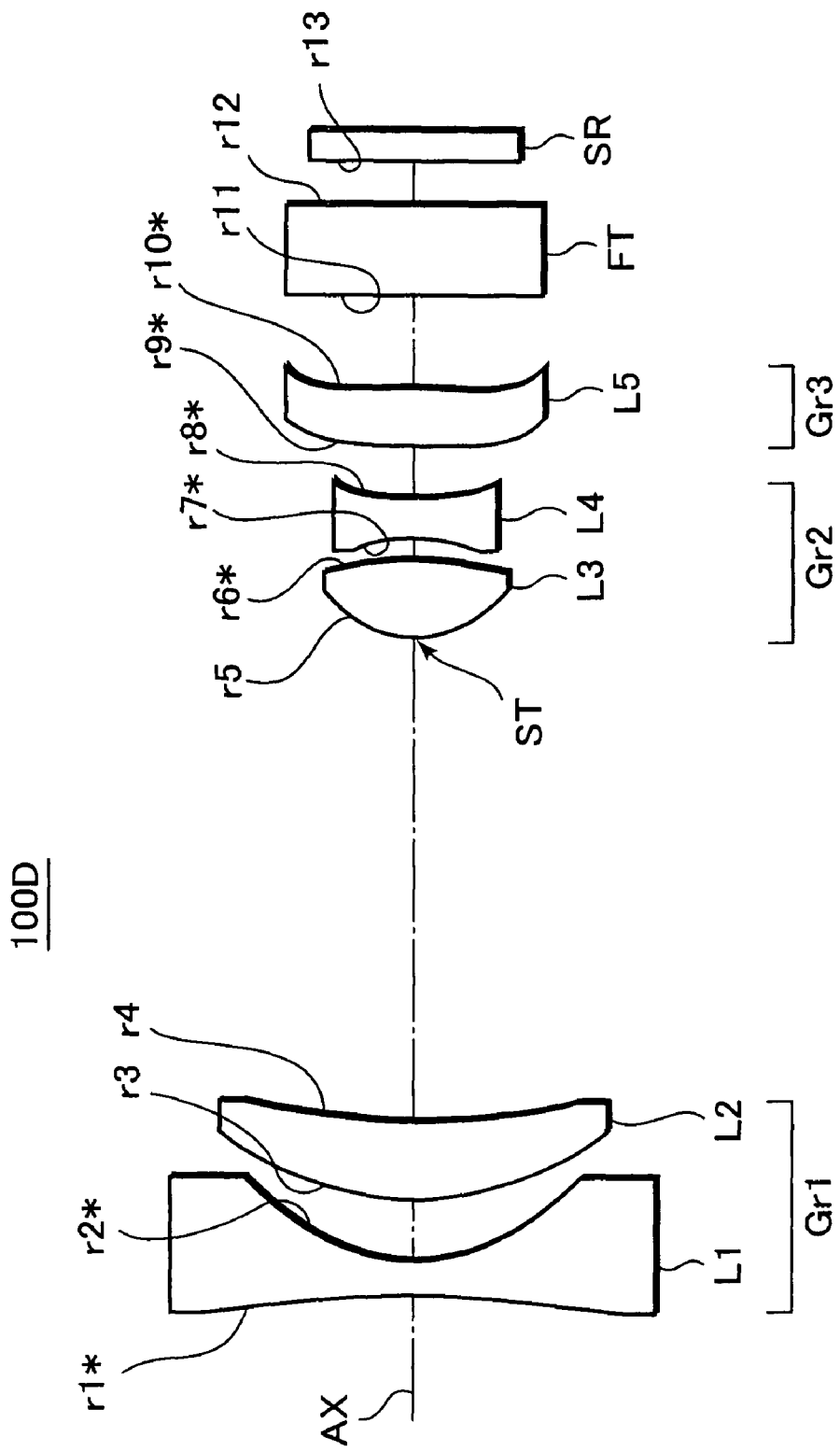
FIG. 9 is a cross-sectional view showing an optical path diagram at a wide angle end in a zoom optical system as Example 4.

FIG. 9 is a cross-sectional view, taken along the optical axis (AX), showing an arrangement of lens groups in a zoom optical system 100D as Example 4. The zoom optical system 100D in Example 4 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a biconcave negative lens element (L4) in this order from the object side. The third lens group (Gr3) is constituted of a biconvex positive lens element (L5). In Example 4, the aperture stop (ST) is of an aperture-stop-coated type, which is obtained by coating the object-side lens surface of the biconvex positive lens element (L3) with black.

In the zoom optical system 100D in Example 4 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is linearly moved toward the image side. Since the aperture stop (ST) is of an aperture-stop-coated type, which is obtained by coating the lens surface with black, the aperture stop (ST) is moved with the second lens group (Gr2) in zooming.

Construction data concerning the lens elements in the zoom optical system 100D in Example 4 are shown in Tables 7 and 8. As shown in Tables 7 and 8, and FIG. 9, in Example 4, the first lens element (L1), the fourth lens element (L4), and the fifth lens element (L5) are bi-aspherical lens elements, and the third lens element (L3) is a mono-aspherical lens element having an aspherical surface on one side thereof. In the zoom optical system 100D, all the first through the fifth lens elements (L1 through L5) are resin lens elements.

TABLE 7

| LENS SURFACE NO. | RADIUS OF CUR- VATURE (mm) | AXIAL SURFACE DISTANCE (mm) | | | RE- FRAC- TIVE INDEX | ABBE NUMBER |
|---|---|---|---|---|---|---|
| | | W | M | T | | |
| 1* | −17.384 | 0.800 | | | 1.49300 | 58.34 |
| 2* | 4.639 | 1.303 | | | | |
| 3 | 6.736 | 1.748 | | | 1.58340 | 30.23 |
| 4 | 12.652 | 10.900 | 3.252 | 0.800 | | |
| 5 (APERTURE STOP) | 2.560 | 1.698 | | | 1.49300 | 58.34 |
| 6* | −5.280 | 0.500 | | | | |
| 7* | −2.856 | 0.901 | | | 1.58340 | 30.23 |
| 8* | −655.053 | 1.153 | 4.739 | 7.973 | | |
| 9* | 26.950 | 1.305 | | | 1.58340 | 30.23 |
| 10* | −21.258 | 2.073 | 2.025 | 2.008 | | |
| 11 | ∞ | 2.000 | | | 1.51680 | 64.12 |
| 12 | ∞ | 1.000 | | | | |
| 13 | ∞ | | | | | |

TABLE 8

| LENS SURFACE NO. | CONICAL COEFFICIENT | ASPHERICAL COEFFICIENT | | | |
|---|---|---|---|---|---|
| | | A | B | C | D |
| 1 | 0 | 5.92E−04 | 1.90E−06 | −2.62E−07 | 9.40E−09 |
| 2 | 0 | −5.65E−04 | 4.71E−05 | −3.43E−06 | 1.38E−07 |
| 6 | 0 | 1.10E−02 | −2.87E−04 | −5.02E−04 | 8.13E−05 |
| 7 | 0 | 3.09E−02 | −4.88E−03 | −9.07E−05 | 1.02E−04 |
| 8 | 0 | 2.69E−02 | −6.15E−04 | −7.70E−05 | 2.76E−04 |
| 9 | 0 | 3.24E−03 | −2.27E−05 | 6.16E−05 | −1.93E−06 |
| 10 | 0 | 5.02E−03 | −2.49E−04 | 5.57E−05 | 4.57E−06 |

Example 5

Figure 10:
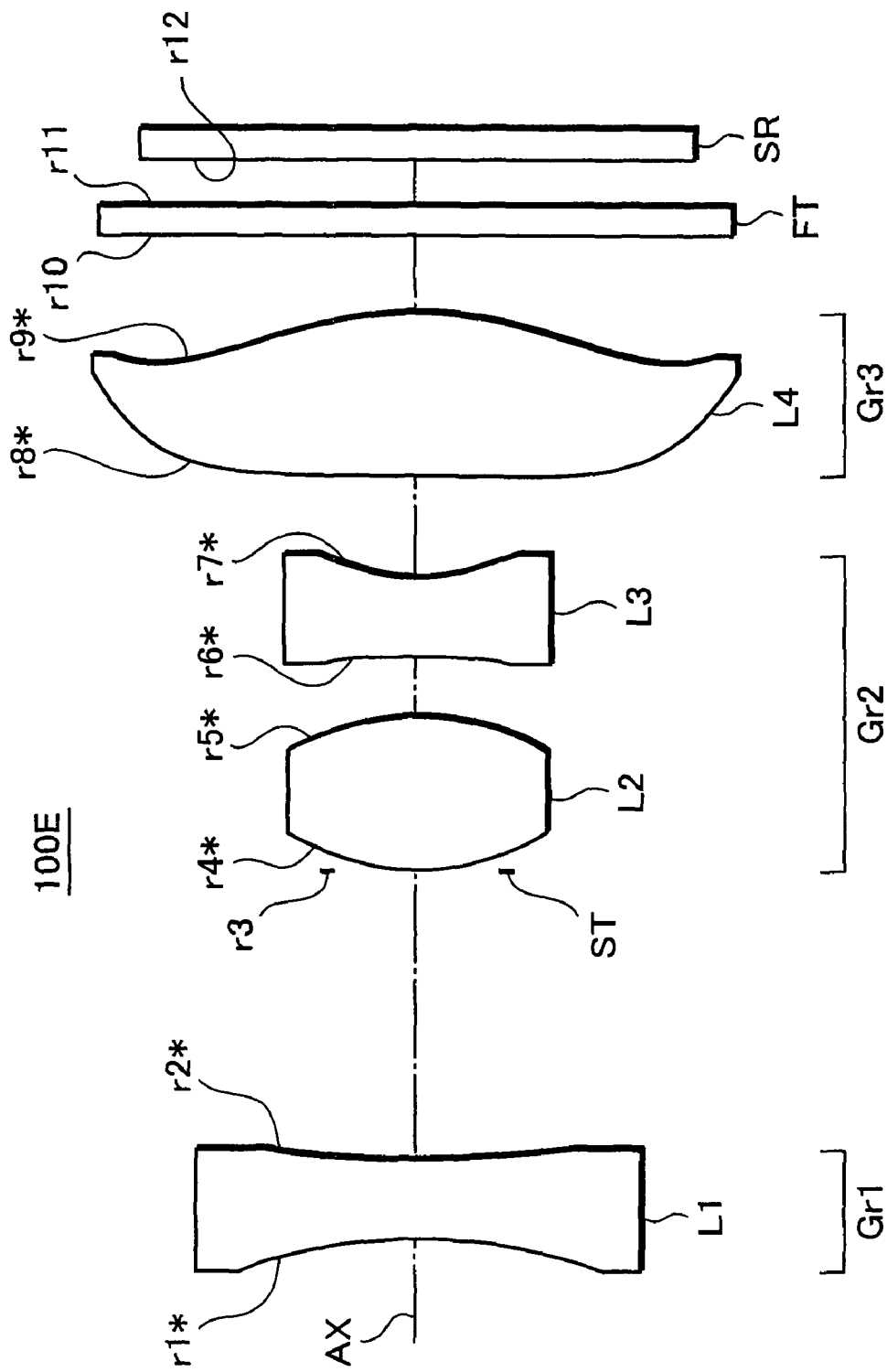
FIG. 10 is a cross-sectional view showing an optical path diagram at a wide angle end in a zoom optical system as Example 5.

FIG. 10 is a cross-sectional view, taken along the optical axis (AX), showing an arrangement of lens groups in a zoom optical system 100E as Example 5. The zoom optical system 100E in Example 5 includes, in the order from the object side, a first lens group (Gr1) having a negative optical power, an aperture stop (ST), a second lens group (Gr2) having a positive optical power as a whole, and a third lens group (Gr3) having a positive optical power. More specifically, the first lens group (Gr1) is constituted of a biconcave negative lens element (L1). The second lens group (Gr2) is constituted of a biconvex positive lens element (L3) and a biconcave negative lens element (L3) in this order from the object side. The third lens group (Gr3) is constituted of a biconvex positive lens element (L4).

TABLE 9

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −5.521 | 0.800 | | | 1.53048 | 55.72 |
| 2* | 12.056 | 3.002 | 1.579 | 0.850 | | |
| 3 | ∞ | 0.000 | | | | |
| 4* | 2.239 | 1.576 | | | 1.58913 | 61.25 |
| 5* | −2.880 | 0.630 | | | | |
| 6* | −19.734 | 0.800 | | | 1.80518 | 25.43 |
| 7* | 2.053 | 1.042 | 2.340 | 3.655 | | |
| 8* | 125.784 | 1.655 | | | 1.58340 | 30.23 |
| 9* | −4.910 | 0.800 | | | | |
| 10 | ∞ | 0.300 | | | 1.51680 | 64.12 |
| 11 | ∞ | 0.500 | | | | |
| 12 | ∞ | | | | | |

TABLE 10

| LENS SURFACE NO. | CONICAL COEFFICIENT | ASPHERICAL COEFFICIENT | | | |
|---|---|---|---|---|---|
| | | A | B | C | D |
| 1 | 0 | 2.90E−03 | −2.62E−03 | 9.73E−04 | −1.13E−04 |
| 2 | 0 | 3.32E−03 | −5.19E−03 | 2.73E−03 | −4.44E−04 |
| 4 | 0 | −1.17E−02 | −1.50E−03 | −5.02E−03 | 7.86E−04 |
| 5 | 0 | 2.91E−02 | −2.70E−02 | 1.24E−02 | −5.84E−03 |
| 6 | 0 | −2.81E−03 | −5.97E−02 | 4.34E−02 | −2.52E−02 |
| 7 | 0 | −1.56E−02 | −3.18E−02 | 2.32E−02 | −8.57E−03 |
| 8 | 0 | −5.53E−03 | 3.04E−03 | −2.92E−04 | 1.12E−05 |
| 9 | −0.3 | −3.27E−03 | 4.61E−04 | 1.92E−04 | −1.38E−05 |

In the zoom optical system 100E in Example 5 having the above lens arrangement, as shown in FIG. 44, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100E in Example 5 are shown in Tables 9 and 10. As shown in Tables 9 and 10, and FIG. 10, in Example 5, all the first through the fourth lens elements (L1 through L4) are bi-aspherical lens elements. In the zoom optical system 100E, the first lens element (L1) and the fourth lens element (L4) are resin lens elements.

Example 6

Figure 11:
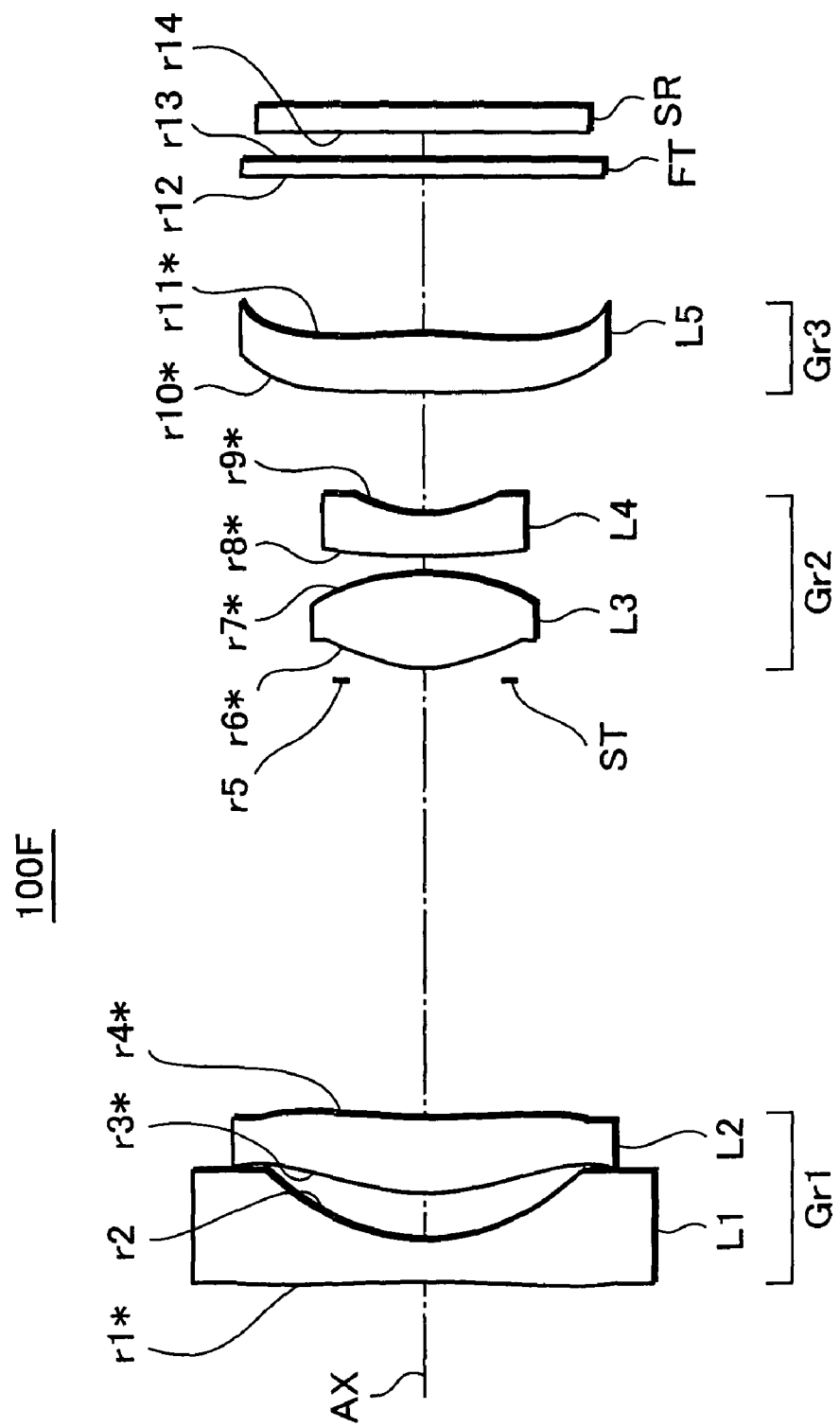
FIG. 11 is a cross-sectional view showing an optical path diagram at a wide angle end in a zoom optical system as Example 6.

FIG. 11 is a cross-sectional view, taken along the optical axis (AX), showing an arrangement of lens groups in a zoom optical system 100F as Example 6. The zoom optical system 100F in Example 6 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative lens element (L4) convex to the object side in this order from the object side. The third lens group (Gr3) is constituted of a biconvex positive lens element (L5).

In the zoom optical system 100F in Example 6 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is moved toward the image side. The aperture stop (ST) is moved with the second lens group (Gr2) in zooming.

Construction data concerning the lens elements in the zoom optical system 100F in Example 6 are shown in Tables 11 and 12. As shown in Tables 11 and 12, and FIG. 11, in Example 6, the second through the fifth lens elements (L2 through L5) are bi-aspherical lens elements, and the first lens element (L1) is a mono-aspherical lens element. In the zoom optical system 100F, all the first through the fifth lens elements (L1 through L5) are glass lens elements.

TABLE 11

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −23.793 | 0.800 | | | 1.77250 | 49.77 |
| 2 | 4.496 | 0.931 | | | | |
| 3* | 6.117 | 1.425 | | | 1.80518 | 25.43 |
| 4* | 17.663 | 8.700 | 3.241 | 1.200 | | |
| 5 | ∞ | 0.200 | | | | |
| 6* | 3.383 | 1.804 | | | 1.61154 | 61.22 |
| 7* | −4.476 | 0.352 | | | | |
| 8* | 25.245 | 0.800 | | | 1.80518 | 25.43 |
| 9* | 2.703 | 2.407 | 6.207 | 10.060 | | |
| 10* | 125.496 | 1.101 | | | 2.00170 | 20.60 |
| 11* | −24.236 | 3.148 | 3.021 | 2.958 | | |
| 12 | ∞ | 0.300 | | | 1.51680 | 64.12 |
| 13 | ∞ | 0.540 | | | | |
| 14 | ∞ | | | | | |

TABLE 12

| LENS SURFACE NO. | CONICAL COEFFICIENT | ASPHERICAL COEFFICIENT | | | |
|---|---|---|---|---|---|
| | | A | B | C | D |
| 1 | 0 | 1.59E−03 | −2.27E−05 | −6.39E−07 | 2.58E−08 |
| 3 | 0 | −8.05E−04 | −2.84E−04 | 8.24E−08 | 2.48E−07 |
| 4 | 0 | 7.26E−05 | −4.27E−04 | 2.03E−05 | −4.13E−07 |
| 6 | 0 | −3.78E−03 | −6.65E−04 | −8.12E−05 | −3.08E−05 |
| 7 | 0 | 1.04E−02 | −3.47E−03 | 3.74E−04 | −2.49E−05 |
| 8 | 0 | 1.62E−04 | −9.24E−04 | 1.22E−04 | 7.93E−05 |
| 9 | 0 | −6.97E−03 | 3.03E−03 | −5.57E−04 | 2.30E−04 |
| 10 | 0 | 2.55E−03 | 7.64E−05 | −8.03E−06 | 6.51E−07 |
| 11 | 0 | 2.77E−03 | 1.86E−04 | −2.56E−05 | 1.94E−06 |

Example 7

Figure 12:
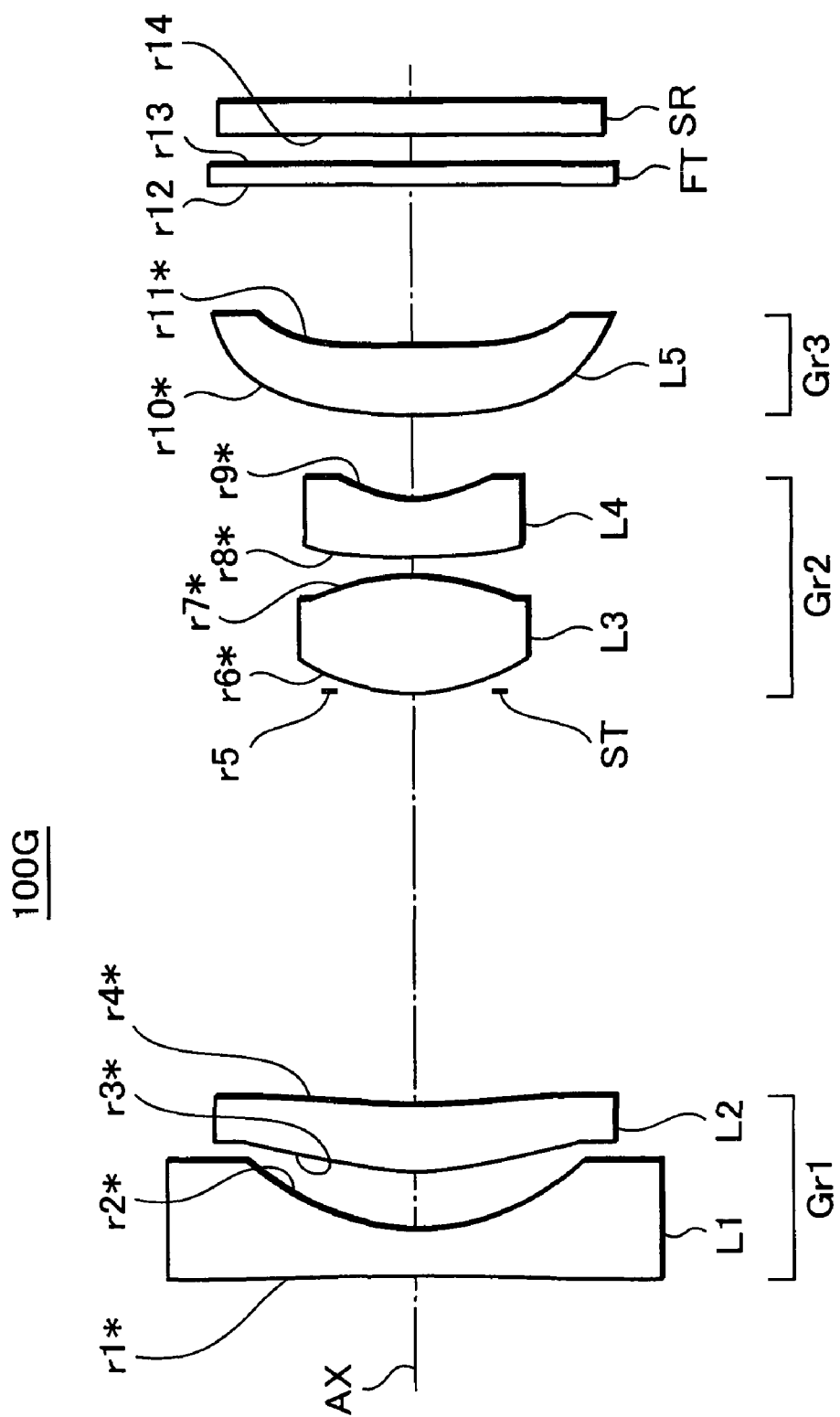
FIG. 12 is a cross-sectional view showing an optical path diagram at a wide angle end in a zoom optical system as Example 7.

FIG. 12 is a cross-sectional view, taken along the optical axis (AX) showing an arrangement of lens groups in a zoom optical system 100G as Example 7. The zoom optical system 100G in Example 7 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a positive meniscus lens element (L5) convex to the object side.

In the zoom optical system 100G in Example 7 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100G in Example 7 are shown in Tables 13 and 14. As shown in Tables 13 and 14, and FIG. 12, in Example 7, all the first through the fifth lens elements (L1 through L5) are bi-aspherical lens elements. In the zoom optical system 100G, all the first through the fifth lens elements (L1 through L5) are glass lens elements.

TABLE 13

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −27.986 | 0.800 | | | 1.68980 | 52.82 |
| 2* | 4.453 | 0.989 | | | | |
| 3* | 6.136 | 1.104 | | | 1.80542 | 26.12 |
| 4* | 11.156 | 7.170 | 2.501 | 0.900 | | |
| 5 | ∞ | 0.000 | | | | |
| 6* | 3.353 | 1.972 | | | 1.58913 | 61.25 |
| 7* | −3.820 | 0.347 | | | | |
| 8* | 22.677 | 0.986 | | | 1.80542 | 26.12 |
| 9* | 2.653 | 1.448 | 4.754 | 7.719 | | |
| 10* | 15.843 | 1.189 | | | 1.60700 | 27.00 |
| 11* | 170.869 | 2.804 | | | | |
| 12 | ∞ | 0.300 | | | 1.51680 | 64.12 |

TABLE 13-continued

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 13 | ∞ | 0.540 | | | | |
| 14 | ∞ | | | | | |

TABLE 14

| LENS SURFACE NO. | CONICAL COEFFICIENT | ASPHERICAL COEFFICIENT | | | | | |
|---|---|---|---|---|---|---|---|
| | | A | B | C | D | E | F |
| 1 | 0 | 4.47E−04 | 2.44E−04 | −2.09E−05 | −1.13E−07 | 6.72E−08 | −1.80E−09 |
| 2 | 0 | −6.40E−04 | −1.62E−04 | 1.11E−04 | −6.73E−06 | −1.07E−06 | 9.22E−08 |
| 3 | 0 | −1.10E−03 | −1.17E−03 | 1.36E−04 | 3.30E−07 | −7.98E−07 | 3.04E−08 |
| 4 | 0 | −8.97E−04 | −1.15E−03 | 1.55E−04 | −2.71E−06 | −5.51E−07 | 2.08E−08 |
| 6 | 0 | −4.34E−03 | −2.79E−03 | 1.73E−03 | −6.78E−04 | 4.80E−05 | 1.46E−05 |
| 7 | 0 | 9.65E−03 | −1.29E−03 | −2.36E−04 | −1.14E−04 | 5.27E−05 | 1.76E−06 |
| 8 | 0 | −7.20E−04 | 1.17E−03 | 1.16E−03 | −2.02E−03 | 8.90E−04 | −1.11E−04 |
| 9 | 0 | −6.59E−03 | 4.68E−03 | 1.58E−04 | −1.34E−03 | 5.38E−04 | −6.91E−06 |
| 10 | 0 | 5.95E−03 | −6.20E−04 | 3.12E−04 | −5.96E−05 | 5.22E−06 | −1.60E−07 |
| 11 | 0 | 6.47E−03 | −4.01E−04 | 1.94E−04 | −8.65E−06 | −3.22E−06 | 3.52E−07 |

Example 8

Figure 13:
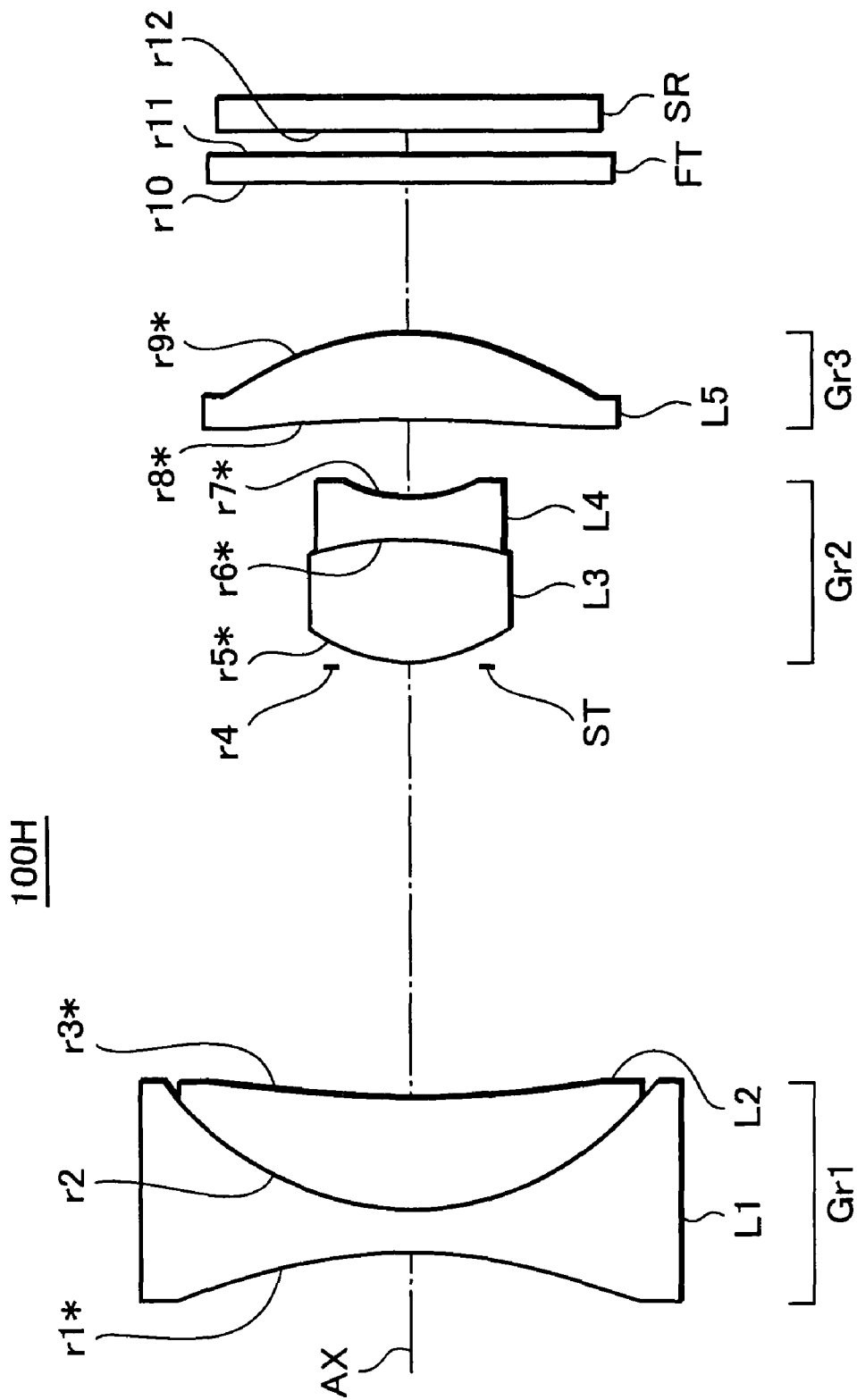
FIG. 13 is a cross-sectional view showing an optical path diagram at a wide angle end in a zoom optical system as Example 8.

FIG. 13 is a cross-sectional view, taken along the optical axis (AX), showing an arrangement of lens groups in a zoom optical system 100H as Example 8. The zoom optical system 100H in Example 8 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a cemented lens element composed of a biconcave negative lens element (L1) and a positive meniscus lens element (L2) convex to the object side in this order from the object side. The second lens group (Gr2) is constituted of a cemented lens element composed of a biconvex positive lens element (L3) and a biconcave negative lens element (L4) in this order from the object side. The third lens group (Gr3) is constituted of a positive meniscus lens element (L5) convex to the image side.

In the zoom optical system 100H in Example 8 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is linearly moved toward the image side. The aperture stop (ST) is moved with the second lens group (Gr2) in zooming.

Construction data concerning the lens elements in the zoom optical system 100H in Example 8 are shown in Tables 15 and 16. As shown in Tables 15 and 16, and FIG. 13, in Example 8, the first through the fourth lens elements (L1 through L4) are each a mono-aspherical lens element, and the fifth lens element (L5) is a biaspherical lens element. In the zoom optical system 100H, the first lens element (L1), the second lens element (L2), and the fifth lens element (L5) are resin lens elements, and the lens elements other than the above are glass lens elements.

TABLE 15

| LENS SURFACE NO. | RADIUS OF CUR- VATURE (mm) | AXIAL SURFACE DISTANCE (mm) | | | RE- FRACTIVE INDEX | ABBE NUMBER |
|---|---|---|---|---|---|---|
| | | W | M | T | | |
| 1* | −8.949 | 0.800 | | | 1.53048 | 55.72 |
| 2 | 5.617 | 2.017 | | | 1.58340 | 30.23 |
| 3* | 21.591 | 7.870 | 3.148 | 1.400 | | |
| 4 | ∞ | 0.100 | | | | |
| 5* | 3.150 | 2.192 | | | 1.85000 | 40.04 |
| 6 | −6.648 | 0.807 | | | 1.84666 | 23.82 |
| 7* | 3.698 | 1.400 | 6.570 | 9.596 | | |
| 8* | −23.875 | 1.589 | | | 1.58340 | 30.23 |
| 9* | −4.277 | 2.730 | 1.607 | 1.002 | | |
| 10 | ∞ | 0.500 | | | 1.51680 | 64.12 |
| 11 | ∞ | 0.500 | | | | |
| 12 | ∞ | | | | | |

TABLE 16

| LENS SURFACE NO. | CONICAL COEFFICIENT | ASPHERICAL COEFFICIENT | | | |
|---|---|---|---|---|---|
| | | A | B | C | D |
| 1 | 0 | 1.19E−03 | −6.14E−05 | 3.29E−06 | −6.94E−08 |
| 3 | 0 | 3.27E−04 | −1.11E−04 | 1.23E−05 | −4.60E−07 |
| 5 | 0 | −2.89E−04 | −2.87E−04 | 1.83E−04 | −4.89E−05 |
| 7 | 0 | 1.22E−02 | 1.27E−03 | 6.15E−04 | −5.32E−05 |
| 8 | 0 | 1.13E−03 | −2.70E−04 | 2.04E−05 | 6.32E−08 |
| 9 | 0 | 5.08E−03 | −2.17E−04 | −5.60E−06 | 1.58E−06 |

Example 9

Figure 14:
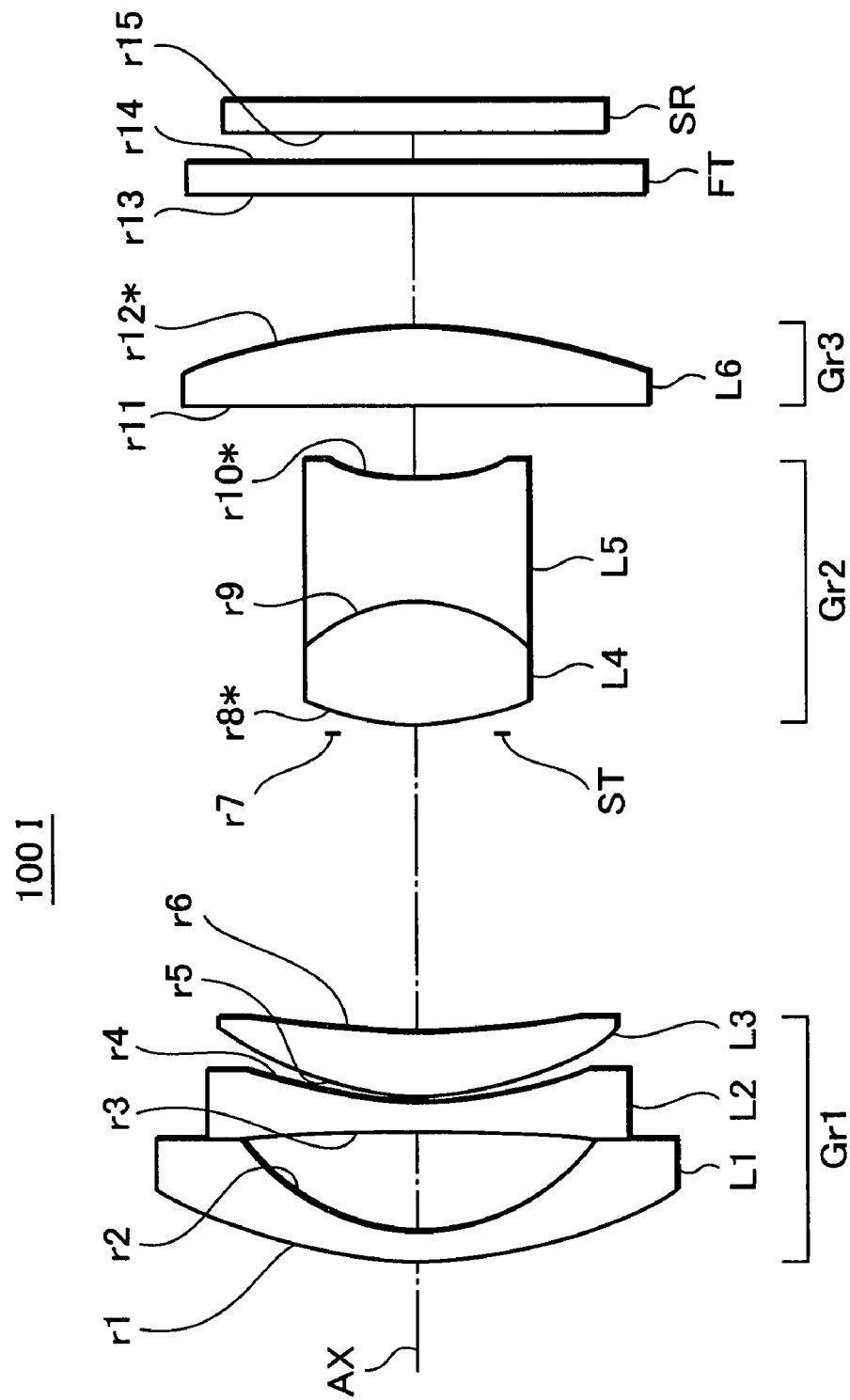
FIG. 14 is a cross-sectional view showing an optical path diagram at a wide angle end in a zoom optical system as Example 9.

FIG. 14 is a cross-sectional view, taken along the optical axis (AX), showing an arrangement of lens groups in a zoom optical system 100I as Example 9. The zoom optical system 100I in Example 9 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a negative meniscus lens element (L1) convex to the object side, a biconcave negative lens element (L2), and a positive meniscus lens element (L3) convex to the object side in this order from the object side. The second lens group (Gr2) is constituted of a cemented lens element composed of a biconvex positive lens element (L4) and a biconcave negative lens element (L5) in this order from the object side. The third lens group (Gr3) is constituted of a biconvex positive lens element (L6).

In the zoom optical system 100I in Example 9 having the above lens arrangement, as shown in FIG. 44, in zooming from the wide angle end (W) to the telephoto end (T), the first lens group (Gr1) and the second lens group (Gr2) are linearly moved toward the object side, and the third lens group (Gr3) is linearly moved toward the image side. The aperture stop (ST) is moved with the second lens group (Gr2) in zooming.

Construction data concerning the lens elements in the zoom optical system 100I in Example 9 are shown in Tables 17 and 18. As shown in Tables 17 and 18, and FIG. 14, in Example 9, the fourth through the sixth lens elements (L4 through L6) are each a mono-aspherical lens element. In the zoom optical system 100I, all the first through the sixth lens elements (L1 through L6) are glass lens elements.

Example 10

Figure 15:
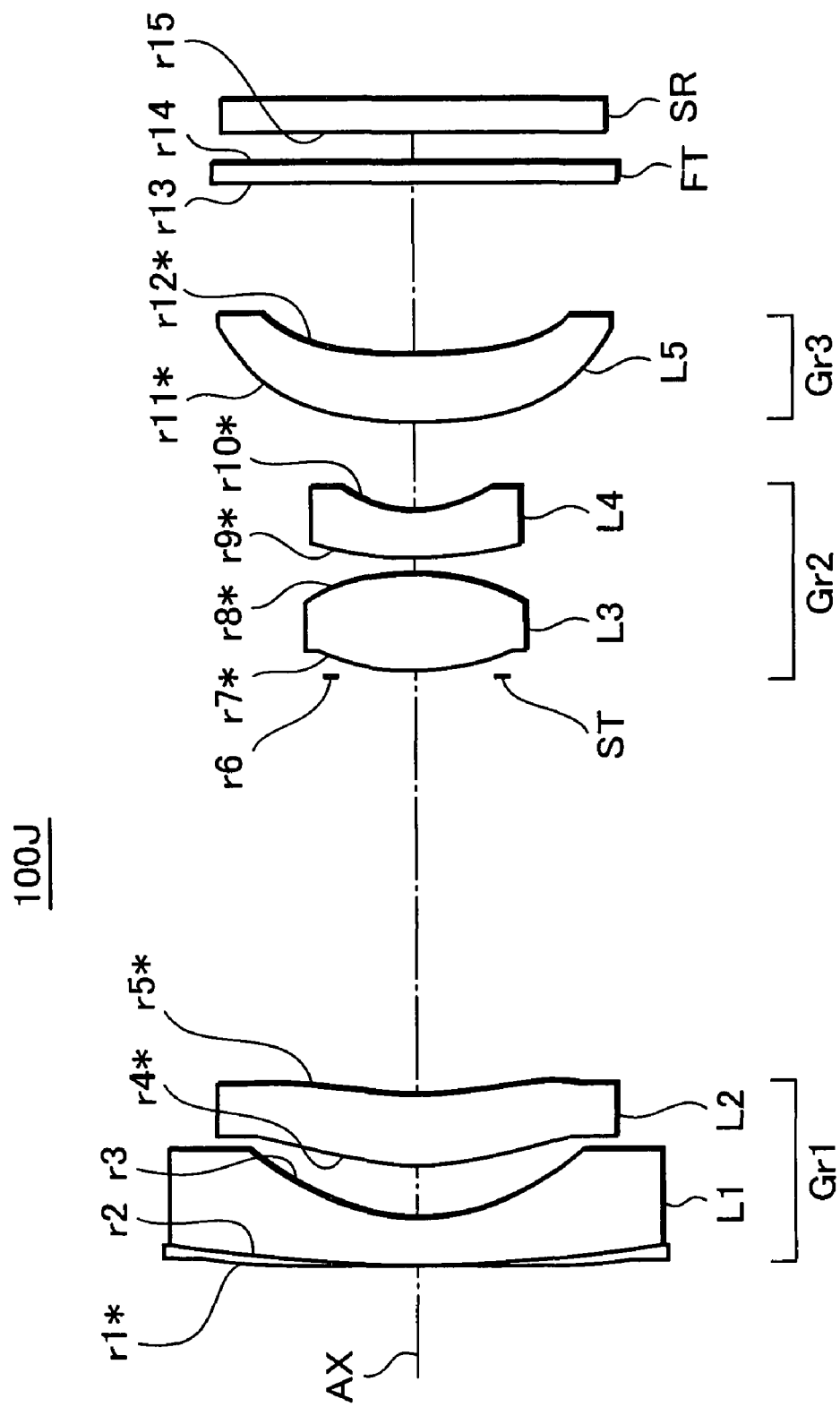
FIG. 15 is a cross-sectional view showing an optical path diagram at a wide angle end in a zoom optical system as Example 10.

FIG. 15 is a cross-sectional view, taken along the optical axis (AX), showing an arrangement of lens groups in a zoom optical system 100J as Example 10. The zoom optical system 100J in Example 10 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a negative meniscus lens element (L1) convex to the object side and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a positive meniscus lens element (L5) convex to the object side.

In the zoom optical system 100J in Example 10 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100J in Example 10 are shown in Tables 19 and 20. As shown in Tables 19 and 20, and FIG. 15, in Example 10, the second through the fifth lens elements (L2 through L5) are each a bi-aspherical lens element, and the first lens element (L1) is a mono-aspherical lens element. The first lens element (L1) is a composite aspherical lens element. In the zoom optical system 100J, all the first through the fifth lens elements (L1 through L5) are glass lens elements.

TABLE 17

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 1 | 8.783 | 0.500 | | | 1.75450 | 51.57 |
| 2 | 3.794 | 1.598 | | | | |
| 3 | -52.859 | 0.500 | | | 1.75450 | 51.57 |
| 4 | 7.987 | 0.100 | | | | |
| 5 | 5.381 | 1.058 | | | 1.79850 | 22.60 |
| 6 | 14.015 | 5.036 | 1.659 | 0.500 | | |
| 7 | ∞ | 0.100 | | | | |
| 8* | 3.948 | 2.034 | | | 1.85000 | 40.04 |
| 9 | -2.663 | 2.000 | | | 1.72176 | 25.48 |
| 10* | 5.014 | 1.224 | 5.902 | 8.840 | | |
| 11 | 440.397 | 1.271 | | | 1.80518 | 25.43 |
| 12* | -8.752 | 2.218 | 1.077 | 0.500 | | |
| 13 | ∞ | 0.500 | | | 1.51680 | 64.20 |
| 14 | ∞ | 0.500 | | | | |
| 15 | ∞ | | | | | |

TABLE 19

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 1* | -45.171 | 0.020 | | | 1.51313 | 53.84 |
| 2 | 28.057 | 0.800 | | | 1.77250 | 49.77 |
| 3 | 4.284 | 0.919 | | | | |
| 4* | 5.258 | 1.239 | | | 1.80518 | 25.43 |
| 5* | 8.890 | 7.347 | 2.558 | 0.900 | | |
| 6 | ∞ | 0.000 | | | | |
| 7* | 3.440 | 1.689 | | | 1.61154 | 61.22 |
| 8* | -4.415 | 0.290 | | | | |
| 9* | 8.208 | 0.800 | | | 1.80518 | 25.43 |
| 10* | 2.317 | 1.587 | 4.931 | 8.034 | | |
| 11* | 11.231 | 1.206 | | | 1.61659 | 36.66 |
| 12* | 36.283 | 2.914 | | | | |
| 13 | ∞ | 0.300 | | | 1.51680 | 64.12 |
| 14 | ∞ | 0.540 | | | | |
| 15 | ∞ | | | | | |

TABLE 18

| LENS SURFACE NO. | CONICAL COEFFICIENT | ASPHERICAL COEFFICIENT A | B | C | D |
|---|---|---|---|---|---|
| 8 | 0 | -1.82E-03 | -2.08E-04 | -2.14E-05 | -4.88E-07 |
| 10 | 0 | 9.91E-03 | 4.55E-04 | 2.67E-04 | -2.94E-05 |
| 12 | 0 | 2.24E-03 | -2.37E-04 | 1.61E-05 | -5.20E-07 |

TABLE 20

| LENS SURFACE NO. | CONICAL COEFFICIENT | ASPHERICAL COEFFICIENT | | | |
|---|---|---|---|---|---|
| | | A | B | C | D |
| 1 | 0 | 1.56E−03 | 1.18E−06 | −1.03E−06 | 0.00E+00 |
| 4 | 0 | −1.27E−03 | −5.07E−04 | −8.23E−06 | 1.94E−06 |
| 5 | 0 | −4.89E−04 | −9.02E−04 | 6.82E−05 | −1.63E−06 |
| 7 | 0 | −4.83E−03 | −1.68E−03 | 1.56E−04 | −1.14E−04 |
| 8 | 0 | 9.88E−03 | −5.36E−03 | 7.06E−04 | −2.82E−05 |
| 9 | 0 | −1.80E−04 | −2.07E−03 | −3.55E−05 | 2.76E−04 |
| 10 | 0 | −1.06E−02 | 3.24E−03 | −1.74E−03 | 7.28E−04 |
| 11 | 0 | 5.75E−03 | 1.12E−04 | −2.43E−05 | 2.72E−06 |
| 12 | 0 | 6.54E−03 | 6.43E−04 | −1.27E−04 | 1.22E−05 |

Example 11

Figure 16:
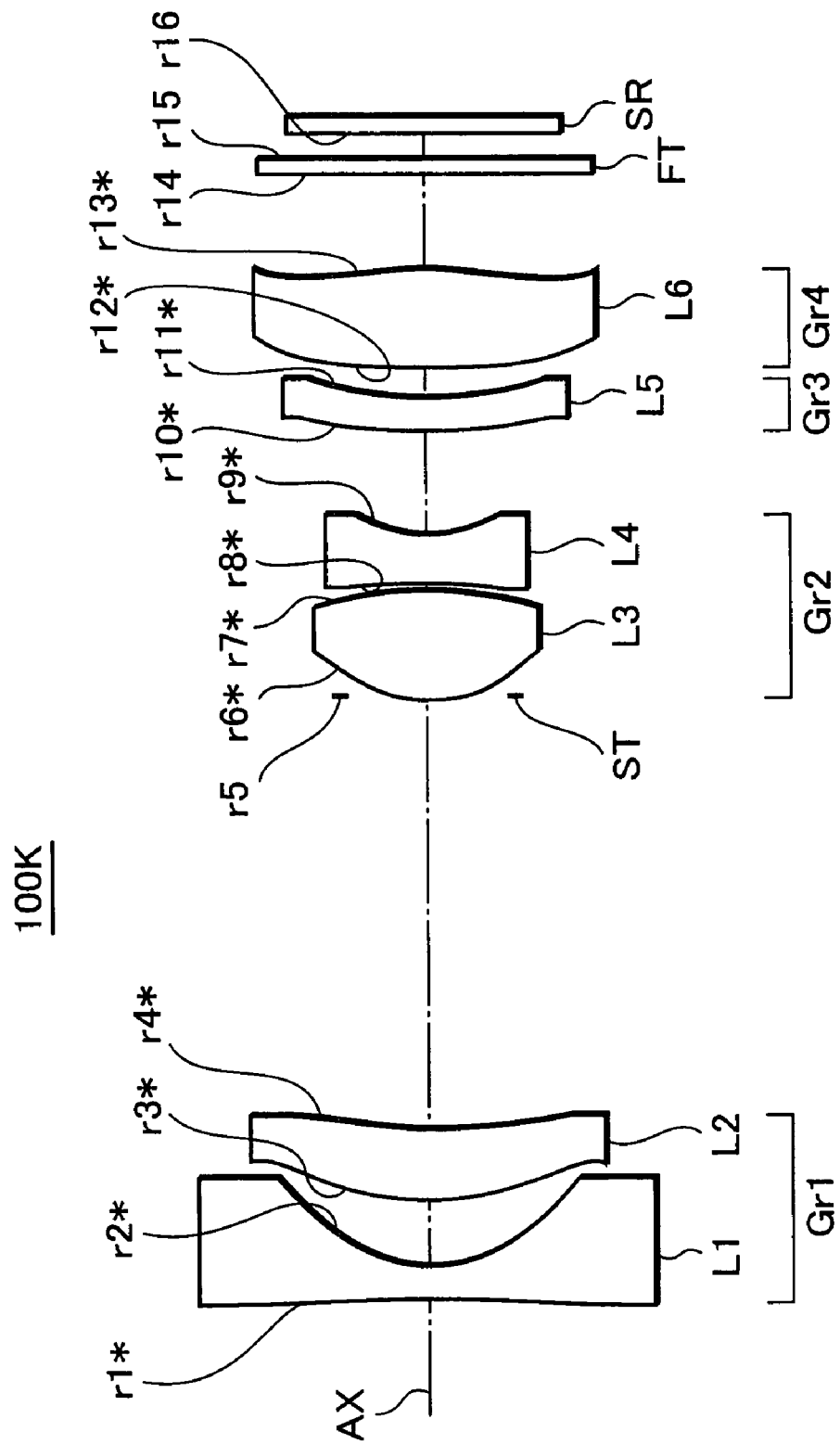
FIG. 16 is a cross-sectional view showing an optical path diagram at a wide angle end in a zoom optical system as Example 11.

FIG. 16 is a cross-sectional view, taken along the optical axis (AX), showing an arrangement of lens groups in a zoom optical system 100K as Example 11. The zoom optical system 100K in Example 11 includes, in the order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a biconcave negative lens element (L4) in this order from the object side. The third lens group (Gr3) is constituted of a negative meniscus lens element (L5) convex to the object side. The fourth lens group (Gr4) is constituted of a biconvex positive lens element (L6).

In the zoom optical system 100K in Example 11 having the above lens arrangement, as shown in FIG. 44, in zooming from the wide angle end (W) to the telephoto end (T), the second lens group (Gr2) is linearly moved toward the object side, and the third lens group (Gr3) makes a U-turn. The first lens group (Gr1) and the fourth lens group (Gr4) are fixed. The aperture stop (ST) is moved with the second lens group (Gr2) in zooming.

Construction data concerning the lens elements in the zoom optical system 100K in Example 11 are shown in Tables 21 and 22. As shown in Tables 21 and 22, and FIG. 16, in Example 11, all the first through the sixth lens elements (L1 through L6) are each a bi-aspherical lens element. In the zoom optical system 100K, the first lens element (L1), the fifth lens element (L5), and the sixth lens element (L6) are resin lens elements, and the lens elements other than the above are glass lens elements.

TABLE 21

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −19.573 | 0.700 | | | 1.53048 | 55.72 |
| 2* | 3.571 | 1.410 | | | | |
| 3* | 5.935 | 1.507 | | | 1.79850 | 22.60 |
| 4* | 10.024 | 9.141 | 3.905 | 1.500 | | |
| 5 | ∞ | 0.100 | | | | |
| 6* | 3.177 | 2.319 | | | 1.58913 | 61.24 |
| 7* | −7.159 | 0.145 | | | | |
| 8* | −20.246 | 0.700 | | | 1.72009 | 25.79 |
| 9* | 5.554 | 2.580 | 0.711 | 5.287 | | |
| 10* | 20.738 | 0.700 | | | 1.53048 | 55.72 |
| 11* | 10.113 | 0.624 | 7.729 | 5.558 | | |
| 12* | 20.533 | 2.126 | | | 1.58340 | 30.23 |
| 13* | −14.849 | 2.038 | | | | |
| 14 | ∞ | 0.300 | | | 1.51680 | 64.12 |
| 15 | ∞ | 0.540 | | | | |
| 16 | ∞ | | | | | |

TABLE 22

| LENS SURFACE NO. | CONICAL COEFFICIENT | ASPHERICAL COEFFICIENT | | | |
|---|---|---|---|---|---|
| | | A | B | C | D |
| 1 | 0 | 2.54E−03 | −1.71E−04 | 5.43E−06 | −5.04E−08 |
| 2 | 0 | −2.14E−03 | 4.64E−04 | −3.81E−05 | −5.43E−07 |
| 3 | 0 | −3.59E−03 | 3.61E−04 | −1.06E−05 | −6.74E−07 |
| 4 | 0 | −2.88E−03 | 2.18E−04 | −7.21E−06 | −6.53E−07 |
| 6 | 0 | −8.32E−04 | −9.94E−06 | −2.17E−05 | 2.15E−07 |
| 7 | 0 | 4.49E−03 | −1.35E−03 | 3.38E−04 | −3.55E−05 |
| 8 | 0 | 1.36E−03 | −1.98E−03 | 6.65E−04 | −8.78E−05 |
| 9 | 0 | 6.54E−03 | −1.89E−05 | 5.38E−04 | −4.78E−05 |
| 10 | 0 | 2.19E−04 | 3.83E−04 | −1.72E−05 | −2.70E−06 |

TABLE 22-continued

| LENS SURFACE NO. | CONICAL COEFFICIENT | ASPHERICAL COEFFICIENT | | | |
|---|---|---|---|---|---|
| | | A | B | C | D |
| 11 | 0 | 4.28E−04 | 3.85E−04 | 9.31E−08 | −4.19E−06 |
| 12 | 0 | 1.03E−03 | −2.23E−04 | 3.52E−05 | −1.13E−06 |
| 13 | 0 | 2.56E−03 | −5.25E−04 | 5.83E−05 | −1.44E−06 |

Example 12

Figure 17:
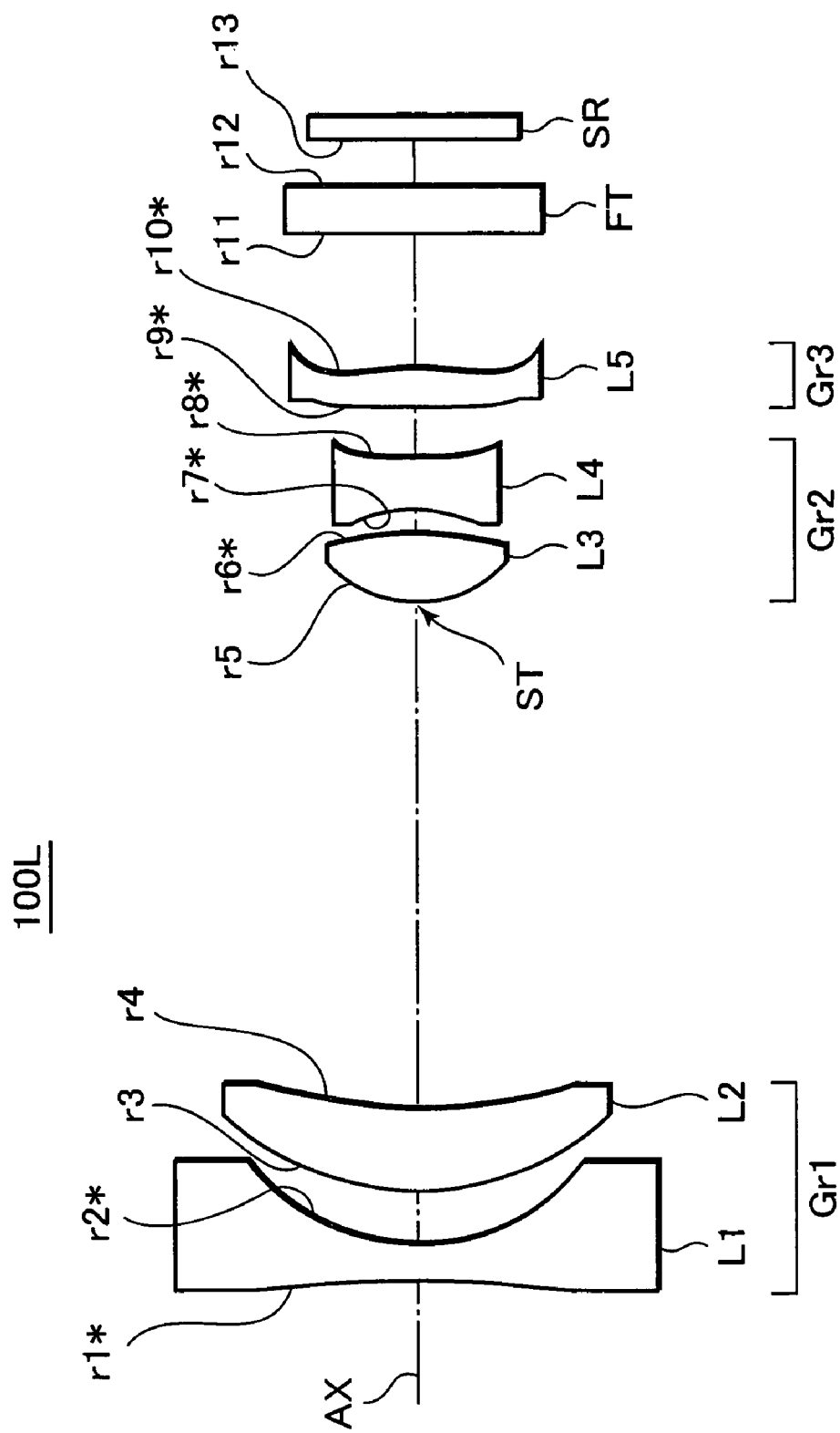
FIG. 17 is a cross-sectional view showing an optical path diagram at a wide angle end in a zoom optical system as Example 12.

FIG. 17 is a cross-sectional view, taken along the optical axis (AX), showing an arrangement of lens groups in a zoom optical system 100L as Example 12. The zoom optical system 100L in Example 12 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a biconcave negative lens element (L4) in this order from the object side. The third lens group (Gr3) is constituted of a positive meniscus lens element (L5) convex to the image side. In Example 12, the aperture stop (ST) is of an aperture-stop-coated type, which is obtained by coating the object-side lens surface of the biconvex positive lens element (L3) with black.

In the zoom optical system 100L in Example 12 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100L in Example 12 are shown in Tables 23 and 24. As shown in Tables 23 and 24, and FIG. 17, in Example 12, the first lens element (L1), the fourth lens element (L4), and the fifth lens element (L5) are each a bi-aspherical lens element, and the third lens element (L3) is a mono-aspherical lens element. In the zoom optical system 100L, all the first through the fifth lens elements (L1 through L5) are resin lens elements.

TABLE 23

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −25.213 | 0.800 | | | 1.53048 | 55.72 |
| 2* | 4.674 | 1.177 | | | | |
| 3 | 6.202 | 1.819 | | | 1.58340 | 30.23 |
| 4 | 11.419 | 11.174 | 3.086 | 0.500 | | |
| 5 (APERTURE STOP) | 2.740 | 1.521 | | | 1.53048 | 55.72 |
| 6* | −4.557 | 0.500 | | | | |
| 7* | −2.409 | 1.181 | | | 1.58340 | 30.23 |
| 8* | −29.321 | 1.064 | 4.233 | 7.105 | | |
| 9* | −56.148 | 0.800 | | | 1.58340 | 30.23 |
| 10* | −11.520 | 2.977 | | | | |
| 11 | ∞ | 1.000 | | | 1.51680 | 64.12 |
| 12 | ∞ | 1.000 | | | | |
| 13 | ∞ | | | | | |

TABLE 24

| LENS SURFACE NO. | CONICAL COEFFICIENT | ASPHERICAL COEFFICIENT | | | |
|---|---|---|---|---|---|
| | | A | B | C | D |
| 1 | 0 | 1.40E−04 | 3.87E−05 | −1.42E−06 | 1.97E−08 |
| 2 | 0 | −7.79E−04 | 9.30E−05 | −2.92E−06 | 5.93E−08 |
| 6 | 0 | 1.12E−02 | −1.93E−04 | −3.57E−04 | 5.76E−05 |
| 7 | 0 | 3.89E−02 | −3.61E−03 | −1.25E−04 | 1.29E−04 |
| 8 | 0 | 2.63E−02 | 3.65E−04 | −2.09E−04 | 1.96E−04 |
| 9 | 0 | 3.80E−03 | 2.67E−04 | 1.50E−04 | −7.98E−06 |
| 10 | 0 | 4.89E−03 | 1.61E−04 | 8.87E−05 | 9.36E−06 |

Example 13

Figure 18:
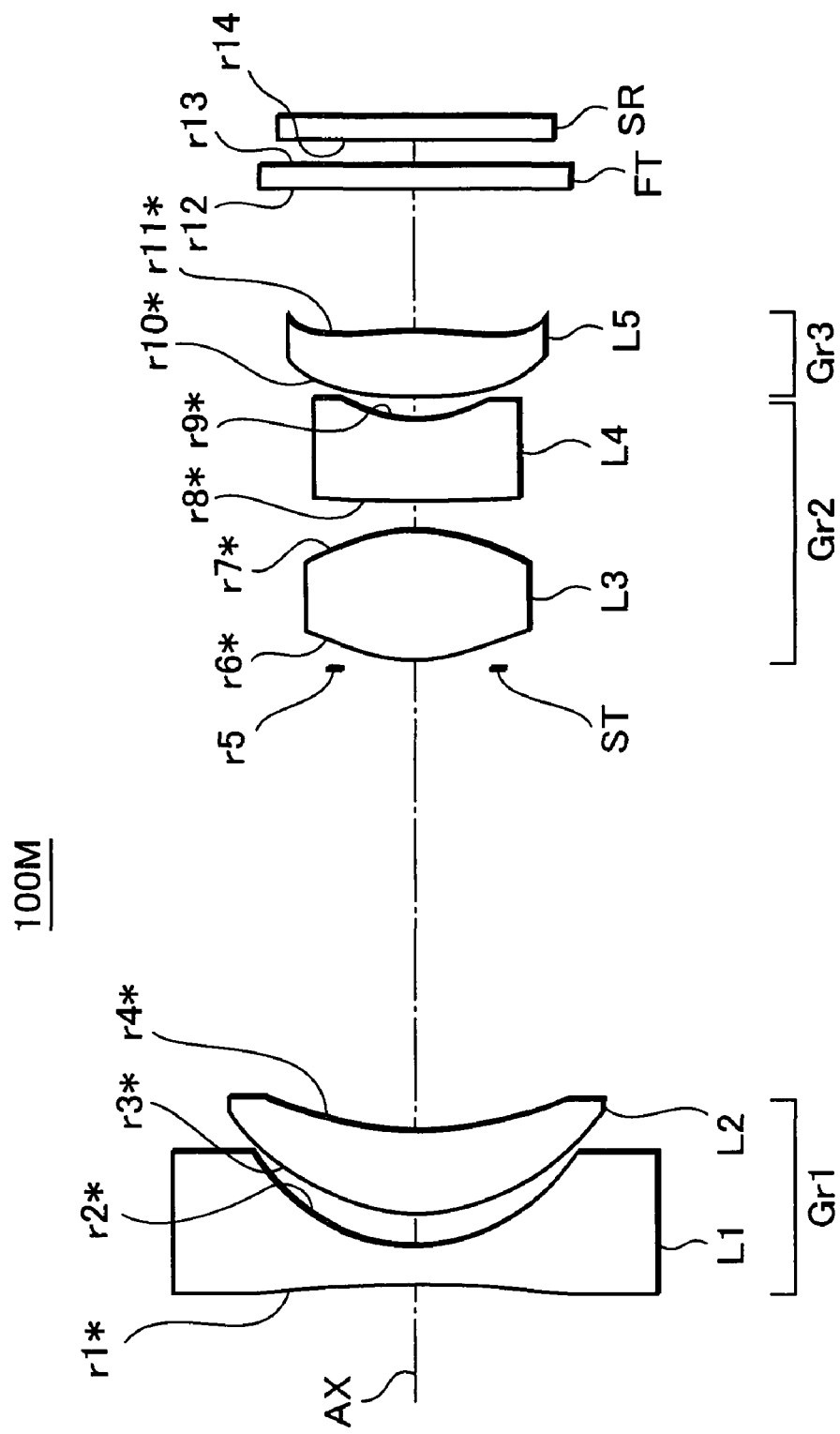
FIG. 18 is a cross-sectional view showing an optical path diagram at a wide angle end in a zoom optical system as Example 13.

FIG. 18 is a cross-sectional view, taken along the optical axis (AX), showing an arrangement of lens groups in a zoom optical system 100M as Example 13. The zoom optical system 100M in Example 13 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 100M in Example 13 having the above lens arrangement, as shown in FIG. 44, in zooming from the wide angle end (W) to the telephoto end (T), the first lens group (Gr1) makes a U-turn, and the second lens group (Gr2) and the third lens group (Gr3) are linearly moved toward the object side. The aperture stop (ST) is moved with the second lens group (Gr2) in zooming.

Construction data concerning the lens elements in the zoom optical system 100M in Example 13 are shown in Tables 25 and 26. As shown in Tables 25 and 26, and FIG. 18, in Example 13, all the first through the fifth lens elements (L1 through L5) are each a bi-aspherical lens element. In the zoom optical system 100M, the first lens element (L1), the second lens element (L2), and the fifth lens element (L5) are resin lens elements, and the lens elements other than the above are glass lens elements.

TABLE 25

| LENS SUR- FACE NO. | RADIUS OF CURVA- TURE (mm) | AXIAL SURFACE DISTANCE (mm) | | | REFRACTIVE INDEX | ABBE NUMBER |
|---|---|---|---|---|---|---|
| | | W | M | T | | |
| 1* | −15.055 | 0.800 | | | 1.53048 | 55.72 |
| 2* | 4.135 | 0.692 | | | | |
| 3* | 4.411 | 1.811 | | | 1.58340 | 30.23 |
| 4* | 8.056 | 10.167 | 4.388 | 1.400 | | |
| 5 | ∞ | 0.200 | | | | |
| 6* | 3.843 | 2.784 | | | 1.48749 | 70.44 |
| 7* | −4.155 | 0.652 | | | | |
| 8* | 16.340 | 1.785 | | | 1.84701 | 24.88 |
| 9* | 2.836 | 0.524 | 2.098 | 2.480 | | |
| 10* | 11.194 | 1.421 | | | 1.58340 | 30.23 |
| 11* | −20.962 | 3.163 | 4.851 | 7.862 | | |
| 12 | ∞ | 0.500 | | | 1.51680 | 64.20 |
| 13 | ∞ | 0.500 | | | | |
| 14 | ∞ | | | | | |

TABLE 26

| LENS SURFACE NO. | CONICAL COEFFICIENT | ASPHERICAL COEFFICIENT | | | |
|---|---|---|---|---|---|
| | | A | B | C | D |
| 1 | 0 | 1.70E−03 | −6.00E−05 | 1.45E−06 | −2.12E−08 |
| 2 | 0 | 7.24E−04 | −2.22E−04 | 3.01E−05 | −1.73E−06 |
| 3 | 0 | −6.28E−04 | −3.17E−04 | 2.66E−05 | −7.45E−07 |
| 4 | 0 | 1.65E−04 | −3.11E−04 | 2.97E−05 | −4.92E−07 |
| 6 | 0 | −2.92E−03 | −3.44E−04 | 1.30E−05 | −9.81E−06 |
| 7 | 0 | 7.11E−03 | −1.21E−03 | 6.35E−05 | −1.76E−06 |
| 8 | 0 | −7.07E−04 | −2.87E−04 | −1.55E−04 | 3.20E−06 |
| 9 | 0 | −6.24E−03 | 1.96E−03 | −7.49E−04 | 1.11E−04 |
| 10 | 0 | 1.75E−03 | 9.19E−04 | −5.07E−05 | 2.26E−06 |
| 11 | 0 | 2.44E−04 | 5.96E−04 | −9.67E−06 | 5.34E−06 |

Example 14

Figure 19:
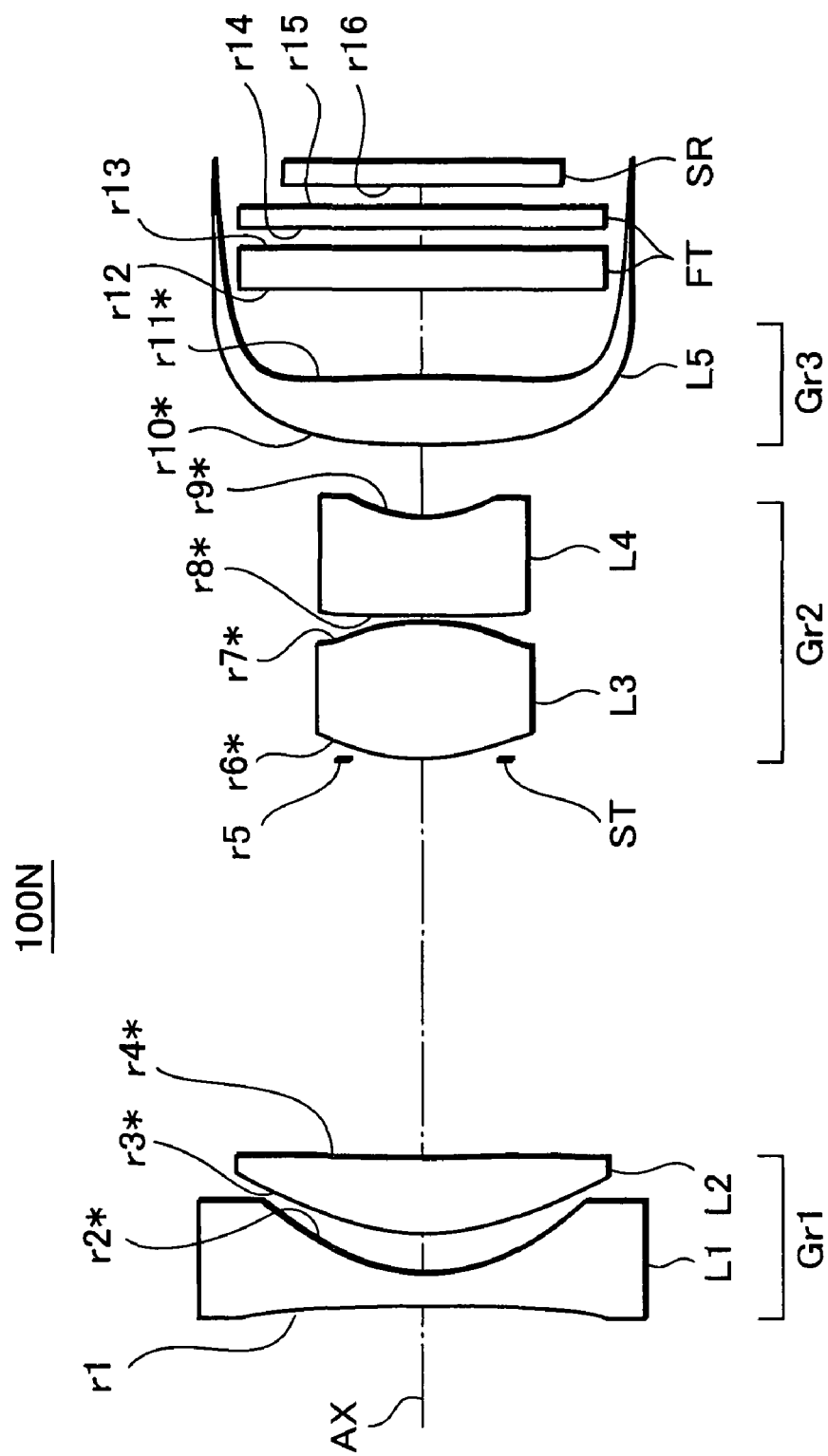
FIG. 19 is a cross-sectional view showing an optical path diagram at a wide angle end in a zoom optical system as Example 14.

FIG. 19 is a cross-sectional view, taken along the optical axis (AX), showing an arrangement of lens groups in a zoom optical system 100N as Example 14. The zoom optical system 100N in Example 14 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 100N in Example 14 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100N in Example 14 are shown in Tables 27 and 28. As shown in Tables 27 and 28, and FIG. 19, in Example 14, the second through the fifth lens elements (L2 through L5) are each a bi-aspherical lens element, and the first lens element (L1) is a mono-aspherical lens element. In the zoom optical system 100N, the second lens element (L2) and the fifth lens element (L5) are resin lens elements, and the lens elements other than the above are glass lens elements.

TABLE 27

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 1 | −47.163 | 0.800 | | | 1.69384 | 53.13 |
| 2* | 4.569 | 1.004 | | | | |
| 3* | 6.527 | 1.853 | | | 1.58340 | 30.23 |
| 4* | 41.716 | 9.830 | 3.530 | 1.100 | | |
| 5 | ∞ | 0.000 | | | | |
| 6* | 5.256 | 3.357 | | | 1.58913 | 61.24 |
| 7* | −4.931 | 0.150 | | | | |
| 8* | 49.074 | 2.520 | | | 1.80542 | 26.12 |
| 9* | 3.695 | 1.805 | 6.067 | 10.535 | | |
| 10* | 28.197 | 1.613 | | | 1.58340 | 30.23 |
| 11* | −17.808 | 2.180 | | | | |
| 12 | ∞ | 1.000 | | | 1.51680 | 64.12 |
| 13 | ∞ | 0.500 | | | | |
| 14 | ∞ | 0.500 | | | 1.51680 | 64.12 |
| 15 | ∞ | 0.500 | | | | |
| 16 | ∞ | | | | | |

TABLE 28

| LENS SURFACE NO. | CONICAL COEFFICIENT | ASPHERICAL COEFFICIENT | | | | | |
|---|---|---|---|---|---|---|---|
| | | A | B | C | D | E | F |
| 2 | 0 | −1.64E−03 | 1.09E−04 | −1.24E−05 | 4.74E−08 | 3.19E−08 | −1.30E−09 |
| 3 | 0 | −1.20E−03 | 1.40E−04 | −1.96E−05 | 9.32E−07 | −1.00E−08 | −2.00E−10 |
| 4 | 0 | −5.76E−04 | 5.47E−05 | −1.44E−05 | 1.24E−06 | −4.52E−08 | 6.00E−10 |
| 6 | 0 | −1.38E−03 | −1.49E−04 | 6.06E−05 | −3.39E−05 | 7.38E−06 | −5.55E−07 |
| 7 | 0 | 3.09E−03 | 8.14E−04 | −7.48E−04 | 2.49E−04 | −3.88E−05 | 2.37E−06 |
| 8 | 0 | −1.57E−03 | 9.65E−04 | −6.57E−04 | 2.38E−04 | −4.13E−05 | 2.87E−06 |
| 9 | 0 | −4.47E−03 | 5.36E−04 | 1.81E−05 | 6.78E−07 | −6.39E−06 | 1.45E−06 |
| 10 | 0 | 2.40E−03 | −2.01E−04 | 2.45E−05 | −1.49E−06 | 4.05E−08 | −3.00E−10 |
| 11 | 0 | 2.97E−03 | −8.27E−05 | −5.56E−06 | 1.67E−06 | −1.19E−07 | 2.90E−09 |

Example 15

Figure 20:
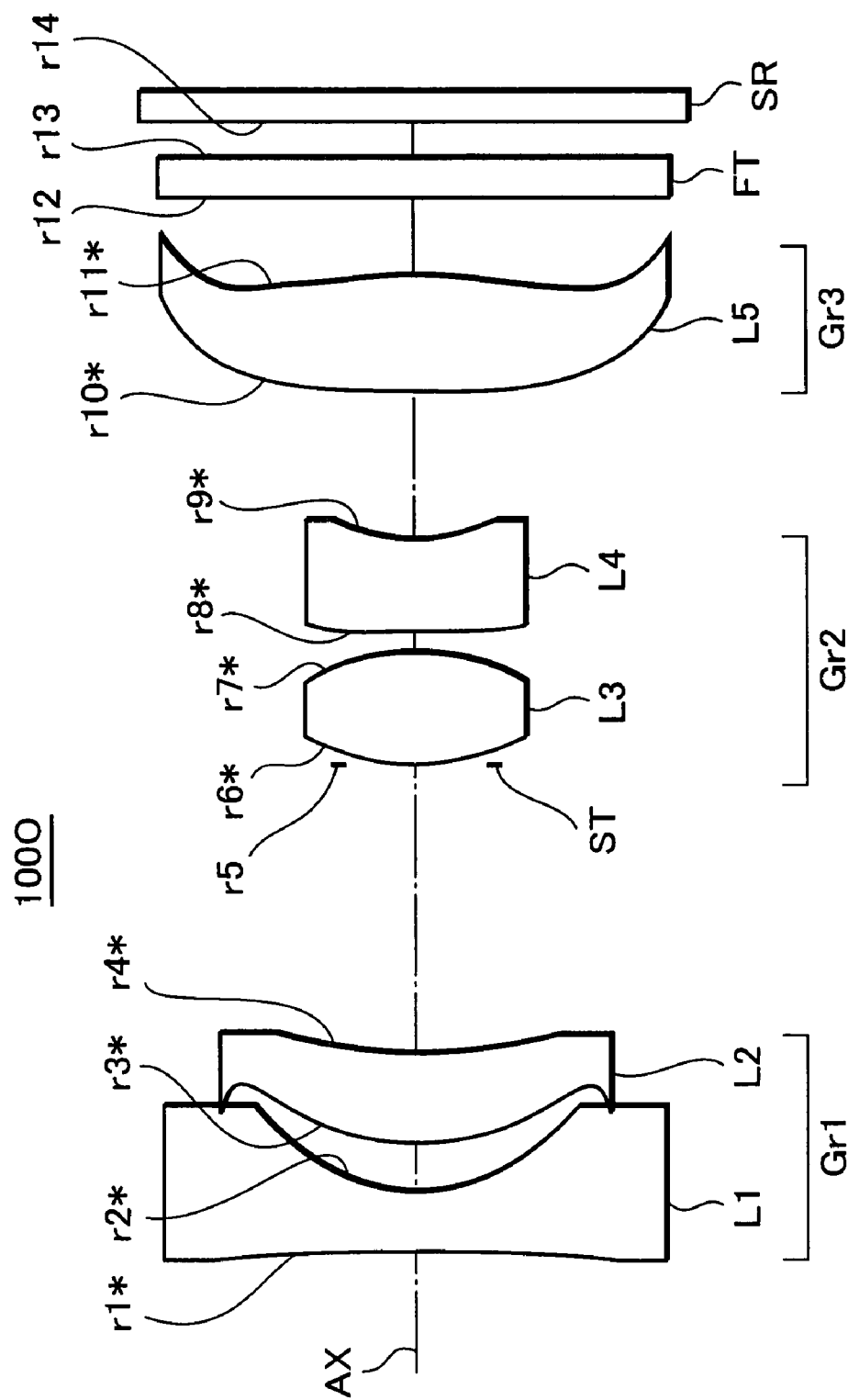
FIG. 20 is a cross-sectional view showing an optical path diagram at a wide angle end in a zoom optical system as Example 15.

FIG. 20 is a cross-sectional view, taken along the optical axis (AX), showing an arrangement of lens groups in a zoom optical system 100O as Example 15. The zoom optical system 100O in Example 15 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 100O in Example 15 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100O in Example 15 are shown in Tables 29 and 30. As shown in Tables 29 and 30, and FIG. 20, in Example 15, all the first through the fifth lens elements (L1 through L5) are each a bi-aspherical lens element. In the zoom optical system 100O, the first lens element (L1), the second lens element (L2), and the fifth lens element (L5) are resin lens elements, and the lens elements other than the above are glass lens elements.

TABLE 29

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 1* | −25.773 | 0.800 | | | 1.53048 | 55.72 |
| 2* | 2.506 | 0.665 | | | | |
| 3* | 3.345 | 1.234 | | | 1.58340 | 30.23 |
| 4* | 6.961 | 3.988 | 1.979 | 0.900 | | |

TABLE 29-continued

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 5 | ∞ | 0.000 | | | | |
| 6* | 3.068 | 1.528 | | | 1.58913 | 61.24 |
| 7* | −2.922 | 0.280 | | | | |
| 8* | 23.453 | 1.234 | | | 1.80542 | 26.12 |
| 9* | 2.181 | 2.053 | 3.612 | 5.141 | | |
| 10* | 18.878 | 1.578 | | | 1.58340 | 30.23 |
| 11* | −10.705 | 1.081 | | | | |
| 12 | ∞ | 0.500 | | | 1.51680 | 64.12 |
| 13 | ∞ | 0.500 | | | | |
| 14 | ∞ | | | | | |

TABLE 30

| LENS SURFACE NO. | CONICAL COEFFICIENT | ASPHERICAL COEFFICIENT | | | | |
|---|---|---|---|---|---|---|
| | | A | B | C | D | E |
| 1 | 0 | −1.28E−03 | 1.38E−03 | −3.52E−04 | 3.80E−05 | −1.49E−06 |
| 2 | 0 | −6.03E−03 | 3.86E−03 | −1.43E−03 | 1.51E−04 | −7.25E−06 |
| 3 | 0 | −1.45E−03 | 3.85E−04 | −9.94E−04 | 3.09E−04 | −3.04E−05 |
| 4 | 0 | 7.59E−05 | −2.20E−03 | −6.65E−05 | 3.16E−04 | −5.27E−05 |
| 6 | 0 | −9.76E−03 | −4.64E−03 | 6.78E−03 | −7.66E−03 | 2.79E−03 |
| 7 | 0 | 1.19E−02 | 8.01E−03 | −1.57E−02 | 8.04E−03 | −1.23E−03 |
| 8 | 0 | −7.27E−03 | 1.69E−02 | −2.34E−02 | 1.31E−02 | −2.29E−03 |
| 9 | 0 | −1.80E−02 | 9.61E−03 | −3.92E−03 | −2.19E−03 | 1.86E−03 |
| 10 | 0 | 4.30E−03 | −2.06E−03 | 5.17E−04 | −4.59E−05 | 1.50E−06 |
| 11 | 0 | 6.11E−03 | −2.45E−03 | 4.15E−04 | −1.70E−05 | 0.00E+00 |

Example 16

Figure 21:
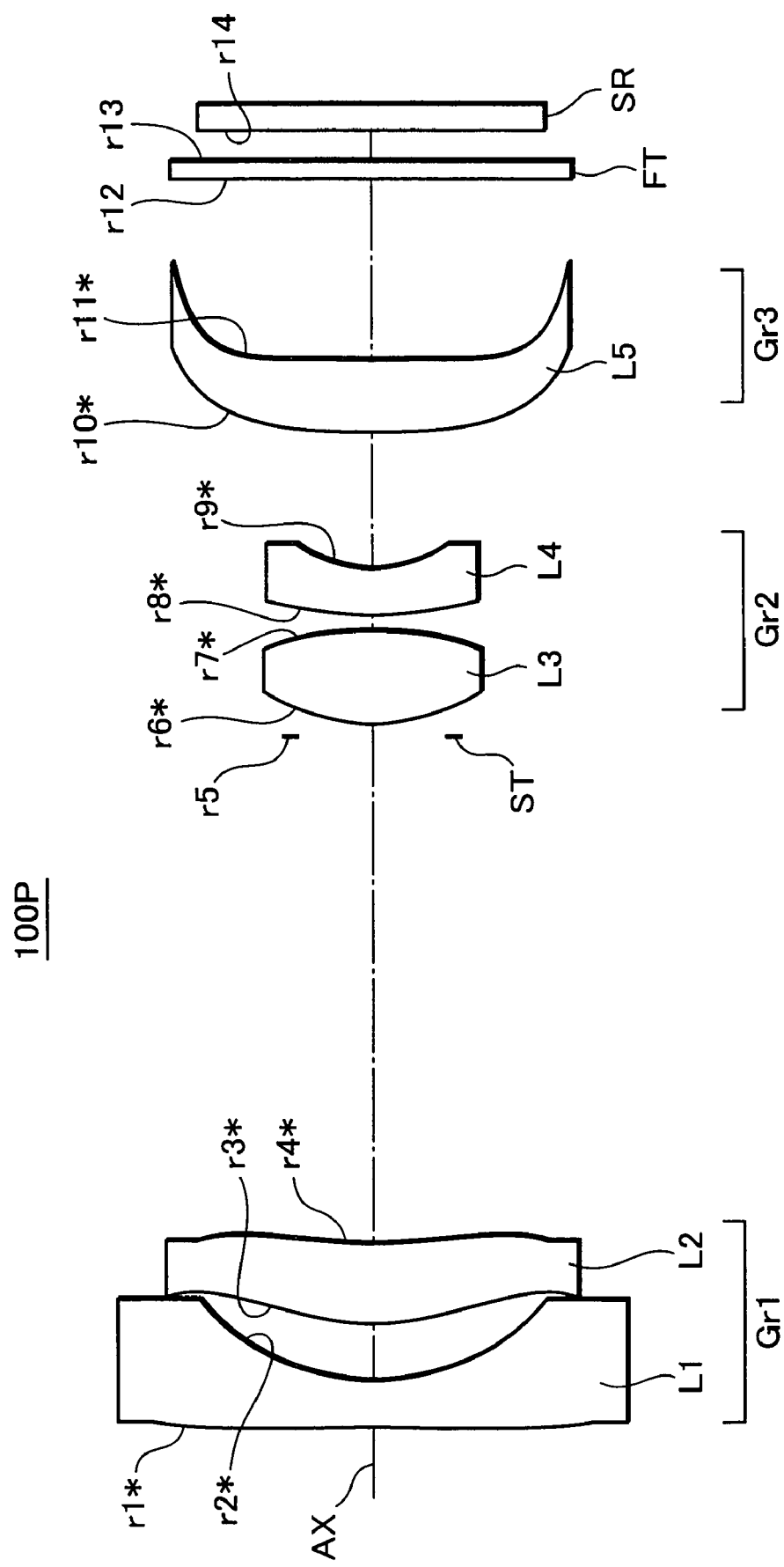
FIG. 21 is a cross-sectional view showing an optical path diagram at a wide angle end in a zoom optical system as Example 16.

FIG. 21 is a cross-sectional view, taken along the optical axis (AX), showing an arrangement of lens groups in a zoom optical system 100P as Example 16. The zoom optical system 100P in Example 16 includes, in the order from the object side, a first lens group (Gr1) having a negative optical power as a whole, an aperture stop (ST), a second lens group (Gr2) having a positive optical power as a whole, and a third lens group (Gr3) having a positive optical power. More specifically, the first lens group (Gr1) is constituted of a biconcave negative lens element (L1) and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconvex positive lens element (L5).

In the zoom optical system 100P in Example 16 having the above lens arrangement, as shown in FIG. 43, in zooming from the wide angle end (W) to the telephoto end (T), the first lens group (Gr1) makes a U-turn, the second lens group (Gr2) is linearly moved toward the object side, and the third lens group (Gr3) is fixed. The aperture stop (ST) is moved with the second lens group (Gr2) in zooming.

Construction data concerning the lens elements in the zoom optical system 100P in Example 16 are shown in Tables 31 and 32. As shown in Tables 31 and 32, and FIG. 21, in Example 16, the second through the fifth lens elements (L2 through L5) are each a bi-aspherical lens element, and the first lens element (L1) is a mono-aspherical lens element. In the zoom optical system 100P, all the first through the fifth lens elements (L1 through L5) are glass lens elements.

TABLE 31

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1* | −38.660 | 0.800 | | | 1.77250 | 49.77 |
| 2 | 4.520 | 1.009 | | | | |
| 3* | 5.957 | 1.377 | | | 1.80518 | 25.43 |
| 4* | 13.295 | 8.833 | 3.260 | 1.200 | | |
| 5 | ∞ | 0.200 | | | | |
| 6* | 3.370 | 1.654 | | | 1.61154 | 61.22 |
| 7* | −5.462 | 0.242 | | | | |
| 8* | 9.002 | 0.800 | | | 1.80518 | 25.43 |
| 9* | 2.459 | 2.373 | 6.111 | 10.005 | | |
| 10* | 23.853 | 1.273 | | | 1.59551 | 39.23 |
| 11* | −22.726 | 3.101 | | | | |
| 12 | ∞ | 0.300 | | | 1.51680 | 64.20 |
| 13 | ∞ | 0.540 | | | | |
| 14 | ∞ | 0.000 | | | | |

TABLE 32

| LENS SURFACE NO. | CONICAL COEFFICIENT | ASPHERICAL COEFFICIENT | | | |
|---|---|---|---|---|---|
| | | A | B | C | D |
| 1 | 0 | 1.46E−03 | −2.01E−05 | −5.63E−07 | 2.25E−08 |
| 3 | 0 | −1.04E−03 | −2.81E−04 | −4.98E−07 | 2.57E−07 |
| 4 | 0 | −1.73E−04 | −4.32E−04 | 2.02E−05 | −3.63E−07 |
| 6 | 0 | −3.10E−03 | −3.82E−04 | −9.19E−05 | −1.25E−05 |
| 7 | 0 | 1.09E−02 | −3.57E−03 | 4.19E−04 | −1.61E−05 |
| 8 | 0 | 1.82E−04 | −9.90E−04 | −3.76E−05 | 1.01E−04 |
| 9 | 0 | −9.53E−03 | 2.75E−03 | −8.39E−04 | 2.54E−04 |
| 10 | 0 | 3.05E−03 | 1.42E−04 | −1.24E−05 | 1.23E−06 |
| 11 | 0 | 3.44E−03 | 3.71E−04 | −5.41E−05 | 4.53E−06 |

Example 17

Figure 22:
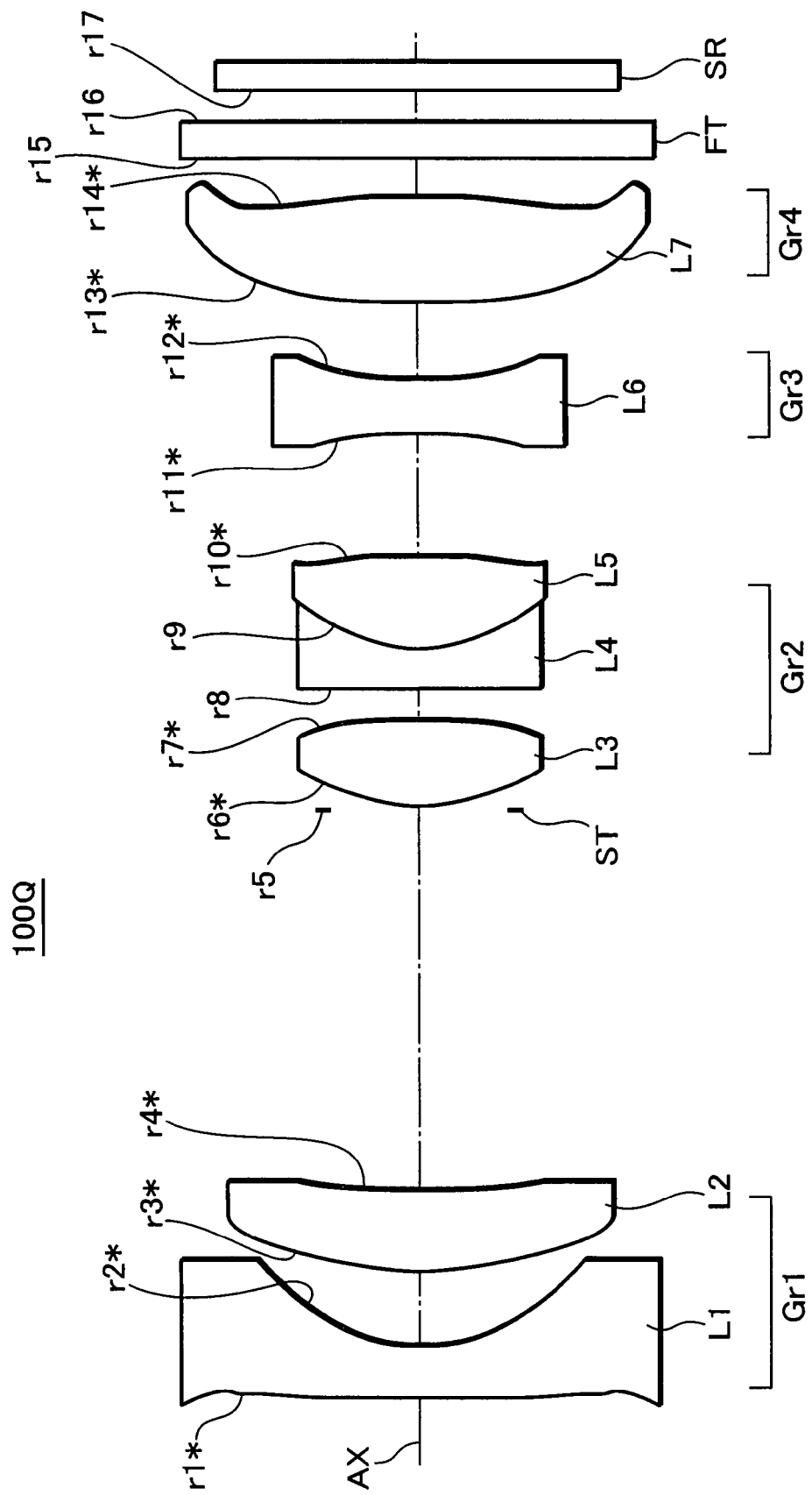
FIG. 22 is a cross-sectional view showing an optical path diagram at a wide angle end in a zoom optical system as Example 17.

FIG. 22 is a cross-sectional view, taken along the optical axis (AX), showing an arrangement of lens groups in a zoom optical system 100Q as Example 17. The zoom optical system 100Q in Example 17 includes, in the order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. More specifically, the first lens group (Gr1) is constituted of a negative meniscus lens element (L1) convex to the object side and a positive meniscus lens element (L2) convex to the object side in this order from the object side. The second lens group (Gr2) is constituted of a biconvex positive lens element (L3), and a cemented lens element composed of a biconcave negative lens element (L4) and a biconvex positive lens element (L5) in this order from the object side. The third lens group (Gr3) is constituted of a biconcave negative lens element (L6). The fourth lens group (Gr4) is constituted of a biconvex positive lens element (L7)

In the zoom optical system 100Q in Example 17 having the above lens arrangement, as shown in FIG. 45, in zooming from the wide angle end (W) to the telephoto end (T), the first lens group (Gr1) and the fourth lens group (Gr4) are fixed, and the second lens group (Gr2) and the third lens group (Gr3) are linearly moved toward the object side. The aperture stop (ST) is moved with the second lens group (Gr2) in zooming.

Construction data concerning the lens elements in the zoom optical system 100Q in Example 17 are shown in Tables 33 and 34. As shown in Tables 33 and 34, and FIG. 22, in Example 17, the first through the third lens elements (L1 through L3), the sixth lens element (L6), and the seventh lens element (L7) are each a bi-aspherical lens element, the fourth lens element (L4) is a spherical lens element, and the fifth lens element (L5) is a mono-aspherical lens element. In the zoom optical system 100Q, all the first through the seventh lens elements (L1 through L7) are glass lens elements.

TABLE 33

| LENS SURFACE NO. | RADIUS OF CURVATURE (mm) | AXIAL SURFACE DISTANCE (mm) W | M | T | REFRACTIVE INDEX | ABBE NUMBER |
|---|---|---|---|---|---|---|
| 1* | 93.982 | 0.800 | | | 1.75450 | 51.57 |
| 2* | 2.854 | 1.124 | | | | |
| 3* | 6.170 | 1.250 | | | 1.84666 | 23.82 |
| 4* | 14.469 | 5.705 | 3.005 | 0.600 | | |
| 5 (APERTURE STOP) | ∞ | 0.000 | | | | |
| 6* | 3.334 | 1.232 | | | 1.58913 | 61.11 |
| 7* | −11.837 | 0.505 | | | | |
| 8 | −34.869 | 0.600 | | | 1.76963 | 32.51 |
| 9 | 3.000 | 1.367 | | | 1.58913 | 61.11 |
| 10* | −6.358 | 1.819 | 1.800 | 2.895 | | |
| 11* | −10.667 | 0.800 | | | 1.53048 | 55.72 |
| 12* | 5.478 | 1.151 | 3.870 | 5.180 | | |
| 13* | 10.366 | 1.547 | | | 1.58340 | 30.23 |
| 14* | −34.444 | 0.600 | | | | |
| 15 | ∞ | 0.500 | | | 1.51680 | 64.20 |
| 16 | ∞ | 0.500 | | | | |
| 17 (IMAGING PLANE) | ∞ | | | | | |

TABLE 34

| LENS SURFACE NO. | CONICAL COEFFICIENT | ASPHERICAL COEFFICIENT | | | | | | |
|---|---|---|---|---|---|---|---|---|
| | | A | B | C | D | E | F | G |
| 1 | 0 | 7.80E−04 | 5.03E−04 | −1.23E−04 | 1.02E−05 | −2.87E−07 | −3.60E−09 | 0.00E+00 |
| 2 | 0 | −4.10E−03 | 1.37E−03 | −8.40E−05 | −3.86E−05 | 1.93E−06 | −8.06E−08 | 0.00E+00 |
| 3 | 0 | −4.20E−03 | 5.91E−04 | 2.40E−05 | 6.96E−06 | −6.95E−06 | 6.36E−07 | 0.00E+00 |
| 4 | 0 | −3.74E−03 | 2.68E−04 | 5.38E−05 | −1.64E−05 | −3.44E−06 | 9.33E−07 | −4.68E−08 |
| 6 | 0 | −2.18E−03 | −2.25E−04 | 4.43E−05 | −6.21E−04 | 5.49E−04 | −2.21E−04 | 3.17E−05 |
| 7 | 0 | 1.42E−03 | 3.89E−04 | −2.16E−03 | 1.69E−03 | −8.10E−04 | 1.89E−04 | −1.74E−05 |
| 10 | 0 | 2.89E−03 | 1.54E−03 | −1.61E−04 | 1.03E−04 | 0.00E+00 | 0.00E+00 | 0.00E+00 |
| 11 | −1 | −1.42E−02 | 7.12E−03 | −252E−03 | 5.12E−04 | −3.52E−05 | 0.00E+00 | 0.00E+00 |
| 12 | −1 | −9.50E−03 | 6.57E−03 | −2.07E−03 | 3.42E−04 | −2.08E−05 | 0.00E+00 | 0.00E+00 |
| 13 | −1 | −2.22E−03 | −3.25E−04 | 2.58E−04 | −3.49E−05 | 2.31E−06 | −6.12E−08 | 0.00E+00 |
| 14 | −1 | −4.02E−03 | −1.72E−03 | 7.92E−04 | −1.27E−04 | 1.09E−05 | −3.75E−07 | 0.00E+00 |

Example 18

Figure 23:
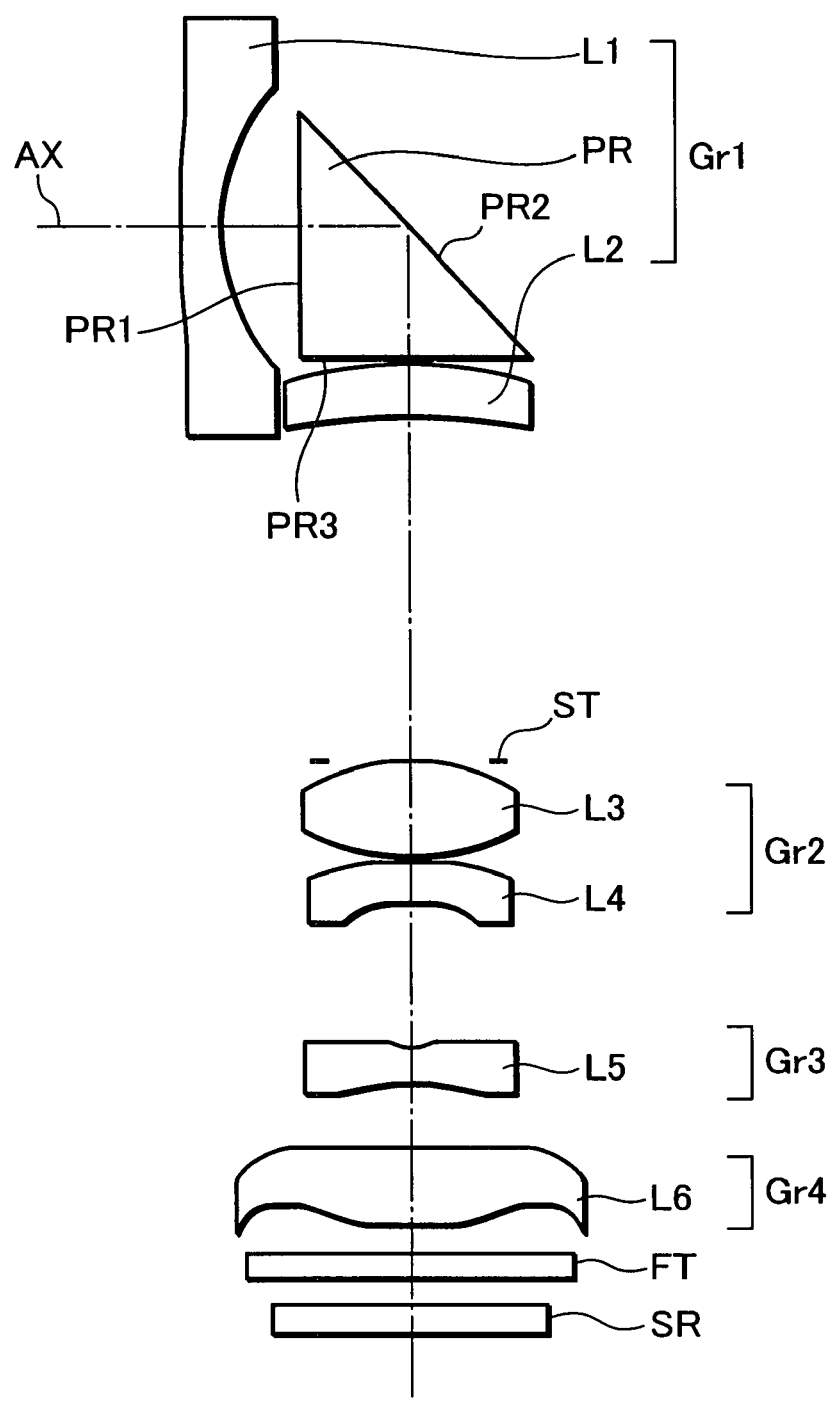
FIG. 23 is a cross-sectional view showing an optical arrangement of a zoom optical system as Example 18.
Figure 24:
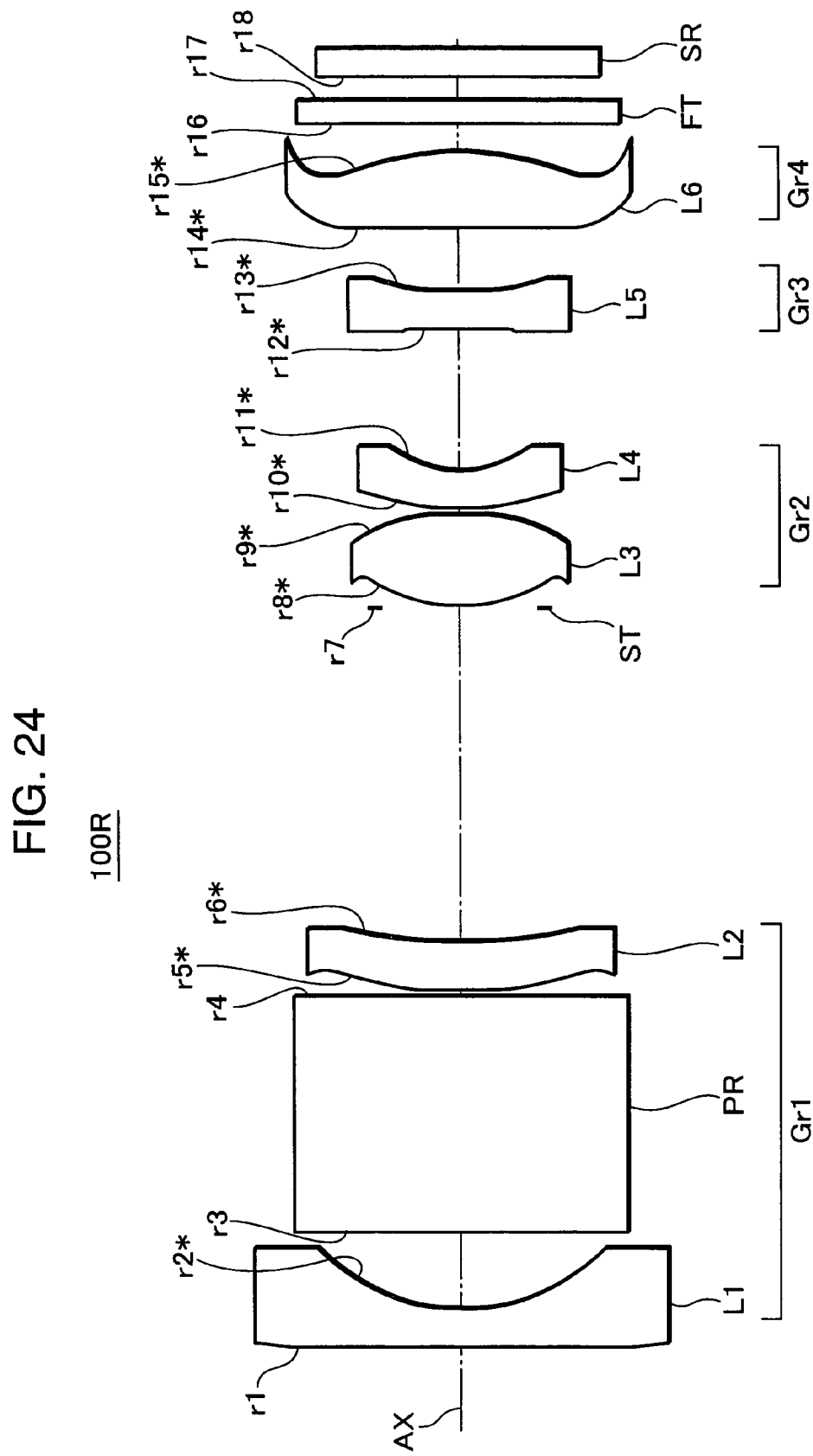
FIG. 24 is a cross-sectional view showing an optical path diagram at a wide angle end in the zoom optical system as Example 18.
Figure 26:
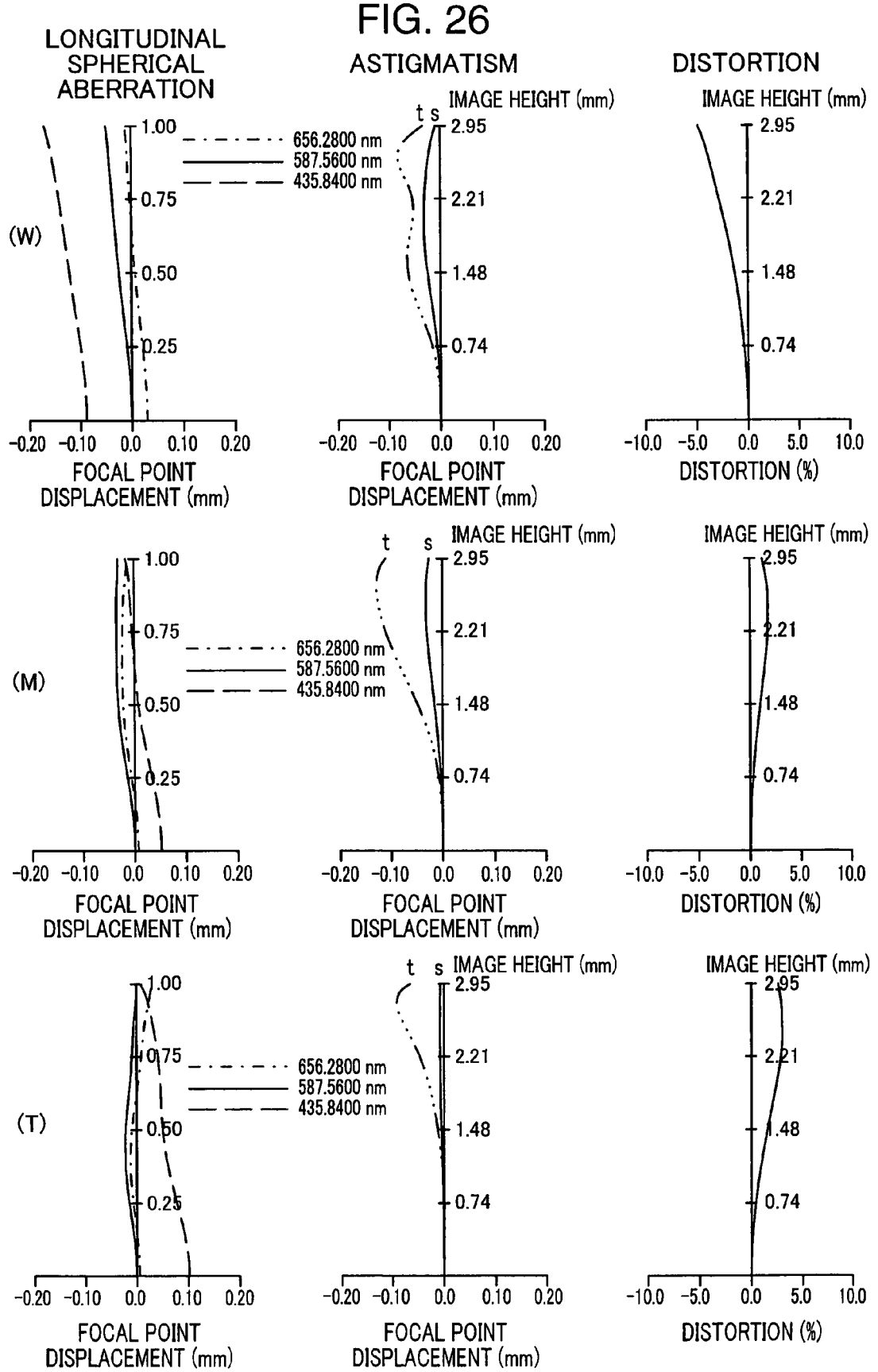
FIG. 26 is an aberration chart showing spherical aberration, astigmatism, and distortion aberration of lens groups in Example 2.
Figure 27:
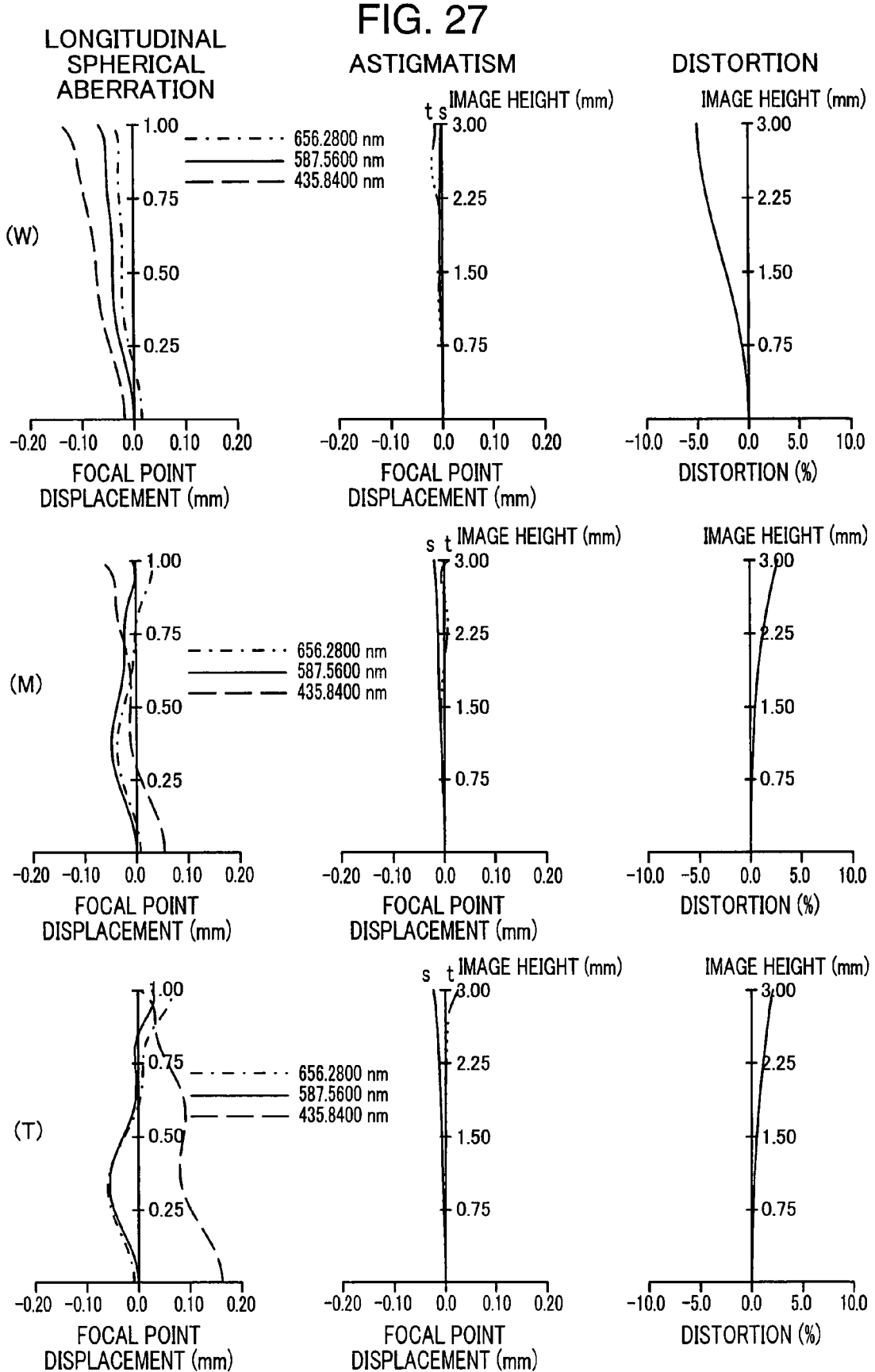
FIG. 27 is an aberration chart showing spherical aberration, astigmatism, and distortion aberration of lens groups in Example 3.
Figure 28:
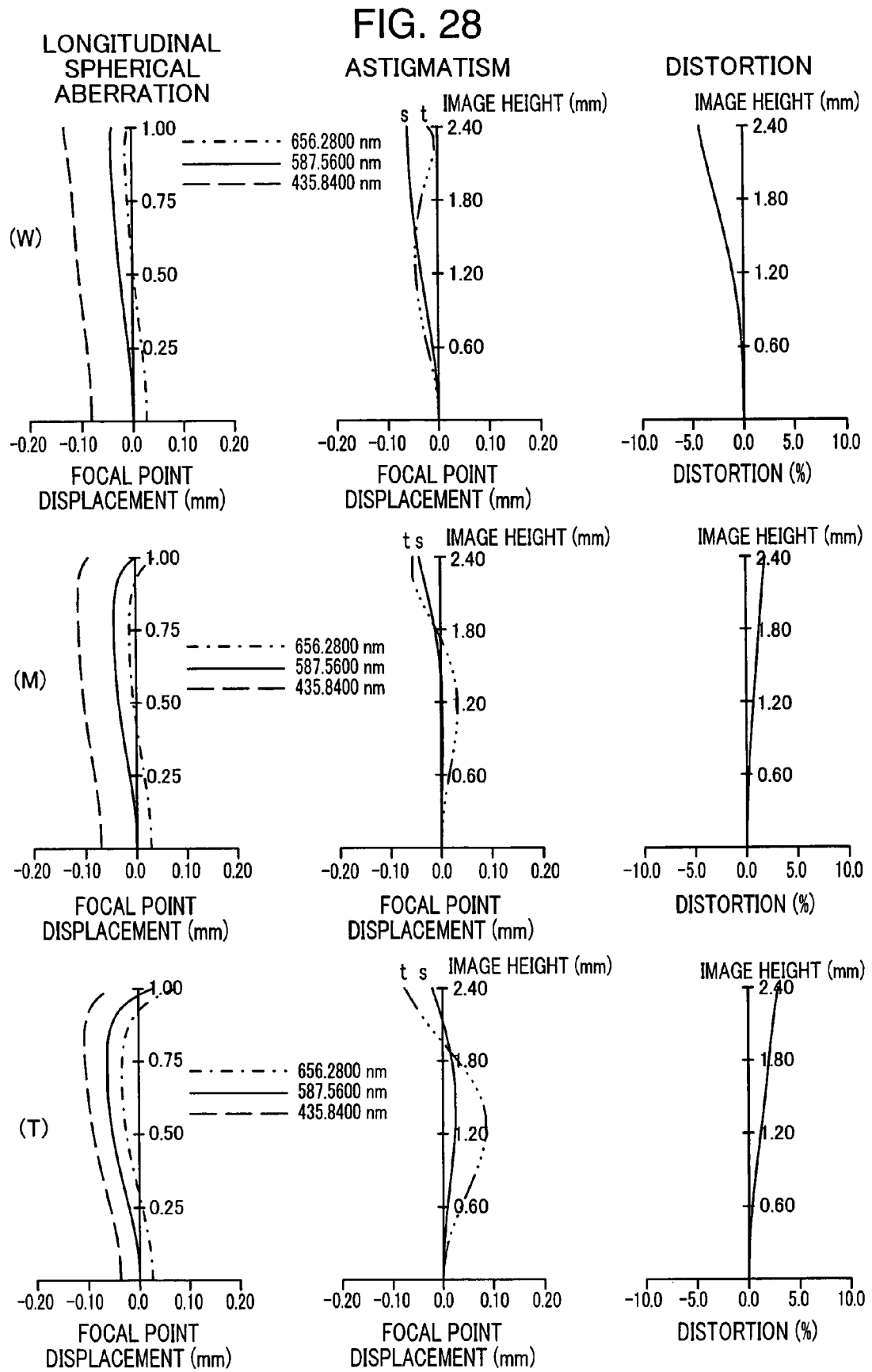
FIG. 28 is an aberration chart showing spherical aberration, astigmatism, and distortion aberration of lens groups in Example 4.
Figure 29:
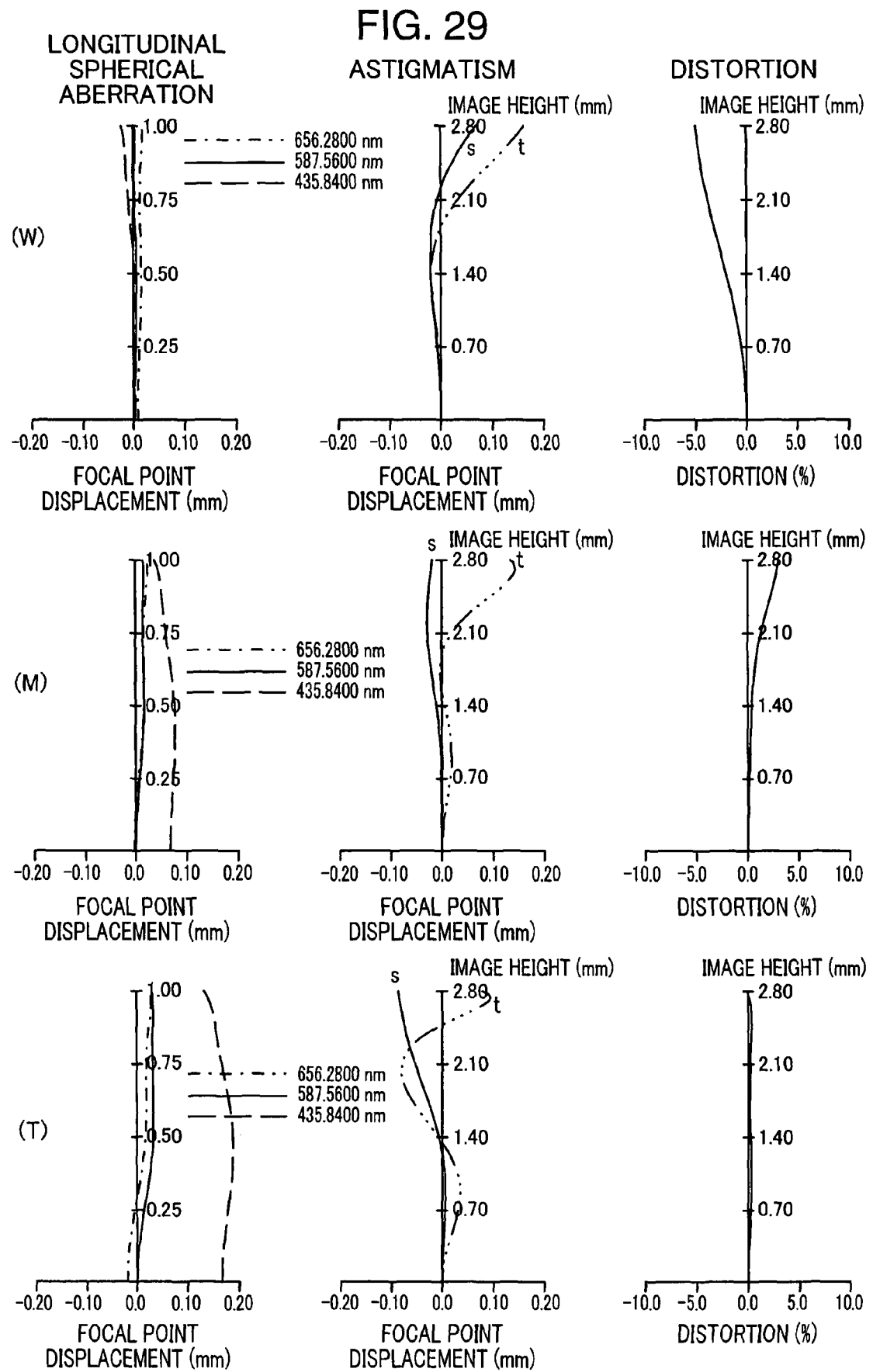
FIG. 29 is an aberration chart showing spherical aberration, astigmatism, and distortion aberration of lens groups in Example 5.
Figure 31:
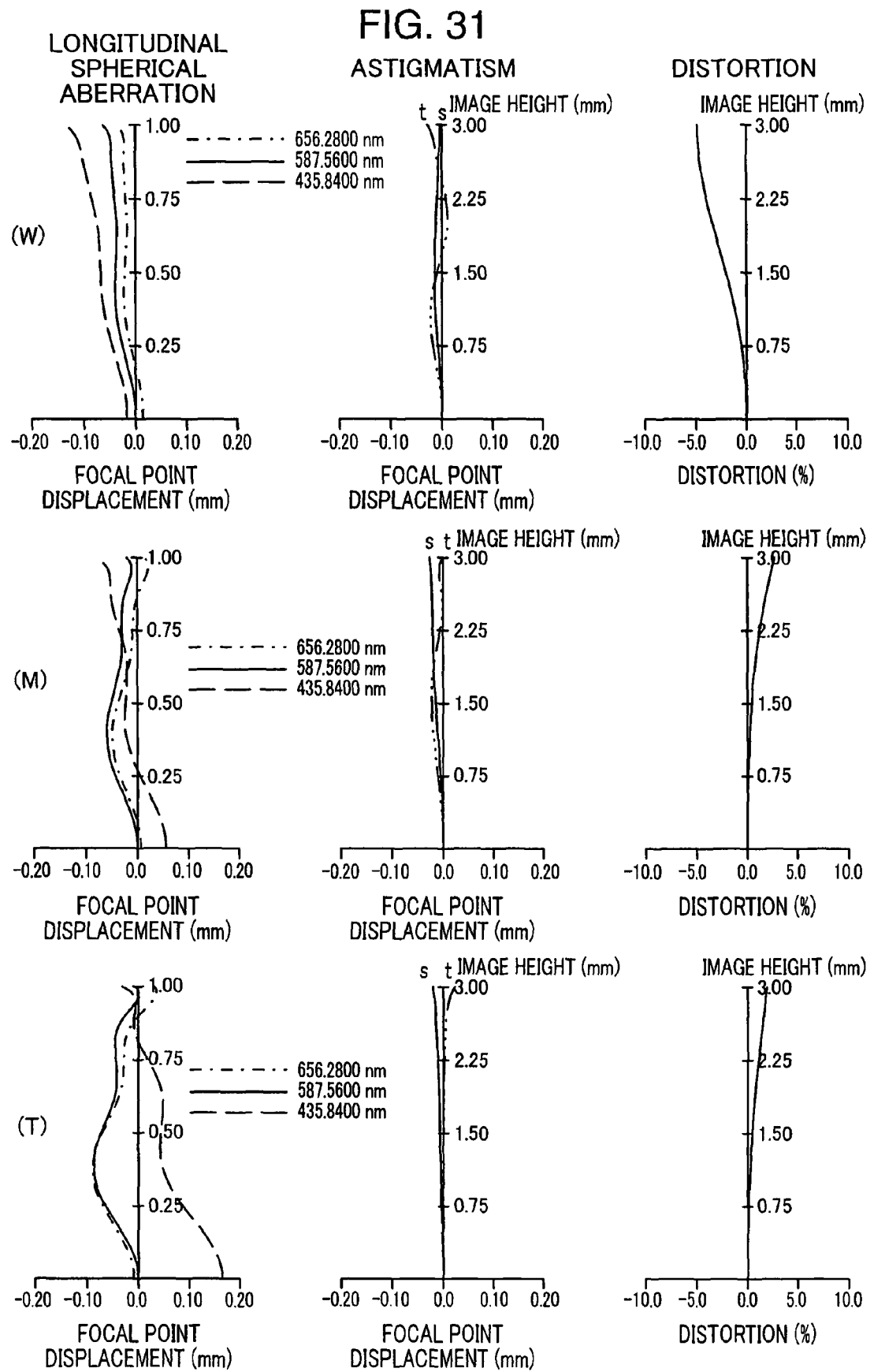
FIG. 31 is an aberration chart showing spherical aberration, astigmatism, and distortion aberration of lens groups in Example 7.
Figure 32:
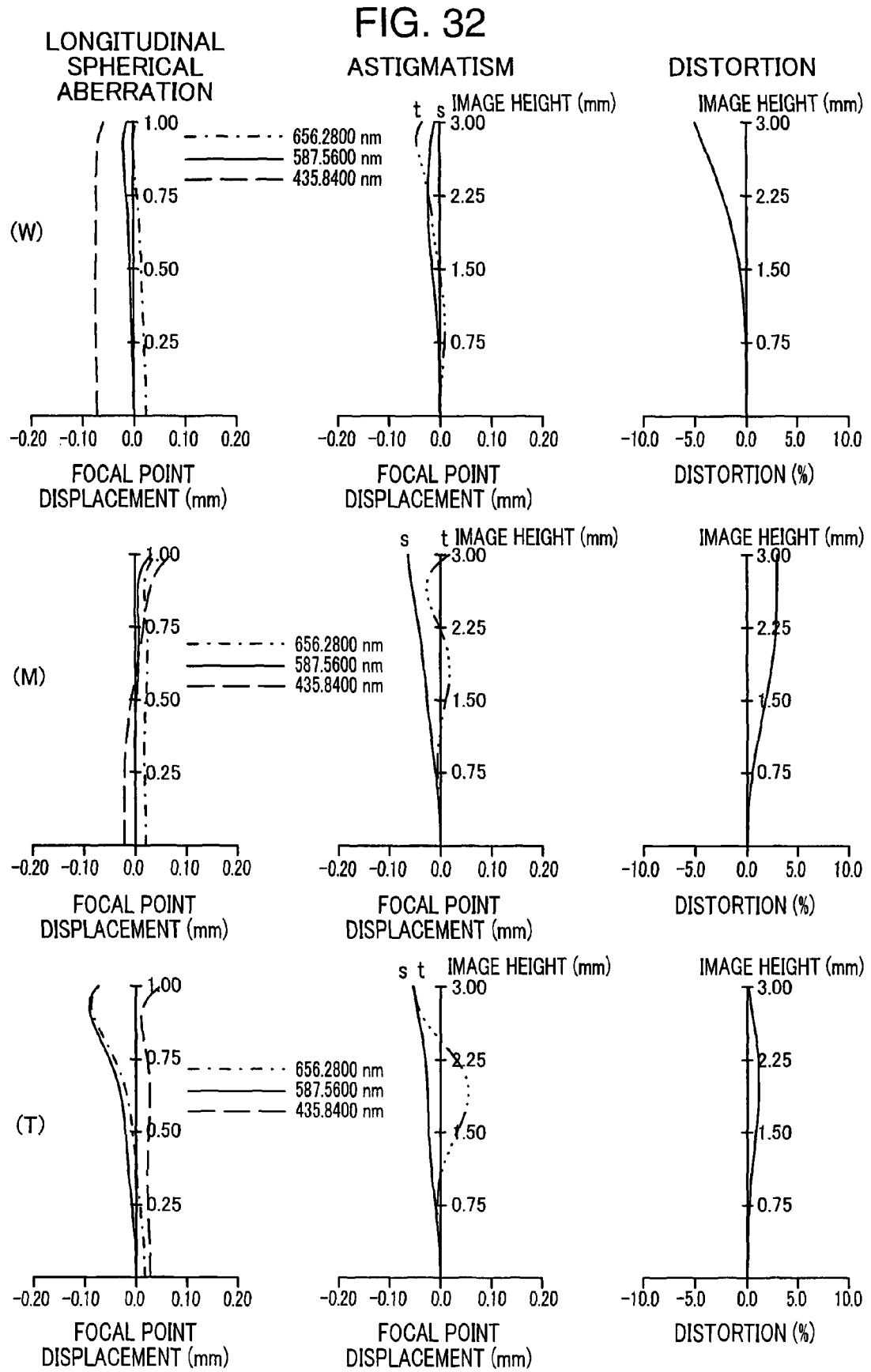
FIG. 32 is an aberration chart showing spherical aberration, astigmatism, and distortion aberration of lens groups in Example 8.
Figure 33:
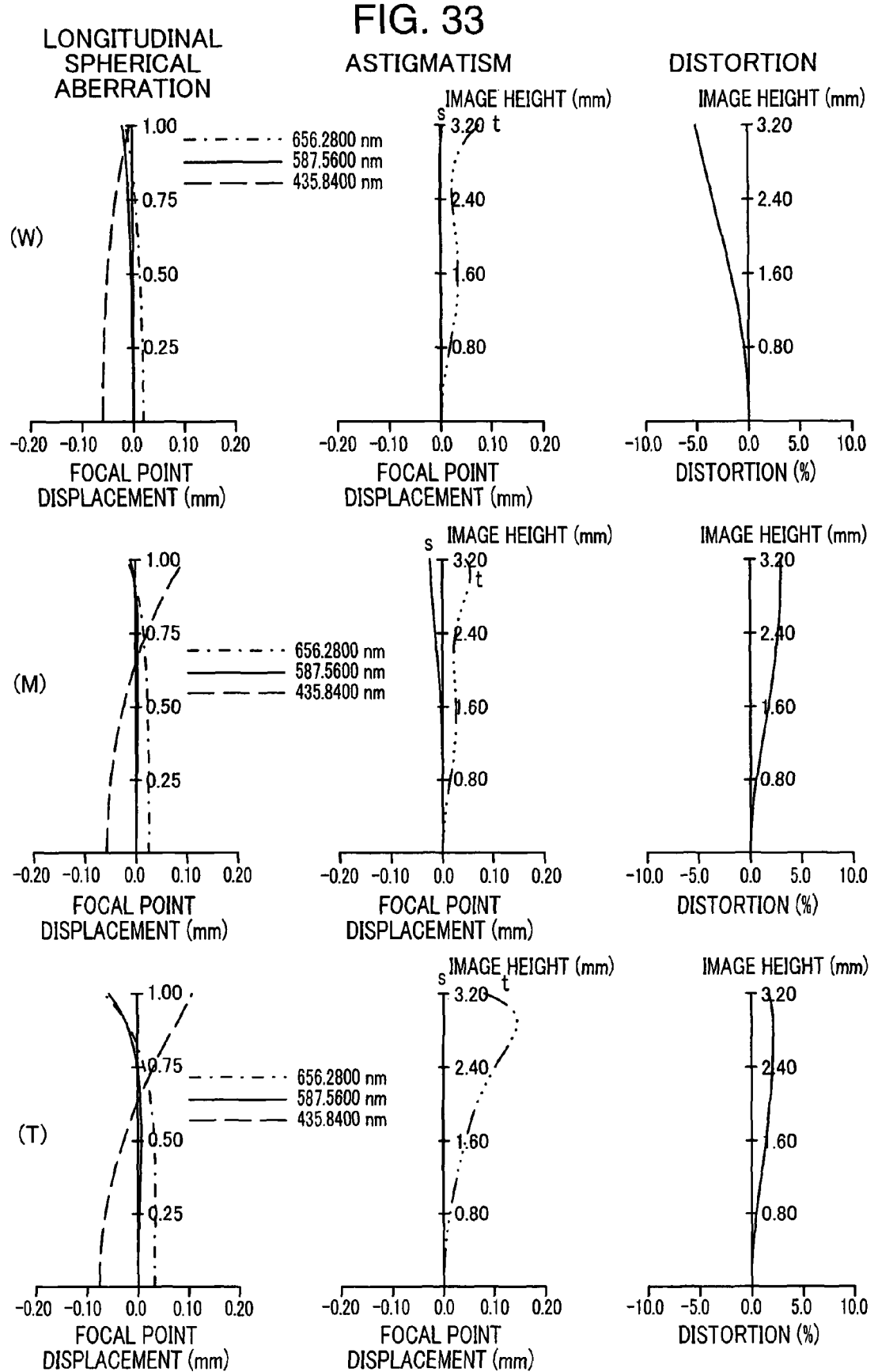
FIG. 33 is an aberration chart showing spherical aberration, astigmatism, and distortion aberration of lens groups in Example 9.
Figure 35:
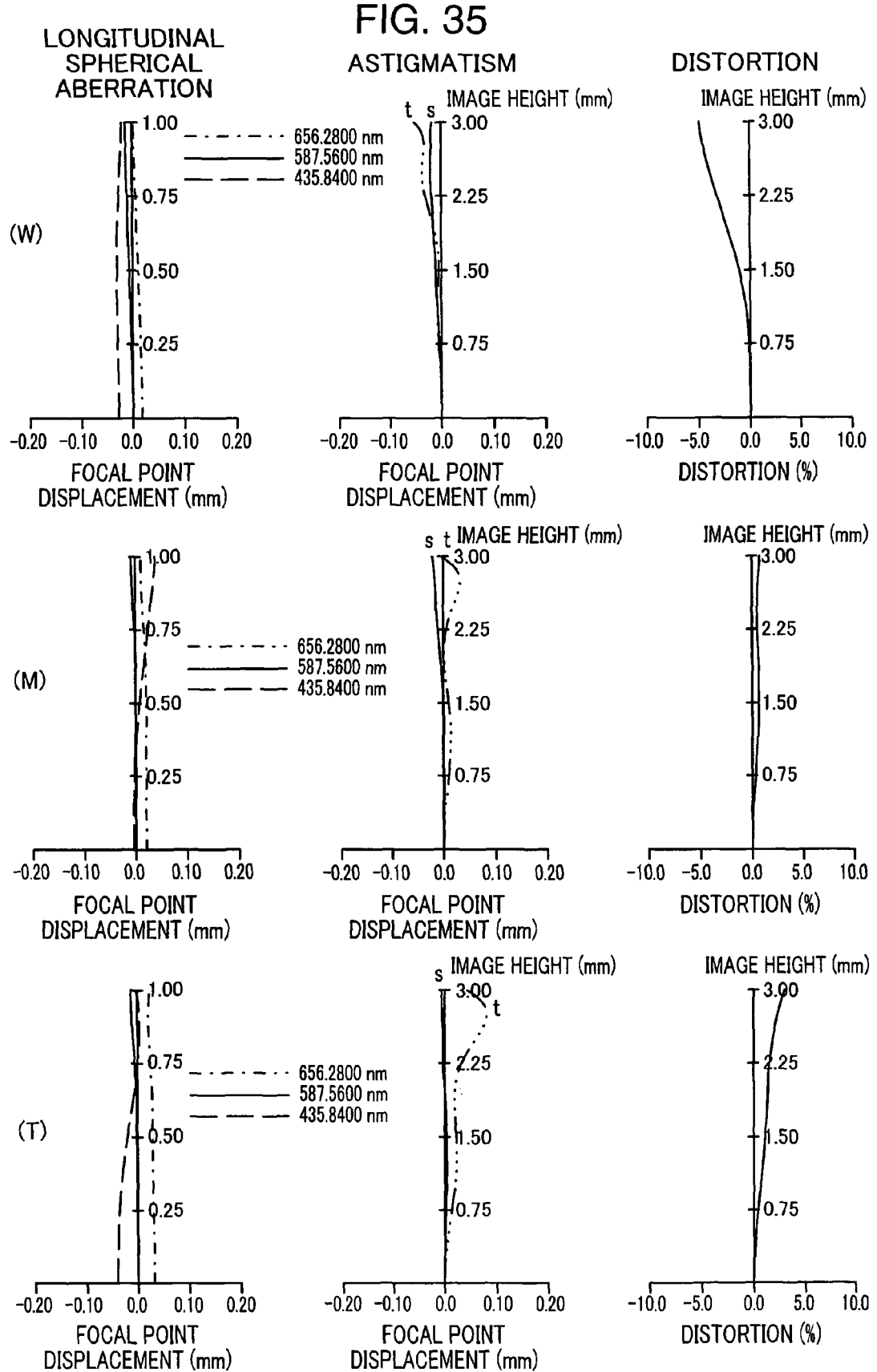
FIG. 35 is an aberration chart showing spherical aberration, astigmatism, and distortion aberration of lens groups in Example 11.
Figure 37:
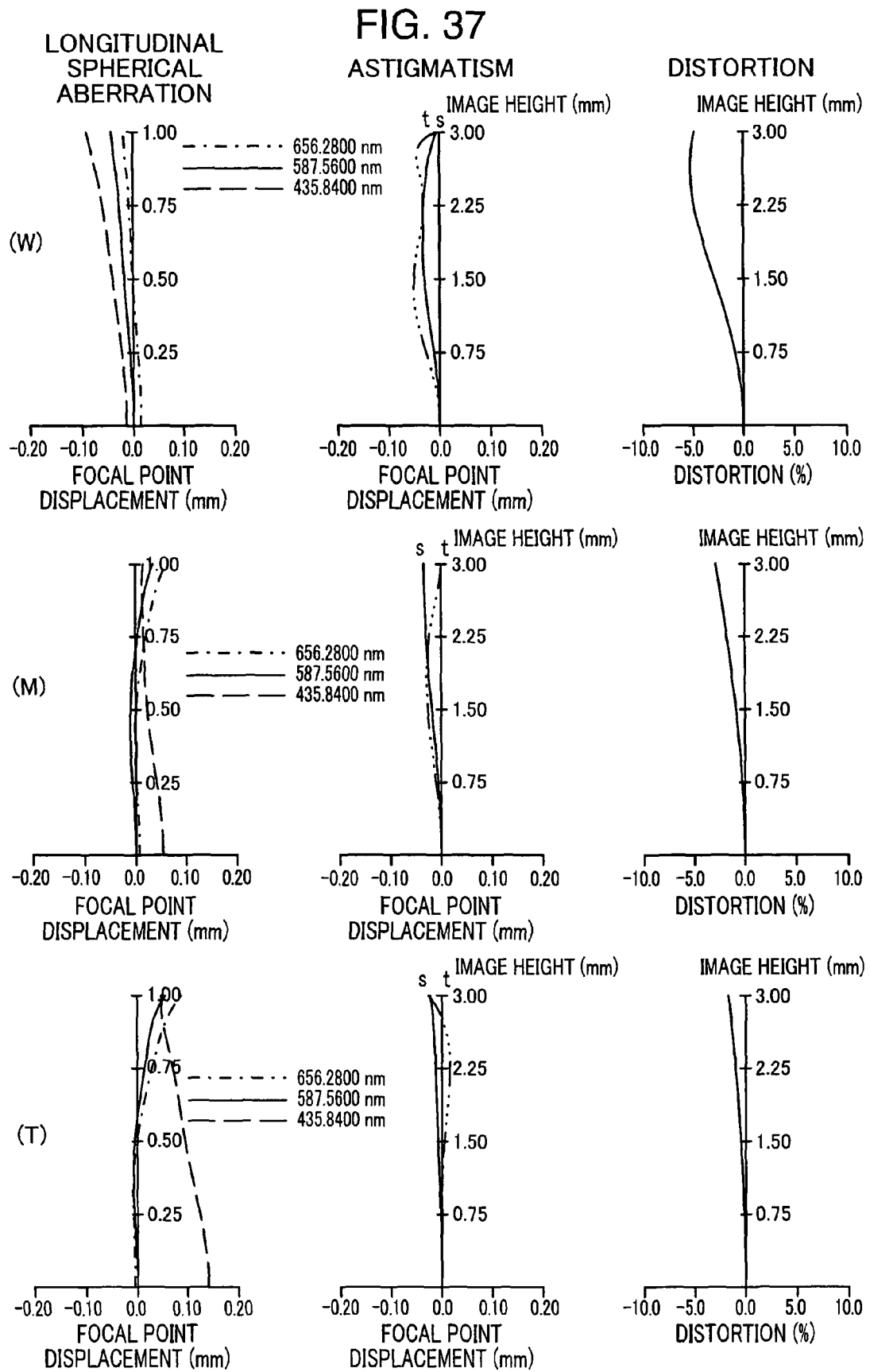
FIG. 37 is an aberration chart showing spherical aberration, astigmatism, and distortion aberration of lens groups in Example 13.
Figure 40:
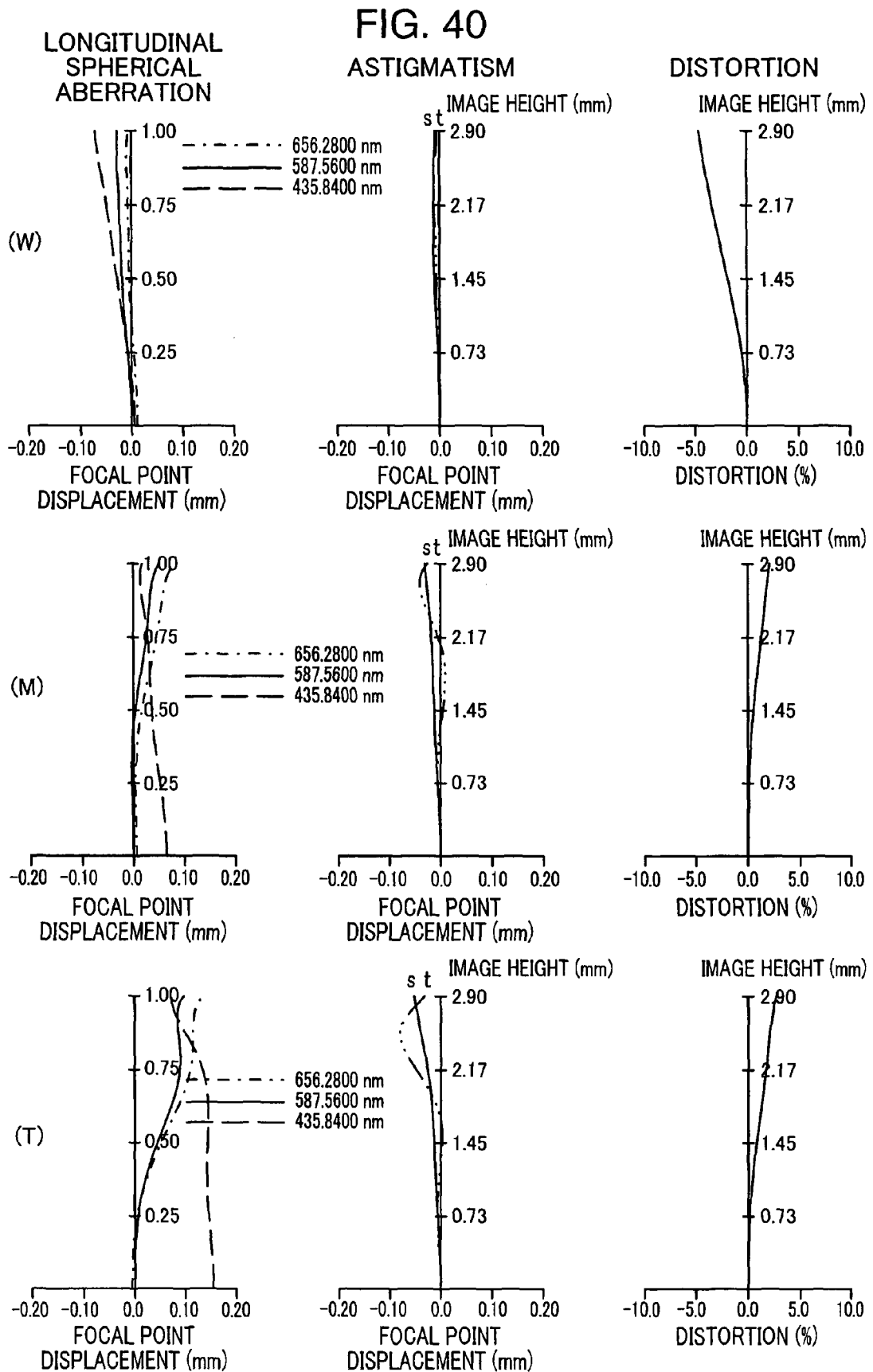
FIG. 40 is an aberration chart showing spherical aberration, astigmatism, and distortion aberration of lens groups in Example 16.
Figure 42:
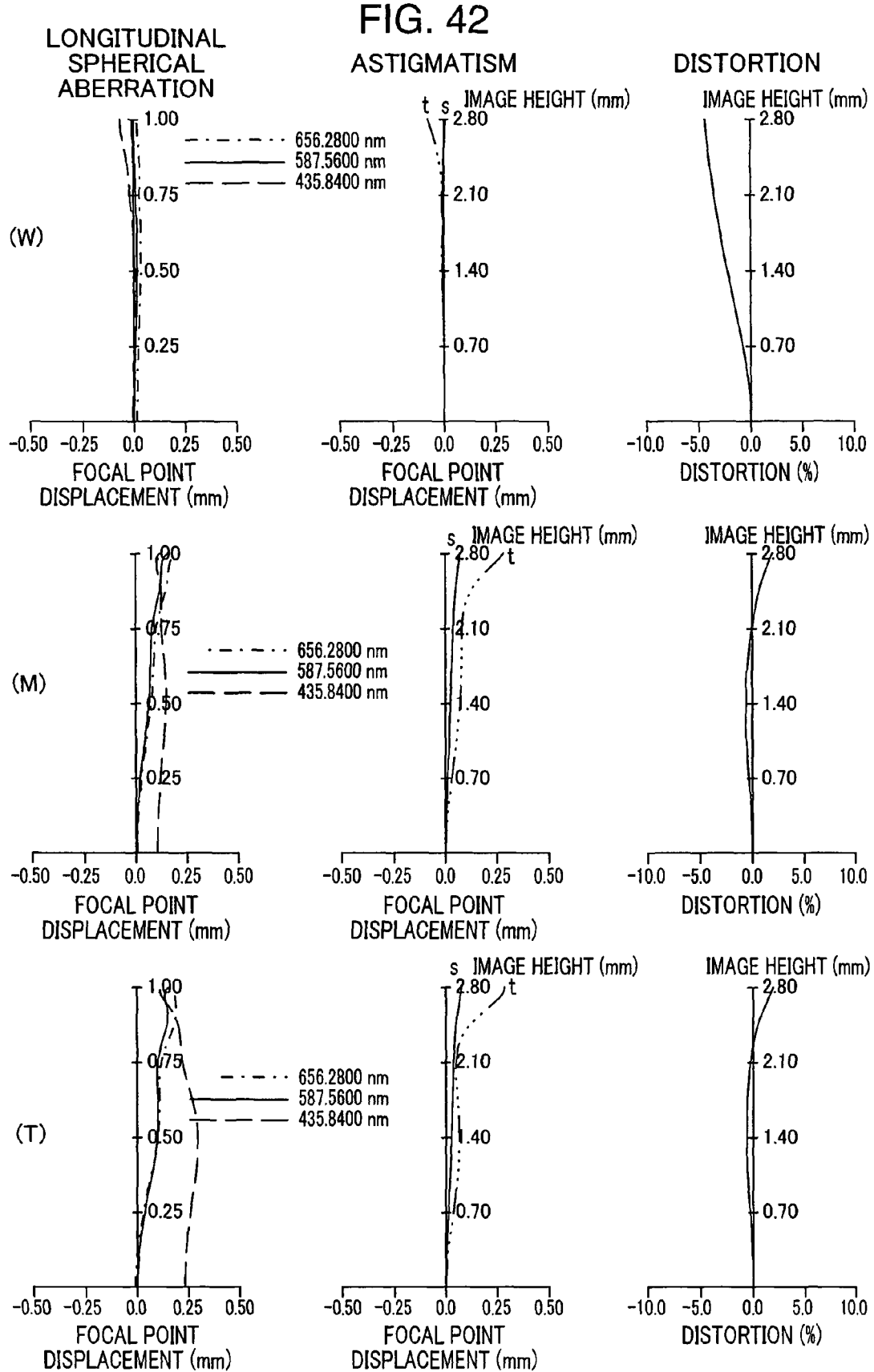
FIG. 42 is an aberration chart showing spherical aberration, astigmatism, and distortion aberration of lens groups in Example 18.

FIGS. 23 and 24 are cross-sectional views, taken along the optical axis (AX), showing an arrangement of lens groups in a zoom optical system 100R as Example 18. The zoom optical system 100R is a bent optical system whose optical axis (AX) is bent by 90 degrees. FIG. 23 shows an optical arrangement of the zoom optical system 100R, and FIG. 24 is an optical path diagram, in which the optical path of the optical arrangement shown in FIG. 23 is converted into a linear optical path.

The zoom optical system 100R includes, in the order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. More specifically, the first lens group (Gr1) is constituted of a negative meniscus lens element (L1) convex to the object side, a prism (PR) for bending the optical path by 90 degrees, and a positive meniscus lens element (L2) convex to the object side in this order from the object side. The second lens group (Gr2) is constituted of a biconvex positive lens element (L3) and a negative meniscus lens element (L4) convex to the object side in this order from the object side. The third lens group (Gr3) is constituted of a biconcave negative lens element (L5). The fourth lens group (Gr4) is constituted of a biconvex positive lens element (L6).

In the zoom optical system 100R in Example 18 having the above lens arrangement, as shown in FIG. 45, in zooming from the wide angle end (W) to the telephoto end (T), the first lens group (Gr1) and the fourth lens group (Gr4) are fixed, and the second lens group (Gr2) and the third lens group (Gr3) are linearly moved toward the object side. The aperture stop (ST) is moved with the second lens group (Gr2) in zooming.

TABLE 35

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| 1 | 128.840 | 0.800 | | | 1.75450 | 51.57 |
| 2* | 4.310 | 1.657 | | | | |
| 3 | ∞ | 5.000 | | | 1.92286 | 20.88 |
| 4 | ∞ | 0.100 | | | | |
| 5* | 9.440 | 1.068 | | | 1.84666 | 23.82 |
| 6* | 13.982 | 7.186 | 3.185 | 0.600 | | |
| 7 | ∞ | 0.000 | | | | |
| 8* | 3.351 | 1.928 | | | 1.49700 | 81.61 |
| 9* | −4.954 | 0.100 | | | | |
| 10* | 5.419 | 0.847 | | | 1.70401 | 27.84 |
| 11* | 2.658 | 2.984 | 2.314 | 2.876 | | |
| 12* | −19.975 | 0.800 | | | 1.69937 | 48.51 |
| 13* | 8.949 | 1.329 | 6.000 | 8.022 | | |
| 14* | 764.333 | 1.602 | | | 1.85000 | 39.90 |
| 15* | −6.478 | 0.600 | | | | |
| 16 | ∞ | 0.500 | | | 1.51680 | 64.20 |
| 17 | ∞ | 0.521 | | | | |
| 18 | ∞ | | | | | |

TABLE 36

| LENS SURFACE NO. | CONICAL COEFFICIENT | ASPHERICAL COEFFICIENT | | | | | | |
|---|---|---|---|---|---|---|---|---|
| | | A | B | C | D | E | F | G |
| 2 | 0 | −3.72E−04 | −1.43E−06 | 2.15E−06 | −7.63E−07 | 0.00E+00 | 0.00E+00 | 0.00E+00 |
| 5 | 0 | 4.82E−04 | 4.30E−05 | 1.64E−05 | −3.62E−06 | 0.00E+00 | 0.00E+00 | 0.00E+00 |
| 6 | 0 | 4.56E−04 | −1.70E−05 | 4.68E−05 | −6.53E−06 | −7.44E−07 | 1.21E−07 | −4.10E−09 |
| 8 | 0 | −4.62E−03 | 2.66E−04 | −5.01E−04 | 2.58E−04 | −1.20E−04 | 3.32E−05 | −3.68E−06 |
| 9 | 0 | 3.03E−03 | 1.30E−04 | −3.32E−04 | 1.76E−04 | −3.64E−05 | 1.33E−06 | −8.90E−09 |
| 10 | 0 | −1.24E−03 | −1.67E−03 | 1.37E−03 | −2.39E−04 | 1.86E−14 | 0.00E+00 | 0.00E+00 |
| 11 | 0 | −5.92E−04 | −3.46E−03 | 2.91E−03 | −6.20E−04 | 1.09E−15 | 0.00E+00 | 0.00E+00 |
| 12 | −1 | 9.91E−03 | −4.88E−03 | 4.37E−04 | −7.94E−06 | 1.47E−07 | 0.00E+00 | 0.00E+00 |
| 13 | −1 | 1.27E−02 | −4.53E−03 | 4.62E−04 | −8.15E−06 | 3.95E−07 | 0.00E+00 | 0.00E+00 |
| 14 | −1 | −3.83E−03 | 9.25E−04 | −5.24E−05 | 1.80E−06 | 0.00E+00 | 0.00E+00 | 0.00E+00 |
| 15 | −1 | −5.14E−03 | 1.38E−03 | −1.09E−04 | 5.38E−06 | 0.00E+00 | 0.00E+00 | 0.00E+00 |

Construction data concerning the lens elements in the zoom optical system 100R in Example 18 are shown in Tables 35 and 36. As shown in Tables 35 and 36, and FIGS. 23 and 24, in Example 18, the second through the sixth lens elements (L2 through L6) are each a bi-aspherical lens element, and the first lens element (L1) is a mono-aspherical lens element. In the zoom optical system 100R, all the first through the sixth lens elements (L1 through L6) are glass lens elements. In Example 18, the prism (PR) is used to suppress the dimension of the zoom optical system in thickness direction. The member for bending the optical path is not limited to the prism (PR). As far as the production cost increase can be suppressed, other equivalent element such as a reflective mirror may be used.

FIGS. 26 through 42 each shows spherical aberration, astigmatism, and distortion aberration of all the optical systems in Examples 2 through 18 having the aforementioned lens arrangements and constructions. Similarly to FIG. 25, the spherical aberration diagrams in FIGS. 26 through 42 show aberrations in the case where three rays of different wavelengths are used. Specifically, the one-dotted-chain lines represent aberrations in using red ray, the solid lines represent aberrations in using yellow ray, and the broken lines represent aberrations in using blue ray. The lens groups in all Examples 2 through 18 show superior optical characteristics that the distortion aberration is within about 5% at any position of the wide angle end (W), the mid point (M), and the telephoto end (T).

Also, the values of the conditional expressions (1) through (16) in the case where the conditional expressions (1) through (16) are applied to the optical systems in Example 2 through 18 are shown in Tables 37 and 38.

TABLE 37

☆CHART SHOWING VALUES OF CONDITIONAL EXPRESSIONS

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| CONDITIONAL EXPRESSION (1) vp | 25.4 | 30.2 | 30.2 | 30.2 | 30.2 | 20.6 | 27.0 | 30.2 | 25.4 |
| CONDITIONAL EXPRESSION (2) Npg | 1.80518 | — | — | — | — | 2.00170 | — | — | 1.80518 |
| CONDITIONAL EXPRESSION (3) Npp | — | 1.58340 | 1.58340 | 1.58340 | 1.58340 | — | 1.60700 | 1.58340 | — |
| CONDITIONAL EXPRESSION (4) f2/fw | 1.35 | 2.14 | 1.33 | 1.82 | 0.81 | 1.52 | 1.31 | 1.57 | 1.43 |
| CONDITIONAL EXPRESSION (5) αw | 22.0 | 16.5 | 22.0 | 14.7 | 23.2 | 17.6 | 22.0 | 17.2 | 20.6 |
| CONDITIONAL EXPRESSION (6) \|αw − αt\| | 9.9 | 10.8 | 9.9 | 7.9 | 15.0 | 9.9 | 9.9 | 17.3 | 19.0 |
| CONDITIONAL EXPRESSION (7) \|f2n/f2p\| | 1.20 | 1.52 | 1.14 | 1.31 | 0.94 | 1.11 | 1.13 | 0.97 | 1.00 |
| CONDITIONAL EXPRESSION (8) \|ΔZpi/dpi\| | 0.15 | 0.01 | 0.15 | 0.08 | 0.13 | 0.10 | 0.19 | 0.14 | 0.03 |
| CONDITIONAL EXPRESSION (9) fp/fw | 6.38 | 1.98 | 6.07 | 4.99 | 1.82 | 4.52 | 6.31 | 1.92 | 2.82 |
| CONDITIONAL EXPRESSION (10) \|f1/fw\| | 2.00 | 3.08 | 1.99 | 2.71 | 1.57 | 2.12 | 1.96 | 2.80 | 2.07 |
| CONDITIONAL EXPRESSION (11) \|f1/ft\| | 0.73 | 1.10 | 0.73 | 0.94 | 0.83 | 0.75 | 0.72 | 0.99 | 0.73 |
| CONDITIONAL EXPRESSION (12) f2/ft | 0.49 | 0.76 | 0.48 | 0.63 | 0.43 | 0.53 | 0.48 | 0.55 | 0.51 |
| CONDITIONAL EXPRESSION (13) fp/ft | 2.33 | 0.71 | 2.21 | 1.74 | 0.96 | 1.59 | 2.31 | 0.68 | 0.99 |
| CONDITIONAL EXPRESSION (14) Y'/TL | 0.15 | 0.09 | 0.15 | 0.10 | 0.24 | 0.13 | 0.15 | 0.15 | 0.16 |
| CONDITIONAL EXPRESSION (15) t2/TL | 0.32 | 0.30 | 0.32 | 0.27 | 0.23 | 0.33 | 0.32 | 0.32 | 0.29 |
| CONDITIONAL EXPRESSION (16) Lb/fw | 0.84 | 0.29 | 0.77 | 1.05 | 0.33 | 0.82 | 0.78 | 0.41 | 0.35 |

TABLE 38

☆CHART SHOWING VALUES OF CONDITIONAL EXPRESSIONS

| | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|
| CONDITIONAL EXPRESSION (1) vp | 36.7 | 30.2 | 30.2 | 30.2 | 30.2 | 30.2 | 39.2 | 30.2 | 39.9 |
| CONDITIONAL EXPRESSION (2) Npg | 1.61659 | — | — | — | — | — | 1.59551 | — | 1.85000 |
| CONDITIONAL EXPRESSION (3) Npp | — | 1.58340 | 1.58340 | 1.58340 | 1.58340 | 1.58340 | — | 1.58340 | — |
| CONDITIONAL EXPRESSION (4) f2/fw | 1.37 | 1.54 | 1.75 | 1.62 | 1.46 | 1.06 | 1.57 | 1.18 | 1.49 |
| CONDITIONAL EXPRESSION (5) αw | 22.0 | 14.1 | 14.7 | 20.0 | 20.3 | 20.0 | 16.9 | 17.1 | 12.2 |
| CONDITIONAL EXPRESSION (6) \|αw − αt\| | 9.9 | 9.9 | 6.8 | 10.3 | 14.3 | 8.0 | 9.8 | 10.2 | 13.0 |
| CONDITIONAL EXPRESSION (7) \|f2n/f2p\| | 1.24 | 1.47 | 1.31 | 0.93 | 1.03 | 1.09 | 1.21 | — | 1.95 |
| CONDITIONAL EXPRESSION (8) \|ΔZpi/dpi\| | 0.21 | 0.05 | 0.10 | 0.05 | 0.21 | 0.12 | 0.15 | 0.06 | 0.09 |
| CONDITIONAL EXPRESSION (9) fp/fw | 5.82 | 3.32 | 5.97 | 2.78 | 3.34 | 2.68 | 4.46 | 3.45 | 1.89 |
| CONDITIONAL EXPRESSION (10) \|f1/fw\| | 2.05 | 2.02 | 2.78 | 2.20 | 2.20 | 1.72 | 2.17 | 1.59 | 2.10 |
| CONDITIONAL EXPRESSION (11) \|f1/ft\| | 0.75 | 0.71 | 0.97 | 0.80 | 0.80 | 0.90 | 0.76 | 0.58 | 0.77 |
| CONDITIONAL EXPRESSION (12) f2/ft | 0.50 | 0.54 | 0.61 | 0.59 | 0.53 | 0.55 | 0.55 | 0.43 | 0.54 |
| CONDITIONAL EXPRESSION (13) fp/ft | 2.12 | 1.17 | 2.08 | 1.01 | 1.22 | 1.41 | 1.57 | 1.26 | 0.69 |
| CONDITIONAL EXPRESSION (14) Y'/TL | 0.15 | 0.12 | 0.10 | 0.12 | 0.14 | 0.19 | 0.13 | 0.15 | 0.10 |
| CONDITIONAL EXPRESSION (15) t2/TL | 0.33 | 0.31 | 0.24 | 0.27 | 0.32 | 0.20 | 0.34 | 0.26 | 0.24 |
| CONDITIONAL EXPRESSION (16) Lb/fw | 0.82 | 0.61 | 1.12 | 1.90 | 0.73 | 0.43 | 0.85 | 0.36 | 0.36 |

The focal length (unit: mm) and the F-number at the wide angle end (W), the mid point (M), and the telephoto end (T) in the zoom optical systems in Examples 2 through 18 are shown in Tables 39 and 40, respectively. Similarly to Example 1, Tables 39 and 40 show that the zoom optical systems in Examples 2 through 18 each provides a fast optical system of a short focal length.

TABLE 39

FOCAL LENGTH(mm)

|  | W | M | T |
|---|---|---|---|
| EXAMPLE 1 | 4.5 | 8.5 | 12.3 |
| EXAMPLE 2 | 5.2 | 9.3 | 14.6 |
| EXAMPLE 3 | 4.5 | 8.7 | 12.4 |
| EXAMPLE 4 | 4.1 | 8.2 | 11.8 |
| EXAMPLE 5 | 4.5 | 6.5 | 8.5 |
| EXAMPLE 6 | 4.5 | 8.6 | 12.8 |
| EXAMPLE 7 | 4.5 | 8.6 | 12.4 |
| EXAMPLE 8 | 4.5 | 9.0 | 12.8 |
| EXAMPLE 9 | 3.8 | 7.5 | 10.7 |
| EXAMPLE 10 | 4.4 | 8.4 | 12.2 |
| EXAMPLE 11 | 4.6 | 9.1 | 13.0 |
| EXAMPLE 12 | 4.1 | 8.2 | 11.9 |
| EXAMPLE 13 | 4.6 | 8.2 | 12.4 |
| EXAMPLE 14 | 5.7 | 10.5 | 15.6 |
| EXAMPLE 15 | 4.5 | 6.5 | 8.5 |
| EXAMPLE 16 | 4.4 | 8.4 | 12.6 |
| EXAMPLE 17 | 4.0 | 6.8 | 11.0 |
| EXAMPLE 18 | 4.0 | 7.5 | 11.0 |

TABLE 40

F NUMBER

|  | W | M | T |
|---|---|---|---|
| EXAMPLE 1 | 3.3 | 4.6 | 5.9 |
| EXAMPLE 2 | 3.0 | 4.5 | 5.9 |
| EXAMPLE 3 | 3.3 | 4.7 | 5.9 |
| EXAMPLE 4 | 2.8 | 3.8 | 4.8 |
| EXAMPLE 5 | 4.0 | 4.9 | 5.9 |
| EXAMPLE 6 | 3.2 | 4.5 | 5.9 |
| EXAMPLE 7 | 3.3 | 4.6 | 5.9 |
| EXAMPLE 8 | 3.0 | 4.7 | 6.0 |
| EXAMPLE 9 | 2.8 | 4.3 | 5.5 |
| EXAMPLE 10 | 3.3 | 4.6 | 5.9 |
| EXAMPLE 11 | 3.0 | 4.5 | 5.4 |
| EXAMPLE 12 | 2.9 | 3.9 | 4.8 |
| EXAMPLE 13 | 3.0 | 3.9 | 5.0 |
| EXAMPLE 14 | 3.3 | 4.5 | 5.9 |
| EXAMPLE 15 | 4.0 | 4.9 | 5.8 |
| EXAMPLE 16 | 3.3 | 4.6 | 5.9 |
| EXAMPLE 17 | 3.4 | 4.6 | 6.0 |
| EXAMPLE 18 | 3.1 | 4.7 | 6.0 |

As described above, according to the zoom optical systems 100A through 100R in Examples 1 through 18, particularly the zoom optical system whose zoom ratio is about two to three times is advantageous in desirably correcting various aberrations in the entire zoom range, and providing a zoom lens device capable of realizing miniaturization or microminiaturization with a less cost.

The foregoing embodiment and/or modifications primarily include the inventions having the following arrangements.

A zoom optical system according to an aspect of the invention includes a first lens group having a negative optical power, a second lens group having a positive optical power, and a third lens group having a positive or negative optical power in this order from an object side. The zoom optical system is configured in such a manner that an interval between the first lens group and the second lens group is decreased in zooming from a wide angle end to a telephoto end, wherein a positive lens element in the third lens group or in a lens group closer to an image side than the third lens group satisfies the following conditional expression (1):

$$\nu p < 40 \qquad (1)$$

where $\nu p$ is a minimum value of the Abbe number of the positive lens element.

In the above arrangement, the zoom optical system is configured into a negative dominant optical system, in which the first lens group closest to the object side has a negative optical power. This enables to promptly alleviate emission of light rays incident from the object side with a large angle by the negative optical power of the first lens group. This is advantageous in reducing the entire length of the optical system or the diameter of the forwardmost lens element. Also, in the negative dominant arrangement, increase of error sensitivity can be suppressed despite miniaturization of the optical system. These advantages are particularly increased in a zoom lens device whose zoom ratio is about two to three times.

If, however, miniaturization of the optical system further progresses, the optical power required for the individual lens elements constituting the second lens group in the aforementioned lens arrangement is increased. As a result, magnification chromatic aberration at the telephoto end may be unduly increased. In view of this, the positive lens element in the third lens group or in the lens group closer to the image side than the third lens group is made of a high dispersive material having the Abbe number satisfying the aforementioned conditional expression (1) to correct the aberration. If the Abbe number is over the upper limit in the conditional expression (1), correction of magnification chromatic aberration by the positive lens element is insufficient, which may lower the contrast, and resultantly cause image degradation.

The zoom optical system according to the one aspect of the invention enables to miniaturize the zoom optical system as a negative dominant arrangement, and sufficiently correct magnification chromatic aberration or a like drawback in the second lens group, which may be involved in miniaturizing or microminiaturizing the zoom optical system, by optimizing the Abbe number of the positive lens element in the third lens group or in the lens group closer to the image side than the third lens group. The arrangement is advantageous in providing a satisfactorily miniaturized zoom optical system whose aberration is desirably corrected in the entire zoom range in a zoom optical system with a certain zoom ratio, particularly, in a zoom optical system with a zoom ratio of about two to three times.

Preferably, in the zoom optical system, the positive lens element having the Abbe number may satisfy the following conditional expression (2):

$$Npg > 1.7 \qquad (2)$$

where $Npg$ is a refractive index of the positive lens element with respect to d-ray.

In the case where a light receiving surface of an image sensor or a like device for converting an optical image into an electric signal is disposed on the image side of the zoom optical system, the positive lens element in the lens group including the third lens group and thereafter serves as a member for adjusting the incident angle of an incident ray to be guided to the image sensor. In view of this, a difference in incident angle with respect to the image sensor between the wide angle end and the telephoto end can be reduced, and production feasibility can be increased by using the high refractive glass material satisfying the conditional expression (2) as a material for the positive lens element. If the refractive index of the positive lens element is under the lower limit in the conditional expression (2), the plane angle of the third lens group or the lens group closer to the image side than the third lens group may be increased. Particularly, in case of a glass lens element, production requirement or assessment on lens performance is severe, which may increase the production cost. As described above, in the case where the light receiving surface of the image sensor is disposed on the image side of the zoom optical system, optimizing the refractive index of the positive lens element in the lens group including the third lens group and thereafter is advantageous in reducing the difference in incident angle with respect to the image sensor between the wide angle end and the telephoto end, and increasing production feasibility of the zoom optical system.

Preferably, in the zoom optical system, the positive lens element having the Abbe number may be made of a resin material, and may satisfy the following conditional expression (3):

$$Npp>1.55 \quad (3)$$

where Npp is a refractive index of the positive lens element made of the resin material with respect to d-ray.

In the zoom optical system, it is desirable to compose the lens element constituting the optical system of a resin material in the aspect of production cost and mass-productivity. In this case, using the resin material having the refractive index satisfying the conditional expression (3) for the positive lens element in the lens group including the third lens group and thereafter enables to produce an optical system capable of sufficiently correcting magnification chromatic aberration or the like. If the refractive index of the positive lens element is under the lower limit in the conditional expression (3), the material for the positive lens element is limited to a low dispersive material, which may obstruct sufficient correction of magnification chromatic aberration.

In the zoom optical system, preferably, the positive lens element having the Abbe number may have at least one aspherical surface. In this arrangement, astigmatism/distortion aberration can be sufficiently corrected by forming at least one aspherical surface in the positive lens element. Also, this arrangement enables to increase latitude in adjusting the incident angle of an optical image with respect to the image sensor, and reduce a difference in incident angle with respect to the image sensor between the wide angle end and the telephoto end. Thus, the arrangement is advantageous in obtaining an image in which a sufficient light amount is secured even in the periphery of the image.

It is difficult to form an aspherical surface in a glass lens element, as compared with a plastic lens element. Generally, as the refractive index of a glass lens element is increased, the melting point thereof is increased, which makes it difficult to form an aspherical surface in the glass lens element. The high dispersive material to be used in the invention i.e. the material defined by the conditional expression (1) has a low melting point despite a relatively high refractive index. The high dispersive material is relatively easily moldable by a glass molding process or a like process even in use of the glass material for the positive lens element. Thus, this arrangement is advantageous in forming an aspherical surface in the glass lens element.

In the zoom optical system, preferably, the second lens group may satisfy the following conditional expression (4):

$$0.7<f2/fw<2.0 \quad (4)$$

where f2 is a composite focal length of the second lens group, and fw is a composite focal length of the entirety of the zoom optical system at the telephoto end.

In the zoom optical system satisfying the conditional expression (4), an intended zoom ratio can be obtained while securing miniaturization. If f2/fw is over the upper limit in the conditional expression (4), the power of the second lens group may be weakened, which makes it difficult to obtain a zoom ratio of about two to three times, while keeping miniaturization. On the other hand, if f2/fw is under the lower limit in the conditional expression (4), decentering error sensitivity of the second lens group may be unduly increased, which makes it difficult to produce lens groups with no or less error sensitivity. Optimizing the value of f2/fw as mentioned above is advantageous in obtaining an intended zoom ratio while securing miniaturization.

In the zoom optical system, preferably, the zoom optical system may satisfy the following conditional expressions (5) and (6):

$$0<\alpha w<30 \quad (5)$$

$$|\alpha w - \alpha t|<20 \quad (6)$$

where $\alpha w$ is an angle (deg) of a principal ray, at a maximum image height, of incident rays onto an imaging surface with respect to a normal to an imaging plane at the wide angle end, and $\alpha t$ is an angle (deg) of the principal ray, at the maximum image height, of the incident rays onto the imaging surface with respect to the normal to the imaging plane at the telephoto end, based on a premise that the angle of the principal ray in the case where an exit pupil position is on the object side with respect to the imaging plane is in a plus direction.

Under the condition that the image sensor is disposed on the image side, if $\alpha w$ is over the upper limit in the conditional expression (5), intended telecentricity cannot be secured for the incident angle of the incident ray with respect to the image sensor. Even if a lens array corresponding to the pixels of the image sensor is arranged in front of the imaging surface of the image sensor, it is difficult to prevent lowering of peripheral illuminance. Setting the value of $\alpha w$ in such a manner that $\alpha w$ does not exceed the lower limit in the conditional expression (5) enables to attain miniaturization while securing a wide angle of view. On the other hand, if $|\alpha w - \alpha t|$ is over the upper limit in the conditional expression (6), a difference in incident angle between the wide angle end and the telephoto end may be unduly increased, which makes it difficult to optimize the lens array. As a result, peripheral illuminance may likely to be reduced at the wide angle end or the telephoto end. In view of this, the above arrangement is advantageous in suppressing a likelihood that peripheral illuminance with respect to the image sensor may be reduced, and capturing a high-quality image while securing miniaturization.

Preferably, the zoom optical system may be constituted merely of the first lens group, the second lens group, and the third lens group, and the third lens group may be constituted of a positive lens element.

In microminiaturizing the zoom optical system, the space occupied ratio of the lens elements relative to the entire space for the lens unit is relatively increased, because the lens elements necessarily occupy a certain space, considering production constraints. Therefore, the number of lens groups or the number of lens elements is required to be reduced as much as possible despite the need of improving precision of individual lens elements. In view of this, configuring the lens groups into a three-component unit of negative-positive-positive arrangement in this order from the object side enables to optimize the balance concerning performances as the zoom optical system such as focusing performance, production error sensitivity, and telecentricity for the incident angle with respect to the imaging plane, while advantageously attaining miniaturization of the zoom optical system, as compared with the conventional zoom optical systems. In the three-component zoom optical system, it is relatively easy to constitute the third lens group of a single lens element, because the third lens group has a smaller optical power than the first lens group or the second lens group. This is further advantageous in attaining miniaturization.

In the above arrangement, preferably, the third lens group may be fixed in zooming from the wide angle end to the telephoto end. With this arrangement, since the third lens group is fixed in zooming, the lens barrel mechanism can be simplified, and position precision of the lens elements can be improved. This enables to provide an arrangement suitable for microminiaturizing the zoom optical system.

In the zoom optical system, preferably, the third lens group may have a negative optical power, and the zoom optical system may include a fourth lens group which is arranged on the image side of the third lens group and which has a positive optical power. With this arrangement, since the third lens group has a negative optical power, axial chromatic aberration can be sufficiently corrected. This enables to enhance the contrast at the center of a captured image on a display screen. Also, since the fourth lens group is provided in the zoom optical system, intended optical performance with respect to a close object can be easily secured.

In the above arrangement, preferably, the positive lens element having the Abbe number may be included in the fourth lens group. The fourth lens group closer to the image side is located at such a position that the principal ray height of an off-axis ray is set high. Using the positive lens element having the Abbe number as the positive lens element in the fourth lens group is advantageous in correcting magnification chromatic aberration.

In the above arrangement, preferably, the fourth lens group may be constituted of a positive lens element. In the four-component zoom optical system, since the fourth lens group has a smaller optical power than the first lens group or the second lens group, it is relatively easy to constitute the fourth lens group of a single lens element. This is further advantageous in miniaturizing the zoom optical system.

In the arrangement that the third lens group has a negative optical power, and the fourth lens group has a positive optical power, preferably, the fourth lens group may be fixed in zooming from the wide angle end to the telephoto end. Since the fourth lens group is fixed in zooming, the lens barrel mechanism can be simplified, and position precision of the lens elements can be improved.

In the arrangement that the third lens group has a negative optical power, and the fourth lens group has a positive optical power, preferably, the first lens group may be fixed in zooming from the wide angle end to the telephoto end. The first lens group whose outer diameter is inherently large greatly affects the dimensions of the zoom optical system as a lens unit. In this arrangement, since the first lens group is fixed in zooming, the lens barrel mechanism can be simplified, which is advantageous in miniaturizing the zoom optical system in length, width, and thickness directions.

In the arrangement that the third lens group has a negative optical power, and the fourth lens group has a positive optical power, both of the first lens group and the fourth lens group are fixed in zooming from the wide angle end to the telephoto end, the weight of the lens groups to be driven in zooming with use of the four-component zoom optical system can be maximally reduced. This allows for use of a small-sized driving device as a zoom mechanism, which is further advantageous in miniaturizing the zoom optical system as a lens unit.

In the zoom optical system, preferably, the third lens group may have a positive optical power, and the zoom optical system may include a fourth lens group which is arranged on the image side of the third lens group and which has a negative optical power. With this arrangement, since the third lens group has a positive optical power, the incident angle of the incident ray with respect to the image sensor disposed on the imaging plane is allowed to have adequate telecentricity. Also, since the fourth lens group is provided in the zoom optical system, intended optical performance with respect to a close object can be easily secured.

In the above arrangement, preferably, the positive lens element having the Abbe number may be included in the third lens group. The third lens group closer to the image side is located at such a position that the principal ray height of an off-axis ray is set high. Using the positive lens element having the Abbe number as the positive lens element in the third lens group is advantageous in correcting magnification chromatic aberration.

In the above arrangement, preferably, the third lens group may be constituted of a positive lens element. In the four-component zoom optical system, since the third lens group has a smaller optical power than the first lens group or the second lens group, it is relatively easy to constitute the third lens group of a single lens element. This is further advantageous in miniaturizing the zoom optical system.

In the arrangement that the third lens group has a positive optical power, and the fourth lens group has a negative optical power, preferably, the fourth lens group may be fixed in zooming from the wide angle end to the telephoto end. Since the fourth lens group is fixed in zooming, the lens barrel mechanism can be simplified, and position precision of the lens elements can be improved.

In the arrangement that the third lens group has a positive optical power, and the fourth lens group has a negative optical power, preferably, the first lens group may be fixed in zooming from the wide angle end to the telephoto end. The first lens group whose outer diameter is inherently large greatly affects the dimensions of the zoom optical system as a lens unit. Since the first lens group is fixed in zooming, the lens barrel mechanism can be simplified, which is advantageous in miniaturizing the zoom optical system in length, width, and thickness directions.

In the arrangement that the third lens group has a positive optical power, and the fourth lens group has a negative optical power, if both of the first lens group and the fourth lens group are fixed in zooming from the wide angle end to the telephoto end, the weight of the lens groups to be driven in zooming with use of the four-component zoom optical system can be maximally reduced. This allows for use of a small-sized driving device as a zoom mechanism, which is further advantageous in miniaturizing the zoom optical system as a lens unit.

In the zoom optical system, preferably, the second lens group may be constituted of a positive lens element and a negative lens element in this order from the object side, and may satisfy the following conditional expression (7):

$$0.7 < |f2n/f2p| < 1.8 \tag{7}$$

where f2$n$ is a focal length of the negative lens element in the second lens group, and f2$p$ is a focal length of the positive lens element in the second lens group.

In the above arrangement, since the second lens group is constituted of a positive lens element and a negative lens element, and f2n/f2p satisfies the conditional expression (7), spherical aberration and axial chromatic aberration can be sufficiently corrected by the positive lens element and the negative lens element. Also, since the positive lens element and the negative lens element are arranged in this order from the object side, the principal point position of the second lens group can be approximated toward the first lens group. This enables to reduce the substantial power of the second lens group while keeping the zoom function, which is advantageous in reducing error sensitivity. If f2n/f2p is over the upper limit in the conditional expression (7), spherical aberration correction is insufficient. On the other hand, if f2n/f2p is under the lower limit in the conditional expression (7), the optical power of the negative lens element in the second lens group may be unduly increased, which may increase magnification chromatic aberration and degrade the image quality.

Preferably, the zoom optical system may further comprise an aperture stop on the object side of the second lens group, wherein the aperture stop has a fixed aperture diameter. In this arrangement, the diameter of the forwardmost lens element in the first lens group can be maximally reduced by arranging the aperture stop whose aperture diameter is fixed on the object side of the second lens group. The interval between the first lens group and the second lens group greatly affects the entire length of the optical system. Accordingly, increasing the interval for providing a variable aperture mechanism between the first lens group and the second lens group may increase the entire length of the optical system by about two to three times, for instance. In the above arrangement, since the aperture diameter is fixed, the construction of the aperture member can be simplified, thereby enabling to reduce the size of the optical system in the optical axis direction. Thus, the arrangement is advantageous in reducing the size of the zoom optical system in the thickness direction.

In the zoom optical system, preferably, the positive lens element having the Abbe number may be a meniscus lens element convex to the object side. In this arrangement, since the principal point position of the lens element can be set away from the imaging plane, the incident angle of the incident ray with respect to the imaging plane can be reduced. Thus, this arrangement is advantageous in microminiaturizing the zoom optical system.

In the zoom optical system, preferably, an image-side lens surface of the positive lens element having the Abbe number may be aspherical, and the image-side lens surface of the positive lens element may satisfy the following conditional expression (8):

$$0.05 < |\Delta Zpi/di| < 0.25 \qquad (8)$$

where $\Delta Zpi$ is an amount of aspherical sag, at a maximum effective radius, of the image-side lens surface of the positive lens element having the Abbe number, and di is the maximum effective radius of the image-side lens surface of the positive lens element having the Abbe number.

In the above arrangement, the value of $\Delta Zpi/di$ is optimized. If $\Delta Zpi/di$ is over the upper limit in the conditional expression (8), the plane angle at a periphery of the lens element may be unduly increased, which makes it difficult to produce an intended zoom optical system, or provide product assessment. On the other hand, if $\Delta Zpi/di$ is under the lower limit in the conditional expression (8), it is impossible to reduce a difference in incident angle with respect to the image sensor between the wide angle end and the telephoto end, which may lower the peripheral illuminance. Further, forming the image-side lens surface of the positive lens element into an aspherical shape is particularly advantageous in correcting distortion aberration. Thus, the arrangement enables to properly set the plane angle at the periphery of the lens element, and suppress lowering of the peripheral illuminance.

In the zoom optical system, preferably, the positive lens element having the Abbe number may satisfy the following conditional expression (9):

$$1 < fp/fw < 8 \qquad (9)$$

where fp is a focal length of the positive lens element having the Abbe number.

In the above arrangement, since the value of fp/fw is optimized, magnification chromatic aberration can be further advantageously corrected, which makes it possible to obtain a high-quality image. If fp/fw is over the upper limit in the conditional expression (9), magnification chromatic aberration correction is insufficient. On the other hand, if fp/fw is under the lower limit in the conditional expression (9), magnification chromatic aberration correction is excessive. In both of the cases, image-quality at the periphery of the captured image is considerably degraded.

In the zoom optical system, preferably, the first lens group may be constituted of a biconcave lens element or a negative meniscus lens element convex to the object side, and of a positive meniscus lens element convex to the object side in this order from the object side. Configuring the lens arrangement of the first lens group in the aforementioned manner enables to easily secure a long back focus distance at the wide angle end, and desirably correct astigmatism and magnification chromatic aberration of an off-axis ray with a wide angle of view. Also, since the positive meniscus lens element convex to the object side is arranged in the first lens group, astigmatism can be desirably corrected, which enables to improve the quality of an image.

In the zoom optical system, preferably, focusing from an infinite object distance to a close object distance may be performed by moving the first lens group to the object side. Change in various aberrations resulting from moving the first lens group is relatively small. Accordingly, performance degradation by focusing can be suppressed by moving the first lens group to the object side for focusing. Also, since large back focus change relative to the moving amount of the first lens group is secured, it is possible to obtain desirable focusing performance up to a position close to the lens element by about several centimeters with a less moving amount.

In the zoom optical system, preferably, focusing from an infinite object distance to a close object distance may be performed by moving the third lens group or the lens group closer to the image side than the third lens group to the object side. This arrangement enables to obtain a clear image up to a close object distance by moving the third lens group or the lens group closer to the image side than the third lens group for focusing without likelihood that the entire length of the optical system by protrusion of a lens barrel, or the diameter of the forwardmost lens element may be unduly increased.

Judgment as to whether the first lens group, or the third lens group or the lens group closer to the image side than the third lens group is to be moved in focusing is determined depending on the optical specifications of the zoom optical system. Specifically, the first lens group is moved in activating the macro function, and the third lens group or the lens group closer to the image side than the third lens group is moved in prioritizing miniaturization of the zoom optical system.

In the zoom optical system, preferably, the second lens group may include a cemented lens element. If the size of the zoom optical system in the optical axis direction is reduced, the moving amount of the second lens group is restricted.

Under the above condition, it is necessary to increase the optical power of the second lens group so as to obtain an intended zoom ratio. As a result, sensitivities with respect to curvature error of the lens elements, center thickness error of the lens elements, refractive index error of the lens elements, interval error between the lens elements, and decentering error of the lens elements are increased, which may necessitate improvement in mechanical precision of the lens barrel or adjustment between the lens elements in the second lens group. In the above arrangement, since the cemented lens element is included in the second lens group, error sensitivities of the lens elements in the second lens group can be remarkably reduced. Even in need of adjustment between the lens elements, sensitivity balance can be desirably retained. Also, this arrangement enables to simplify the lens barrel construction of the second lens group. Accordingly, unlike the conventional arrangement in which a larger space for the optical system is necessary because of mechanical constraints despite an optical disadvantage, the space for the zoom optical system can be efficiently utilized, which is advantageous in further miniaturizing the zoom optical system. In addition to this advantage, unwanted reflected light between lens surfaces can be suppressed by cementing the lens elements together.

In the zoom optical system, preferably, the first lens group may include a cemented lens element. If the size of the optical system in the optical axis direction is reduced, decentering error sensitivity in the first lens group is increased, which may necessitate improvement in mechanical precision of the lens barrel or adjustment between the lens elements in the first lens group. In the above arrangement, since the cemented lens element is included in the first lens group, decentering error sensitivities of the lens elements in the first lens group can be remarkably reduced. Even in need of adjustment between the lens elements, sensitivity balance can be desirably retained. Also, this arrangement enables to simplify the lens barrel construction of the first lens group. Accordingly, unlike the conventional arrangement in which a larger space for the optical system is required because of mechanical constraints despite an optical disadvantage, the space for the zoom optical system can be efficiently utilized, which is advantageous in further miniaturizing the zoom optical system. In addition to this advantage, unwanted reflected light between lens surfaces can be suppressed by cementing the lens elements together.

An imaging lens device according to another aspect of the invention includes the aforementioned zoom optical system, wherein the zoom optical system is so configured as to form an optical image of a subject on a predetermined image forming plane. This arrangement enables to realize a compact, high-resolution, and zoomable imaging lens device that is mountable in a mobile phone, a personal digital assistant, or a like device.

A digital apparatus according to still another aspect of the invention includes the aforementioned imaging lens device; an image sensor for converting the optical image into an electric signal; and a controller for causing the imaging lens device and the image sensor to perform at least one of still image shooting and moving image shooting for the subject, wherein the zoom optical system in the imaging lens device is mounted in such a manner that the optical image of the subject is formed on a light receiving surface of the image sensor. Preferably, the digital apparatus may be a mobile terminal device. These arrangements enable to realize a digital apparatus loaded with a zoomable imaging lens device while retaining high-resolution performance. The mobile terminal device is a digital apparatus which is ordinarily used in a mobile environment, as represented by a mobile phone, a personal digital assistant, or a like device.

What is claimed is:

1. A zoom optical system including a first lens group having a negative optical power, a second lens group having a positive optical power, and a third lens group having a positive or negative optical power in this order from an object side, the zoom optical system being configured in such a manner that an interval between the first lens group and the second lens group is decreased in zooming from a wide angle end to a telephoto end, wherein
  a positive lens element in the third lens group or in a lens group closer to an image side than the third lens group satisfies the following conditional expression:

$vp<40$ where $vp$ is a minimum value of the Abbe number of the positive lens element; and
  the second lens group satisfies the following conditional expression:

$0.7<f2/fw<2.0$ where $f2$ is a composite focal length of the second lens group, and $fw$ is a composite focal length of the entirety of the zoom optical system at the wide angle end.

2. The zoom optical system according to claim 1, wherein the positive lens element having the Abbe number satisfies the following conditional expression:

$Npg>1.7$ where $Npg$ is a refractive index of the positive lens element with respect to d-ray.

3. The zoom optical system according to claim 1, wherein the positive lens element having the Abbe number is made of a resin material, and satisfies the following conditional expression:

$Npp>1.55$ where $Npp$ is a refractive index of the positive lens element made of the resin material with respect to d-ray.

4. The zoom optical system according to claim 1, wherein the positive lens element having the Abbe number has at least one aspherical surface.

5. The zoom optical system according to claim 1, wherein the second lens group is constituted of a positive lens element and a negative lens element in this order from the object side, and satisfies the following conditional expression (7):

$$0.7<|f2n/f2p|<1.8 \tag{7}$$

where $f2n$ is a focal length of the negative lens element in the second lens group, and $f2p$ is a focal length of the positive lens element in the second lens group.

6. The zoom optical system according to claim 1, further comprising an aperture stop on the object side of the second lens group, wherein
  the aperture stop has a fixed aperture diameter.

7. The zoom optical system according to claim 1, wherein the positive lens element having the Abbe number is a meniscus lens element convex to the object side.

8. The zoom optical system according to claim 1, wherein an image-side lens surface of the positive lens element having the Abbe number is aspherical, and
  the image-side lens surface of the positive lens element satisfies the following conditional expression:

$0.05<|\Delta Zpi/di|<0.25$ where ΔZpi is an amount of aspherical sag, at a maximum effective radius, of the image-side lens surface of the positive lens element having the Abbe number, and di is the maximum effective radius of the image-side lens surface of the positive lens element having the Abbe number.

9. The zoom optical system according to claim 1, wherein the positive lens element having the Abbe number satisfies the following conditional expression:

$$1 < fp/fw < 8$$

where fp is a focal length of the positive lens element having the Abbe number.

10. The zoom optical system according to claim 1, wherein the first lens group is constituted of a biconcave lens element or a negative meniscus lens element convex to the object side, and of a positive meniscus lens element convex to the object side in this order from the object side.

11. The zoom optical system according to claim 1, wherein focusing from an infinite object distance to a close object distance is performed by moving the first lens group to the object side.

12. The zoom optical system according to claim 1, wherein focusing from an infinite object distance to a close object distance is performed by moving the third lens group or the lens group closer to the image side than the third lens group to the object side.

13. The zoom optical system according to claim 1, wherein the first lens group includes a cemented lens element.

14. The zoom optical system according to claim 1, wherein the zoom optical system is constituted merely of the first lens group, the second lens group, and the third lens group, and
the third lens group is constituted of a positive lens element.

15. The zoom optical system according to claim 14, wherein
the third lens group is fixed in zooming from the wide angle end to the telephoto end.

16. The zoom optical system according to claim 1, wherein
the third lens group has a negative optical power, and
the zoom optical system includes a fourth lens group which is arranged on the image side of the third lens group and which has a positive optical power.

17. The zoom optical system according to claim 16, wherein
the positive lens element having the Abbe number is included in the fourth lens group.

18. The zoom optical system according to claim 16, wherein
the fourth lens group is constituted of a positive lens element.

19. The zoom optical system according to claim 16, wherein
the fourth lens group is fixed in zooming from the wide angle end to the telephoto end.

20. The zoom optical system according to claim 16, wherein
the first lens group is fixed in zooming from the wide angle end to the telephoto end.

21. The zoom optical system according to claim 1, wherein
the third lens group has a positive optical power, and
the zoom optical system includes a fourth lens group which is arranged on the image side of the third lens group and which has a negative optical power.

22. The zoom optical system according to claim 21, wherein
the positive lens element having the Abbe number is included in the third lens group.

23. The zoom optical system according to claim 21, wherein
the third lens group is constituted of a positive lens element.

24. The zoom optical system according to claim 21, wherein
the fourth lens group is fixed in zooming from the wide angle end to the telephoto end.

25. The zoom optical system according to claim 21, wherein
the first lens group is fixed in zooming from the wide angle end to the telephoto end.

26. An imaging lens device, comprising:
the zoom optical system of claim 1, wherein
the zoom optical system is so configured as to form an optical image of a subject on a predetermined image forming plane.

27. A digital apparatus, comprising:
an image sensor, provided with a light receiving surface, for converting an optical image of a subject into an electric signal;
an imaging lens device including the zoom optical system of claim 1, the zoom optical system being adapted to form the optical image of the subject on the light receiving surface of the image sensor; and
a controller for causing the imaging lens device and the image sensor to perform at least one of still image shooting and moving image shooting for the subject, wherein
the zoom optical system in the imaging lens device is mounted in such a manner that the optical image of the subject is formed on a light receiving surface of the image sensor.

28. The digital apparatus according to claim 27, wherein
the digital apparatus is a mobile terminal device.

29. A zoom optical system including a first lens group having a negative optical power, a second lens group having a positive optical power, and a third lens group having a positive or negative optical power in this order from an object side, the zoom optical system being configured in such a manner that an interval between the first lens group and the second lens group is decreased in zooming from a wide angle end to a telephoto end, wherein
a positive lens element in the third lens group or in a lens group closer to an image side than the third lens group satisfies the following conditional expression:

$$vp < 40$$

where vp is a minimum value of the Abbe number of the positive lens element, wherein
the zoom optical system satisfies the following conditional expressions:

$$0 < \alpha w < 30$$

$$|\alpha w - \alpha t| < 20$$

where αw is an angle (deg) of a principal ray, at a maximum image height, of incident rays onto an imaging surface with respect to a normal to an imaging plane at the wide angle end, and αt is an angle (deg) of the principal ray, at the maximum image height, of the incident rays onto the imaging surface with respect to the normal to the imaging plane at the telephoto end, based on a premise that the angle of the principal ray in the case where an exit pupil position is on the object side with respect to the imaging plane is in a plus direction.

30. The zoom optical system according to claim 29, wherein
the positive lens element having the Abbe number satisfies the following conditional expression:

$$Npg>1.7$$

where Npg is a refractive index of the positive lens element with respect to d-ray.

31. The zoom optical system according to claim 29, wherein
the positive lens element having the Abbe number is made of a resin material, and satisfies the following conditional expression:

$$Npp>1.55$$

where Npp is a refractive index of the positive lens element made of the resin material with respect to d-ray.

32. The zoom optical system according to claim 29, wherein
the positive lens element having the Abbe number is a meniscus lens element convex to the object side.

33. The zoom optical system according to claim 29, wherein
an image-side lens surface of the positive lens element having the Abbe number is aspherical, and
the image-side lens surface of the positive lens element satisfies the following conditional expression:

$$0.05<|\Delta Zpi/di|<0.25$$

where ΔZpi is an amount of aspherical sag, at a maximum effective radius, of the image-side lens surface of the positive lens element having the Abbe number, and di is the maximum effective radius of the image-side lens surface of the positive lens element having the Abbe number.

34. The zoom optical system according to claim 29, wherein
the first lens group includes a cemented lens element.

35. A zoom optical system including a first lens group having a negative optical power, a second lens group having a positive optical power, and a third lens group having a positive or negative optical power in this order from an object side, the zoom optical system being configured in such a manner that an interval between the first lens group and the second lens group is decreased in zooming from a wide angle end to a telephoto end, wherein
a positive lens element in the third lens group or in a lens group closer to an image side than the third lens group satisfies the following conditional expression:

$$vp<40$$

where vp is a minimum value of the Abbe number of the positive lens element, wherein
the second lens group includes a cemented lens element.

36. The zoom optical system according to claim 35, wherein
the positive lens element having the Abbe number satisfies the following conditional expression:

$$Npg>1.7$$

where Npg is a refractive index of the positive lens element with respect to d-ray.

37. The zoom optical system according to claim 35, wherein
the positive lens element having the Abbe number is made of a resin material, and satisfies the following conditional expression:

$$Npp>1.55$$

where Npp is a refractive index of the positive lens element made of the resin material with respect to d-ray.

38. The zoom optical system according to claim 35, wherein
the positive lens element having the Abbe number is a meniscus lens element convex to the object side.

39. The zoom optical system according to claim 35, wherein
an image-side lens surface of the positive lens element having the Abbe number is aspherical, and
the image-side lens surface of the positive lens element satisfies the following conditional expression:

$$0.05<|\Delta Zpi/di|<0.25$$

where ΔZpi is an amount of aspherical sag, at a maximum effective radius, of the image-side lens surface of the positive lens element having the Abbe number, and di is the maximum effective radius of the image-side lens surface of the positive lens element having the Abbe number.

40. The zoom optical system according to claim 35, wherein
the first lens group includes a cemented lens element.

* * * * *

UNITED STATES PATENT AND TRADEMARK OFFICE
CERTIFICATE OF CORRECTION

| | | |
|---|---|---|
| PATENT NO. | : 7,869,134 B2 | Page 1 of 1 |
| APPLICATION NO. | : 11/919045 | |
| DATED | : January 11, 2011 | |
| INVENTOR(S) | : Keiji Matsusaka and Soh Ohzawa | |

It is certified that error appears in the above-identified patent and that said Letters Patent is hereby corrected as shown below:

Column 1:
Line 6, Delete "PCT/JP2006/3080914" and insert -- PCT/JP2006/308091 --.

Signed and Sealed this
Fifteenth Day of March, 2011

David J. Kappos
*Director of the United States Patent and Trademark Office*